US012573952B2

(12) United States Patent
Cho et al.

(10) Patent No.: US 12,573,952 B2
(45) Date of Patent: Mar. 10, 2026

(54) MULTI-PATH CONVERTER AND CONTROL METHOD THEREFOR

(71) Applicant: KOREA ADVANCED INSTITUTE OF SCIENCE AND TECHNOLOGY, Daejeon (KR)

(72) Inventors: Gyu Hyeong Cho, Daejeon (KR); Yeun Hee Huh, Daejeon (KR); Se Un Shin, Daejeon (KR); Sung Won Choi, Daejeon (KR); Yong Min Ju, Daejeon (KR); Sang Jin Lim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 133 days.

(21) Appl. No.: 18/327,324

(22) Filed: Jun. 1, 2023

(65) Prior Publication Data

US 2023/0344344 A1     Oct. 26, 2023

Related U.S. Application Data

(63) Continuation of application No. 17/843,689, filed on Jun. 17, 2022, now Pat. No. 11,682,970, which is a
(Continued)

(51) Int. Cl.
    H02M 3/158          (2006.01)
(52) U.S. Cl.
    CPC .................................. H02M 3/158 (2013.01)
(58) Field of Classification Search
    CPC ..... G05F 1/00; G05F 1/10; G05F 1/12; G05F
         1/46; G05F 1/455; G05F 1/45; G05F
         1/445; G05F 1/66; G05F 1/40; G05F
         1/42; G05F 1/44; G05F 1/462; G05F
         1/52; G05F 1/56; G05F 3/10; G05F 3/16;

G05F 3/18; G05F 3/185; G05F 3/20;
         G05F 3/26; G05F 3/30; G05F 3/205;
         G05F 3/22; G05F 3/24; G05F 3/222;
         G05F 3/242; G05F 3/225; G05F 3/227;
         G05F 3/245; G05F 3/247; G05F 3/262;
         G05F 3/265; G05F 3/267; G05F 1/575;
              H02M 5/2573; H02M 1/081;
                     (Continued)

(56)            References Cited

U.S. PATENT DOCUMENTS 8,593,836 B2    11/2013  Umetani
    9,385,616 B2     7/2016  Deng et al.
                    (Continued)

FOREIGN PATENT DOCUMENTS

JP        2016-135003 A     7/2016
    KR    10-2002-0048246 A     6/2002
                    (Continued)

OTHER PUBLICATIONS

"Dual-path Buck Converter," Circuit Design and System Application Laboratory, KAIST, 54 pages.
International Search Report of PCT/KR2018/003301 dated Jul. 25, 2018.
Office Action dated Aug. 26, 2022 issued by the Chinese Patent Office in Chinese Application No. 201880035019.6.
"High Efficiency Buck Converter," Circuit Design and System Application Laboratory, KAIST, 14 pages.

*Primary Examiner* — Jeffrey A Gblende
(74) *Attorney, Agent, or Firm* — Sughrue Mion, PLLC

(57)            ABSTRACT

The present invention relates to a multi-path converter, which adds a current transfer path using a capacitor to a current transfer path using an inductor to supply a current that is output to an output end (load) to a plurality of parallel paths, thereby reducing a total RMS current flowing through the inductor, and a control method therefor.

26 Claims, 63 Drawing Sheets

Related U.S. Application Data continuation-in-part of application No. 16/591,145, filed on Oct. 2, 2019, now Pat. No. 11,398,779.

(58) Field of Classification Search

CPC .......... H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 3/1588; H02M 2003/1566; H02M 3/1582; H02M 3/1584; H02M 2003/1557; H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H05B 39/048; B23K 11/24; H04B 2215/069; H02J 3/46; H02J 3/38

See application file for complete search history.

(56) References Cited

U.S. PATENT DOCUMENTS

| | | | |
|---|---|---|---|
| 9,876,423 | B2 | 1/2018 | Sadohara et al. |
| 11,398,779 | B2 | 7/2022 | Cho et al. |
| 2001/0026460 | A1 | 10/2001 | Ito et al. |
| 2005/0270812 | A1 | 12/2005 | Vinciarelli |
| 2010/0039080 | A1 | 2/2010 | Schoenbauer et al. |
| 2012/0069606 | A1 | 3/2012 | Sagneri et al. |
| 2012/0256659 | A1 | 10/2012 | Kiadeh et al. |
| 2014/0266132 | A1 | 9/2014 | Low et al. |
| 2015/0015225 | A1 | 1/2015 | Cheng |
| 2016/0056709 | A1 | 2/2016 | Khayat |
| 2017/0149332 | A1 | 5/2017 | Tanigawa et al. |
| 2017/0163157 | A1 | 6/2017 | Petersen |

FOREIGN PATENT DOCUMENTS

| | | |
|---|---|---|
| KR | 10-2008-0067378 A | 7/2008 |
| KR | 20-2009-0004002 U | 4/2009 |
| KR | 10-2014-0008293 A | 1/2014 |
| WO | 2009/144784 A1 | 12/2009 |
| WO | 2016/021126 A1 | 2/2016 |
| WO | 2016/169022 A1 | 10/2016 |

<prior art>

[Fig15]
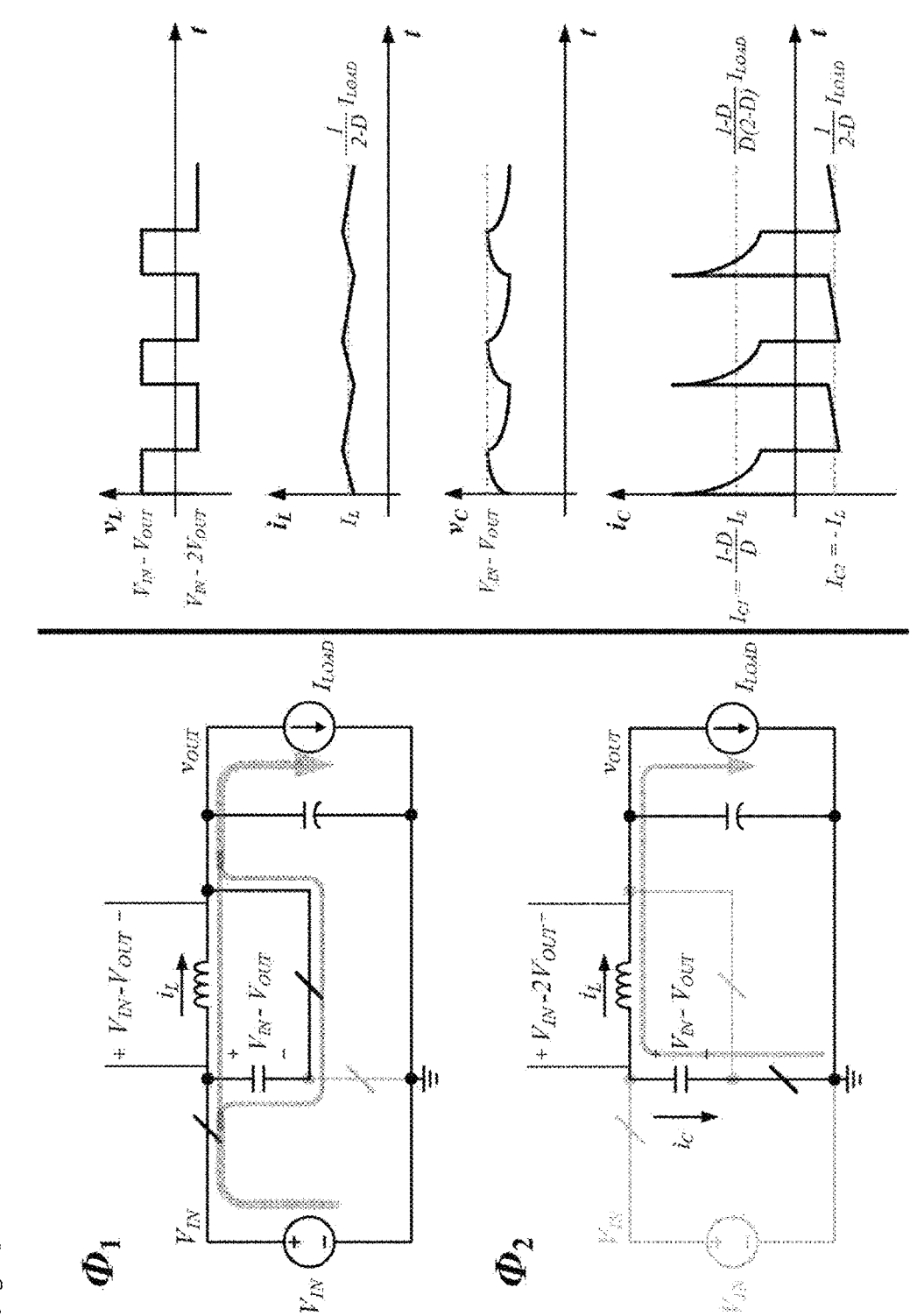

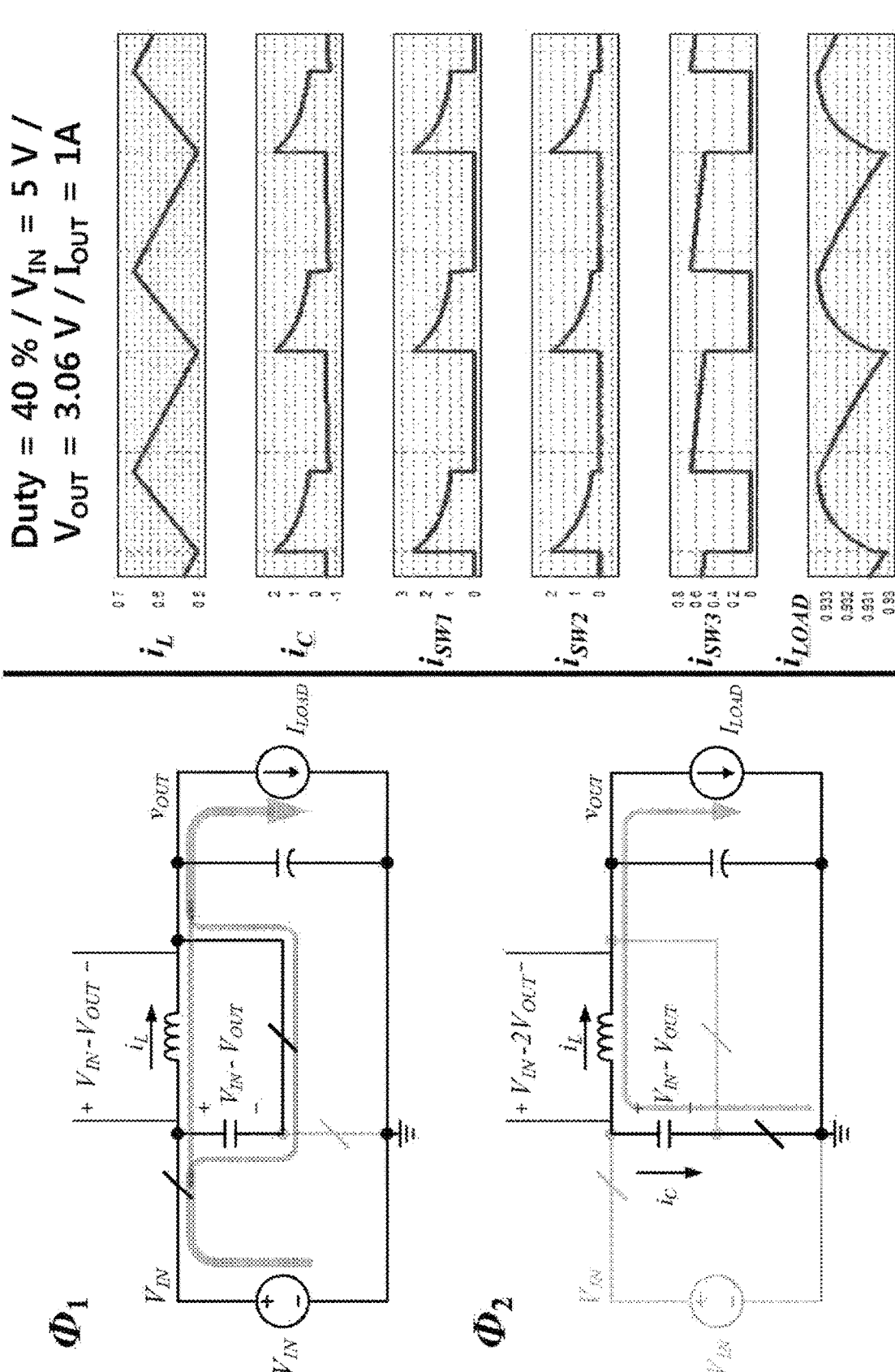

[Fig17]
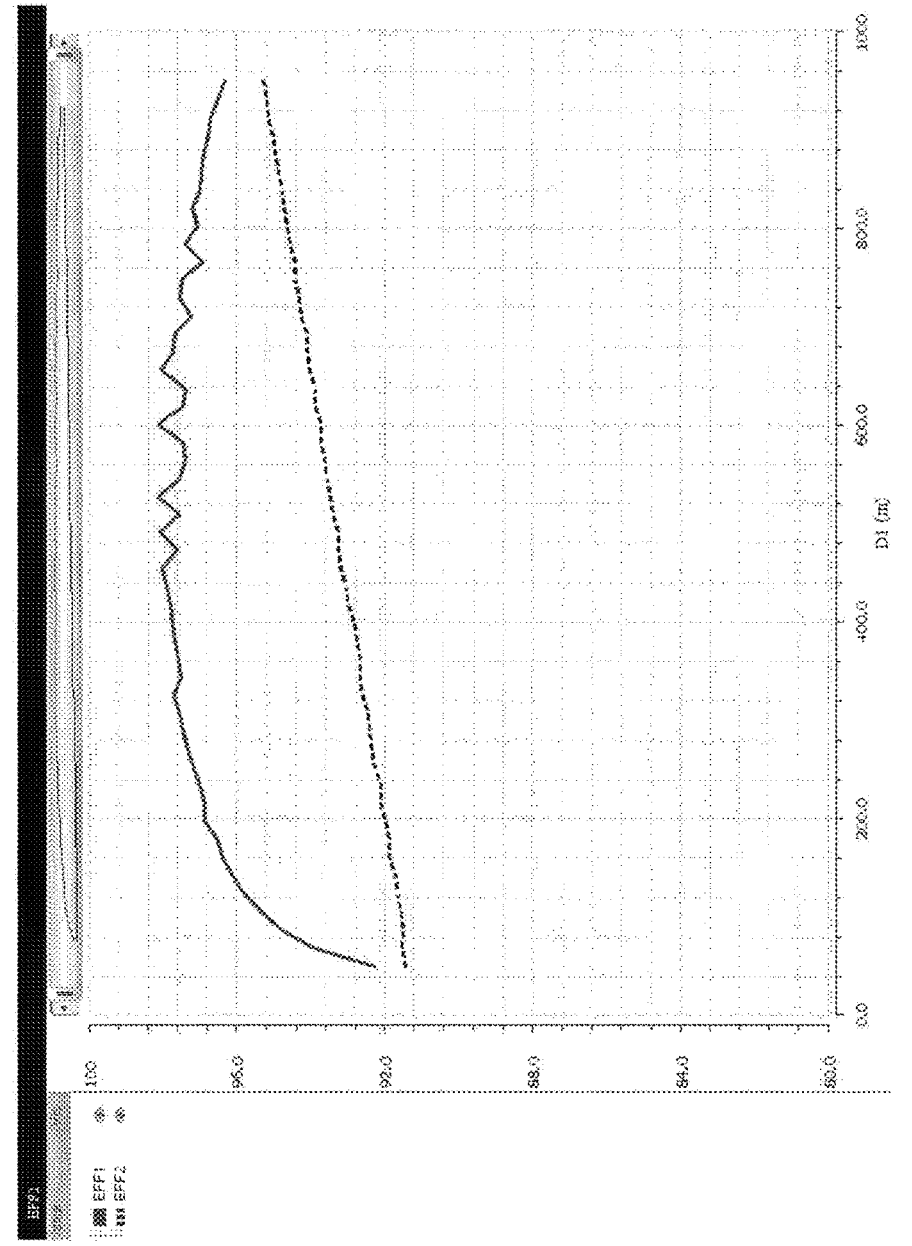
power efficiency of the first step-down convert
in the first simulation environment
power efficiency of the conventional step-down
converter in the first simulation environment

[Fig18]
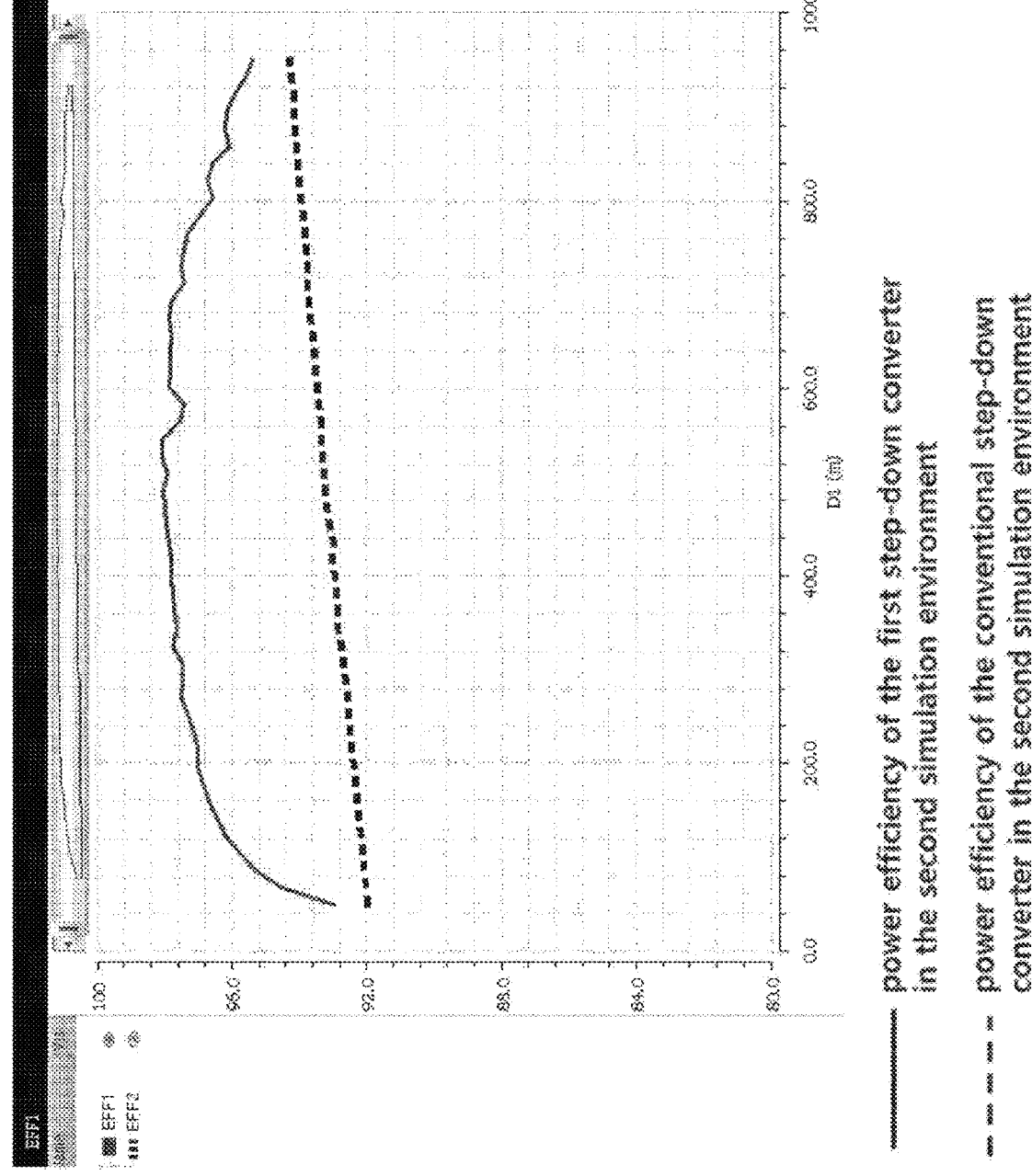
power efficiency of the first step-down converter
in the second simulation environment
power efficiency of the conventional step-down
converter in the second simulation environment

START

STEP DOWN INPUT POWER TO TRANSFER CURRENT TO OUTPUT UNIT, AND WHEN CURRENT IS TRANSFERRED TO OUTPUT UNIT, CURRENT IS TRANSFERRED TO OUTPUT UNIT THROUGH TWO DIFFERENT CURRENT TRANSFER PATHS ~S1110-1

END

[Fig23]
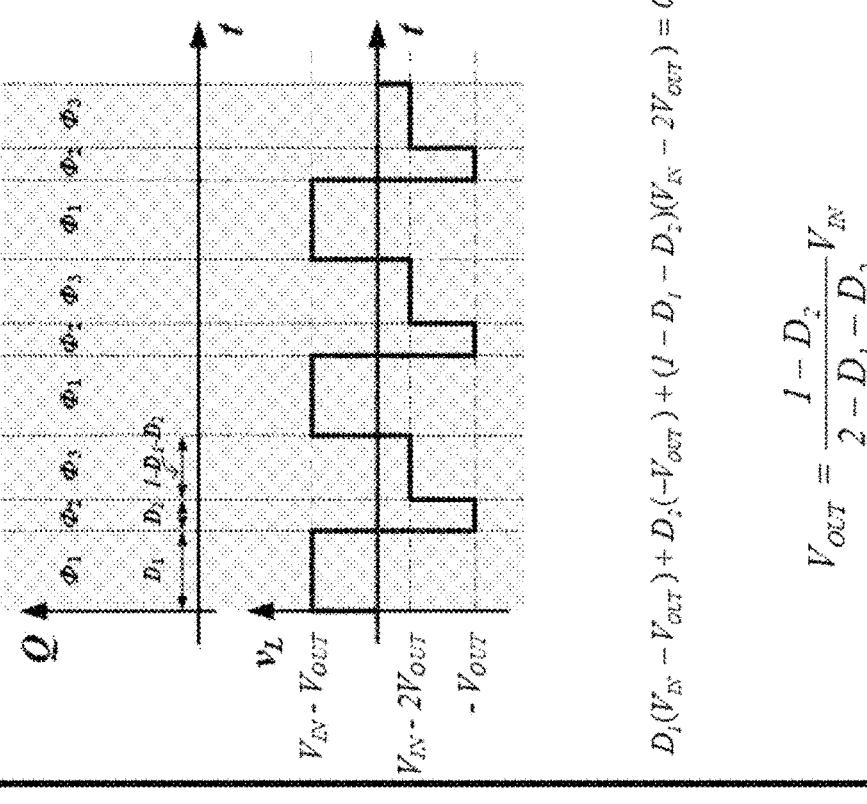
$$D_1(V_{IN} - V_{OUT}) + D_2(-V_{OUT}) + (I - D_1 - D_2)(V_{IN} - 2V_{OUT}) = 0$$
$$V_{OUT} = \frac{I - D_2}{2 - D_1 - D_2} V_{IN}$$
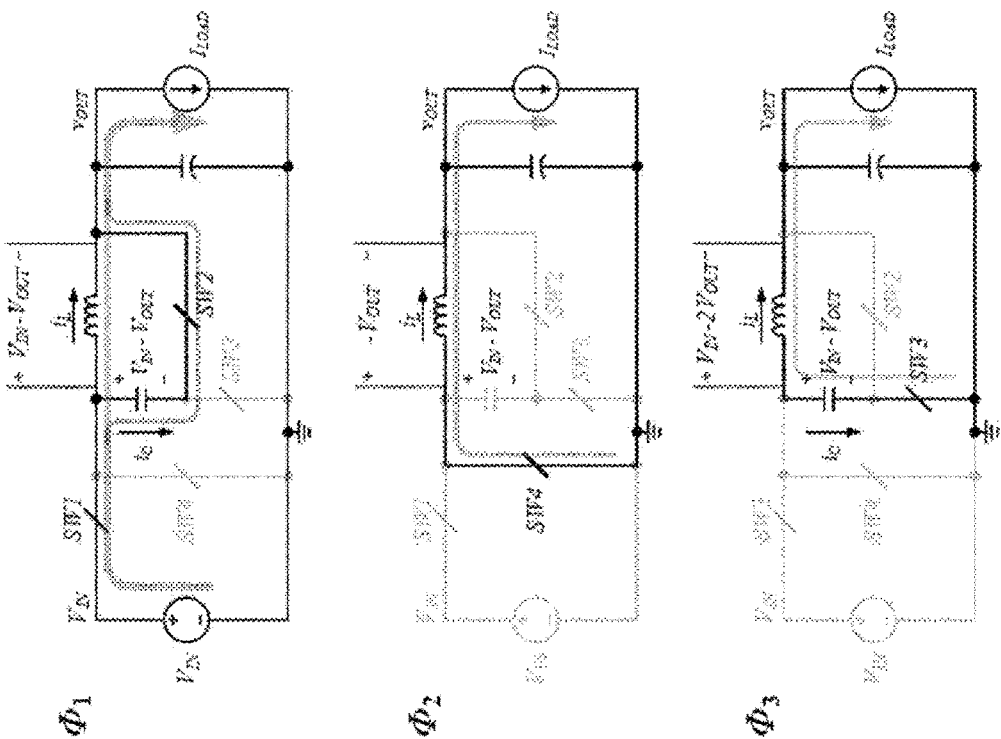

START

STEP DOWN INPUT POWER TO TRANSFER CURRENT TO OUTPUT UNIT, AND WHEN CURRENT IS TRANSFERRED TO OUTPUT UNIT, CURRENT IS TRANSFERRED TO OUTPUT UNIT THROUGH TWO DIFFERENT CURRENT TRANSFER PATHS

S310-1

RETURN

——— : CURRENT PATH OF $\Phi_1$

— · — · — : CURRENT PATH OF $\Phi_2$

<u>700-1</u>

————— : CURRENT PATH OF $\Phi_1$

— · — · — : CURRENT PATH OF $\Phi_2$

——— · ——— : CURRENT PATH OF $\Phi_3$

<u>800-1</u>

810        830        850

——— : CURRENT PATH OF $\Phi_1$

— — — : CURRENT PATH OF $\Phi_2$ 900-1

910            930            950

——————— : CURRENT PATH OF $\Phi_1$
— · — · — : CURRENT PATH OF $\Phi_3$
———·——— : CURRENT PATH OF $\Phi_2$
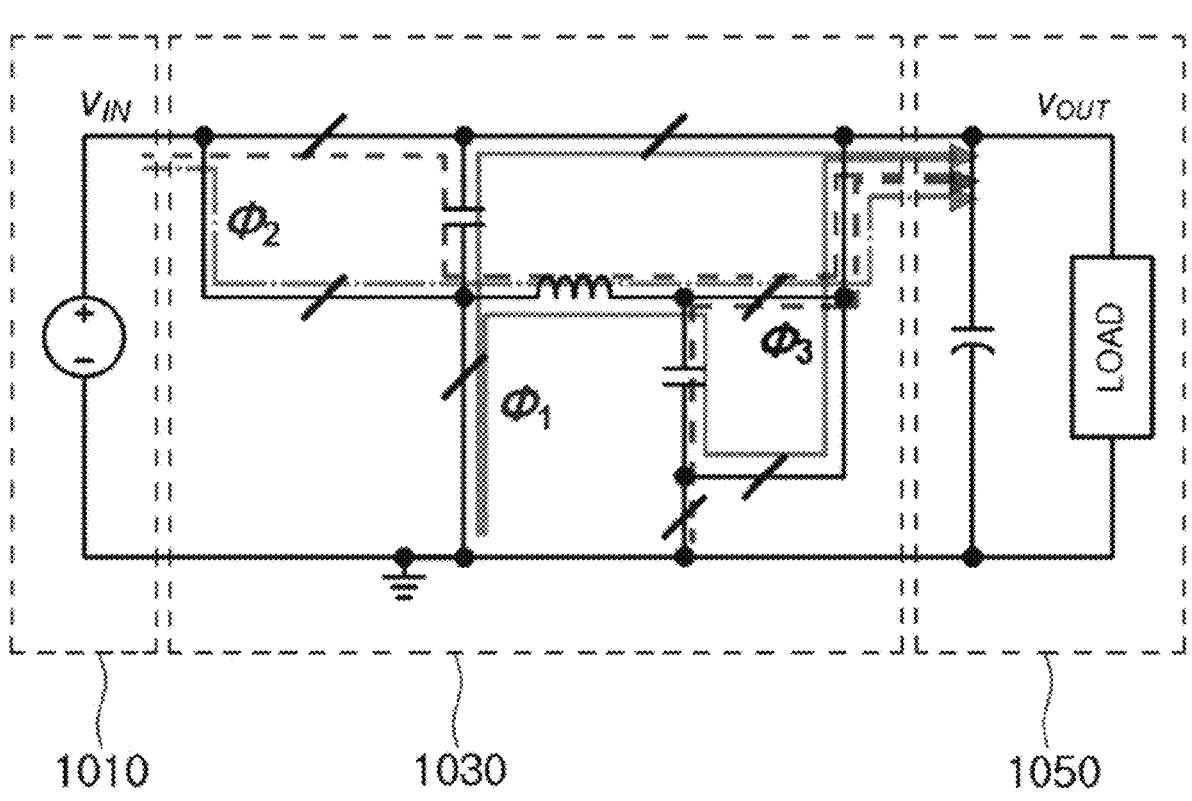
Fig. 39

——— : CURRENT PATH OF $\Phi_1$

— — — : CURRENT PATH OF $\Phi_2$

Fig. 41

— : CURRENT PATH OF $\Phi_1$

— — : CURRENT PATH OF $\Phi_3$

······ : CURRENT PATH OF $\Phi_2$

—————— : CURRENT PATH OF $\Phi_1$

– – – – – : CURRENT PATH OF $\Phi_2$

CURRENT PATH OF $\Phi_1$

CURRENT PATH OF $\Phi_3$

CURRENT PATH OF $\Phi_2$

[Fig60]
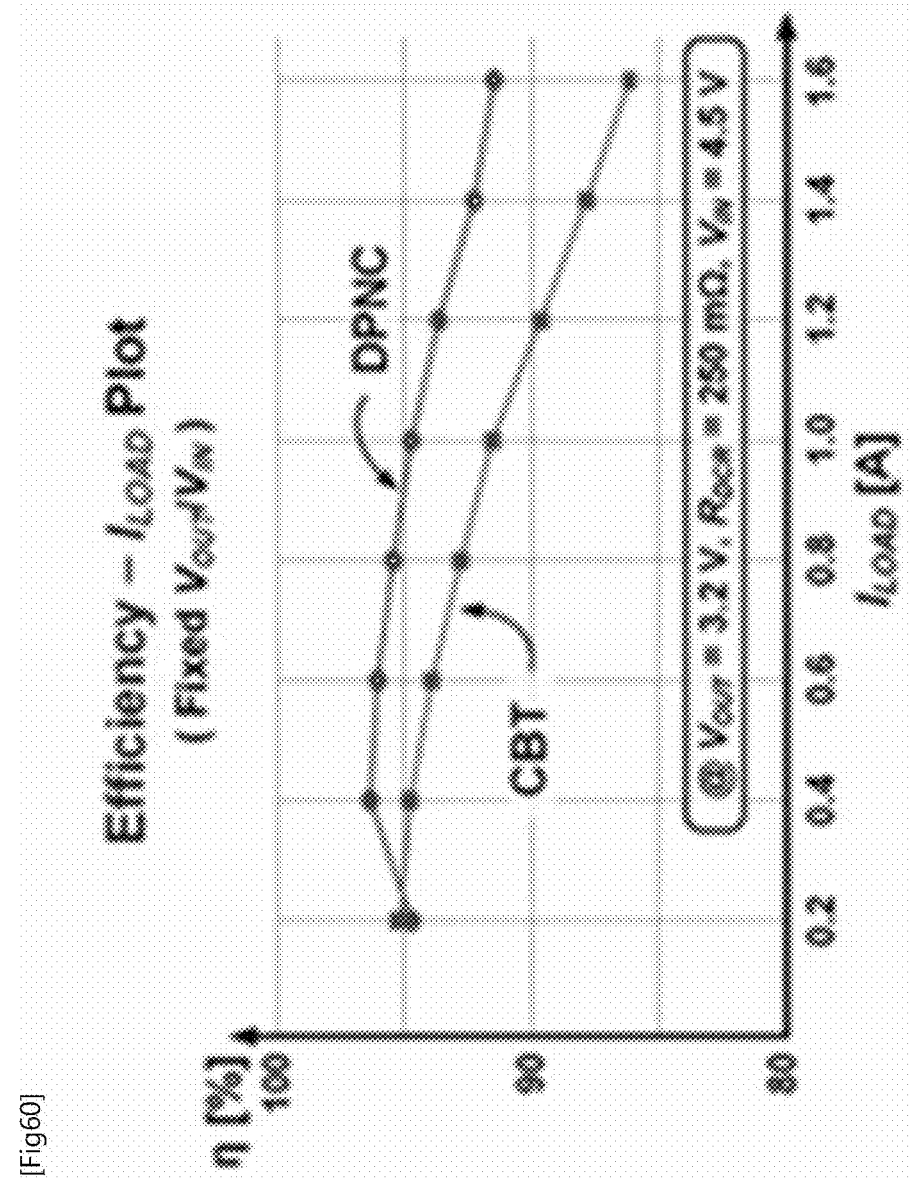

[Fig62]

MULTI-PATH CONVERTER AND CONTROL METHOD THEREFOR

CROSS-REFERENCE TO RELATED APPLICATIONS

This is a continuation of U.S. application Ser. No. 17/843,689 filed Jun. 17, 2022, which is a continuation of U.S. application Ser. No. 16/591,145 filed Oct. 2, 2019, which is a continuation-in-part of PCT/KR2018/003301 filed Mar. 21, 2018, claiming priority based on Korean Patent Application No. 10-2017-0042876 filed Apr. 3, 2017, Korean Patent Application No. 10-2017-0083619 filed Jun. 30, 2017 and Korean Patent Application No. 10-2018-0015712 filed Feb. 8, 2018, of which the disclosures are incorporated herein in their entireties.

TECHNICAL FIELD

The present invention relates to a converter having multiple paths and a control method thereof, and more specifically, to a converter for converting a voltage of input power to output the converted voltage to a load, and a control method thereof.

BACKGROUND ART

As the number of applications applied to electrical and electronic devices is increased and functions of the electrical and electronic devices are increased, power consumed by the devices is increasing continuously. Accordingly, power management circuits that supply power required by the devices should be designed to have high power efficiency characteristics in high power applications. This is because a power management circuit having high power efficiency not only increases a usage time of a device but also reduces heat generated in the power management circuit in the device.

The conventional power management circuits are mainly designed through two methods. One method is a switched capacitor or charge pump method using a capacitor, and the other method is a switched inductor method using an inductor.

First, since the switched capacitor method does not use a bulky inductor and uses a capacitor that is advantageous in being embedded in a chip as compared with an inductor, there is a great advantage that an area of a printed circuit board (PCB) may be reduced. However, since a practicable voltage conversion ratio ($V_{OUT}/V_{IN}$) is discontinuous in the switched capacitor method, a high efficiency characteristic may be achieved only at a specific voltage conversion ratio. Therefore, in order to increase a practicable voltage conversion ratio to implement a high efficiency characteristic in a wide voltage range, a power management integrated circuit (PMIC) should be designed as a reconfigurable type, which increases complexity of a system. In addition, when a load current ($I_{LOAD}$) is increased, since capacitance of a capacitor constituting a converter should be increased, the capacitor may not be integrated in an integrated circuit (IC), and thus, a plurality of external capacitors may be required. As a result, the switched capacitor method may consume a larger area of a PCB as compared with the switched inductor method. Therefore, the switched capacitor method is mainly used in low power applications.

On the other hand, a power management circuit using the switched inductor method is bulky and uses an inductor that is relatively expensive as compared with other external devices, there are many advantages to the switched capacitor method in that a practicable voltage conversion ratio is continuous and a high efficiency characteristic is implemented in a very wide range. In addition, since there is no additional external device even when a load current is increased, the power management circuit using the switched inductor method is indispensably used in various modern devices of which power consumption is increasing.

FIG. 1 is a diagram illustrating an example of the conventional power management circuit using the switched inductor method. FIG. 2A and FIG. 2B show diagrams for describing a method of improving efficiency of the conventional power management circuit shown in FIG. 1.

As shown in FIG. 1, when a load current $I_{LOAD}$ is increased, a current IL flowing in an inductor is also increased. A parasitic resistor ($R_{DCR}$) connected in series with the inductor is inevitably included in the inductor, and as a level of the current flowing in the inductor is increased, power loss caused by the parasitic resistor is considerably increased. The power loss limits efficiency characteristics of the power management circuit and causes heat generation. Therefore, in order to increase power efficiency, it is preferable to use an inductor having a small parasitic resistance value as shown in FIG. 2A. In this case, a volume or unit cost of the inductor is increased.

In particular, in the case of a power management circuit to be included in a mobile device that is being continuously miniaturized, a volume thereof is also restricted according to a size of a device to be manufactured. Thus, an inductor indispensably used in a switched-inductor power management circuit is also limited to an ultra-small inductor (having a height ranging from 1 mm to 1.5 mm). That is, as described above, it is impossible to use a bulky inductor which has a small parasitic resistance value. Therefore, it is necessary to use a smaller inductor for the same inductance to satisfy volume characteristics of a mobile device, but a small inductor includes a very large parasitic resistor. To improve efficiency under such conditions, as shown in FIG. 2B, there is a method of using a plurality of inductors in parallel. This method reduces a level of a current flowing in each inductor, thereby reducing the total current loss caused by a parasitic resistor. However, since the method requires the plurality of inductors, a volume and a unit cost are increased. Also, a circuit for controlling a current to be divided to each inductor is additionally required, thereby increasing complexity of a system.

In addition, in the case of the conventional buck-boost converter and boost converter, since a current is not supplied to a load while a current in the inductor is built-up, a current supplied to the load is discontinuous. Accordingly, a level of the current in the inductor should be much greater than that of a load current, which requires an inductor with a high saturation current value. In addition, the discontinuous supplying of a current generates a large ripple voltage at an output voltage terminal and causes a switching spike.

DISCLOSURE

Technical Problem

The present disclosure is directed to providing a multi-path converter in which a current transfer path using a capacitor is used in addition to a current transfer path using an inductor. As such, a current flows through a plurality of parallel paths to an output terminal (i.e., load), thereby reducing a total root mean square (RMS) current flowing in an inductor, and a control method thereof.

Technical Solution

The exemplary embodiments may provide a converter including: an input unit; an output unit; and a conversion unit configured to convert a voltage of power input through the input unit and transfer the converted voltage to the output unit by transferring a current to the output unit through a plurality of parallel current transfer paths including at least one inductor and at least one capacitor.

The plurality of parallel current transfer paths may include a first current transfer path including at least one inductor and a second current transfer path including at least one capacitor.

The plurality of parallel current transfer paths may include more than one of the first current transfer path or more than one of the second current transfer path.

The first current transfer path may further includes at least one capacitor.

The conversion unit may periodically perform an operation including a plurality of conversion operation modes, and the conversion unit may divide and transfer the current to the output unit through the plurality of parallel current transfer paths in at least one of the plurality of conversion operation modes.

The conversion unit may function as one of a step-down converter, a step-up converter, and a step-up-and-down converter.

The converter may include a plurality of conversion units which convert voltages concurrently in different conversion operation modes.

The converter may include a plurality of output units including the output unit, and the conversion unit may convert the power input through the input unit to transfer the converted power to each of the plurality of output units.

The conversion unit may perform a function of a step-up converter with respect to some output units of the plurality of output units and may perform a function of a step-down converter with respect to remaining output units of the plurality of output units.

The converter may include a plurality of conversion units including the conversion unit, and the plurality of conversion units may be connected in series, parallel, or series-parallel with each other.

The conversion unit may transfer the current to the output unit while the voltage of the input power is converted.

The exemplary embodiment may provide a control method of a multi-path converter including converting a voltage of power input through the input unit by transferring a current to the output unit through a plurality of parallel current transfer paths using at least one inductor and at least one capacitor.

The plurality of parallel current transfer paths may include a first current transfer path including at least one inductor and a second current transfer path including at least one capacitor.

The parallel current transfer paths may include more than one of the first current transfer path or more than one of the second current transfer path.

The first current transfer path may further include at least one capacitor.

The transferring may include periodically performing an operation including a plurality of conversion operation modes, and the current is divided and transferred to the output unit through the plurality of parallel current transfer paths in at least one of the plurality of conversion operation modes.

The current may be transferred to the output unit while the voltage of the input power is converted.

According to an exemplary embodiment, a step-down converting method includes operating a step-down converter including a power source, an inductor, a capacitor, and a load in a multi-path manner and operating the step-down converter in a single-path manner. In the operating in the multi-path manner, a current is transferred to the load through a plurality of parallel current transfer paths, and in the operating in the single-path manner, a current is transferred to the load through a single current transfer path.

Advantageous Effects

According to the exemplary embodiments, since a current is divided and supplied to a load through an additional current transfer path using a capacitor, a root mean square (RMS) current flowing in an inductor can be reduced as compared with when a static current is supplied to the load (i.e., output terminal) by using only an inductor. Therefore, when a level of a load current is increased, it is possible to greatly reduce power loss caused by a parasitic resistor of an inductor which has the greatest power consumption in a power management integrated circuit (PMIC) for mobile applications. As such, it is possible to overcome a limitation of power efficiency which is not overcome by any conventional power management circuit technology.

According to the exemplary embodiments, since a capacitor having a relatively small volume and low unit cost as compared with an inductor is used as an element for distributing a current, it is possible to reduce a volume and a cost. Furthermore, a capacitor has a very low parasitic resistance value of about several mOhms as compared with an inductor which includes a serial parasitic resistor having a very high parasitic resistance value of about several hundred mOhms. Thus, power loss occurring in an additional current path using a capacitor is less than power loss in a current path using an inductor. In summary, an inductor structure according to the exemplary embodiments has a high efficiency characteristic. In addition, the inductor structure can increase a usage time of a device, greatly reduce heat generated in a power management circuit, and also reduce consumption of an area and volume of a printed circuit board (PCB).

Furthermore, according to the exemplary embodiments, since a current is divided and supplied to a load through an additional current transfer path other than a current path through which a current flows to the load, power loss can be reduced as compared with a conventional step-down converter, thereby increasing efficiency. Consequently, according to the exemplary embodiments, under a condition of having the same efficiency as the conventional step-down converter, it is possible to increase efficiency as compared with the conventional step-down converter and also provide an output voltage in the same range as that of the conventional step-down converter.

According to the exemplary embodiments, a partial current is allowed to flow to an output terminal even while input power is stepped up, thereby reducing the current in the inductor to improve efficiency, reducing a ripple, and reducing switching noise due to a continuous current flow. Therefore, according to the exemplary embodiments, it is possible to prevent a reduction in performance of a load connected to an output terminal of a step-up converter, that is, performance of a block to which a high voltage formed by the step-up converter is applied.

DESCRIPTION OF DRAWINGS

FIG. 15 shows diagrams illustrating an example of the first step-down converter with the dual-path according to the exemplary embodiment.

FIG. 16 shows graphs each obtained by testing the first step-down converter with the dual-path according to the exemplary embodiment in an environment with a duty ratio of 0.4.

FIG. 17 is a graph obtained by testing the first step-down converter with the dual-path according to the exemplary embodiment in a first simulation environment.

FIG. 18 is a graph obtained by testing the first step-down converter with the dual-path according to the exemplary embodiment in a second simulation environment.

FIG. 23 is a diagram illustrating an example of the second step-down converter with the dual-path according to the exemplary embodiment.

FIG. 39 is a circuit diagram illustrating a configuration of a tenth step-down converter with a dual-path according to the exemplary embodiment.

FIG. 41 is a circuit diagram illustrating a configuration of a twelfth step-down converter with a triple-path according to the exemplary embodiment.

FIG. 60 is a graph showing a comparison between efficiencies when the second step-down converter shown in FIG. 21 is operated in a multi-path manner and a single-path manner.

MODES OF THE INVENTION

Hereinafter, exemplary embodiments of a converter with a multi-path and a control method thereof according to the exemplary embodiments will be described in detail with reference to the accompanying drawings.

A multi-path converter and a control method thereof according to an exemplary embodiment will be described with reference to FIGS. 3 to 11.

First, the multi-path converter according to the exemplary embodiment according to the present invention will be described with reference to FIG. 3.

Figure 1:
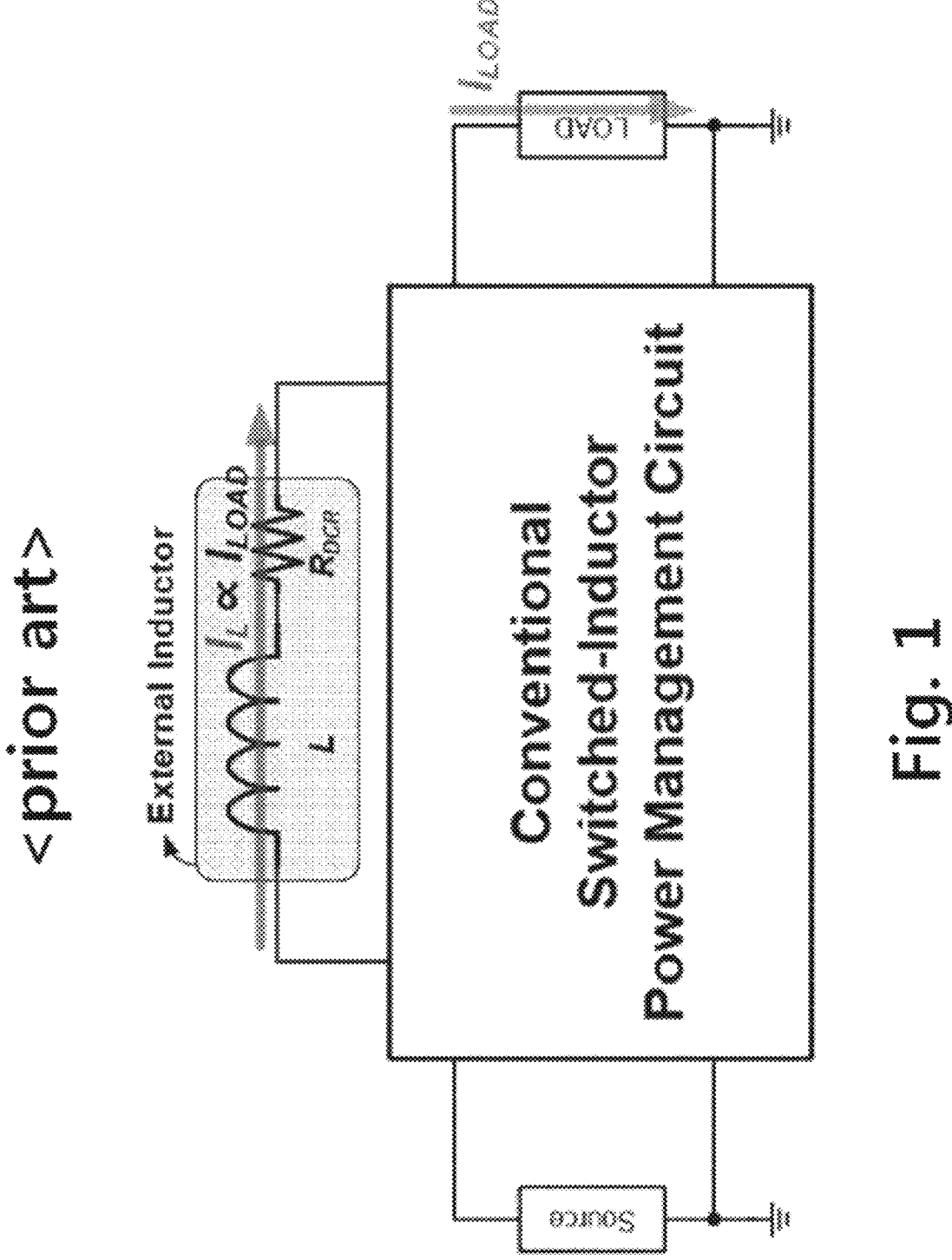
FIG. 1 is a diagram illustrating an example of a conventional power management circuit of a switched inductor method.
Figure 2A:
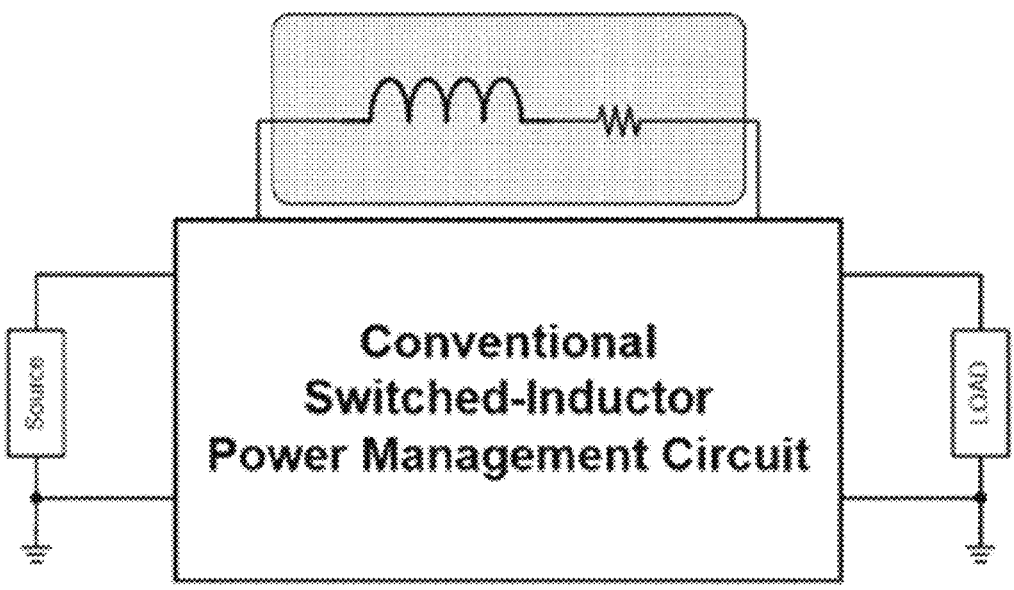
FIGS. 2A and 2B show diagrams for describing a method of improving efficiency of the conventional power management circuit shown in FIG. 1.
Figure 2B:
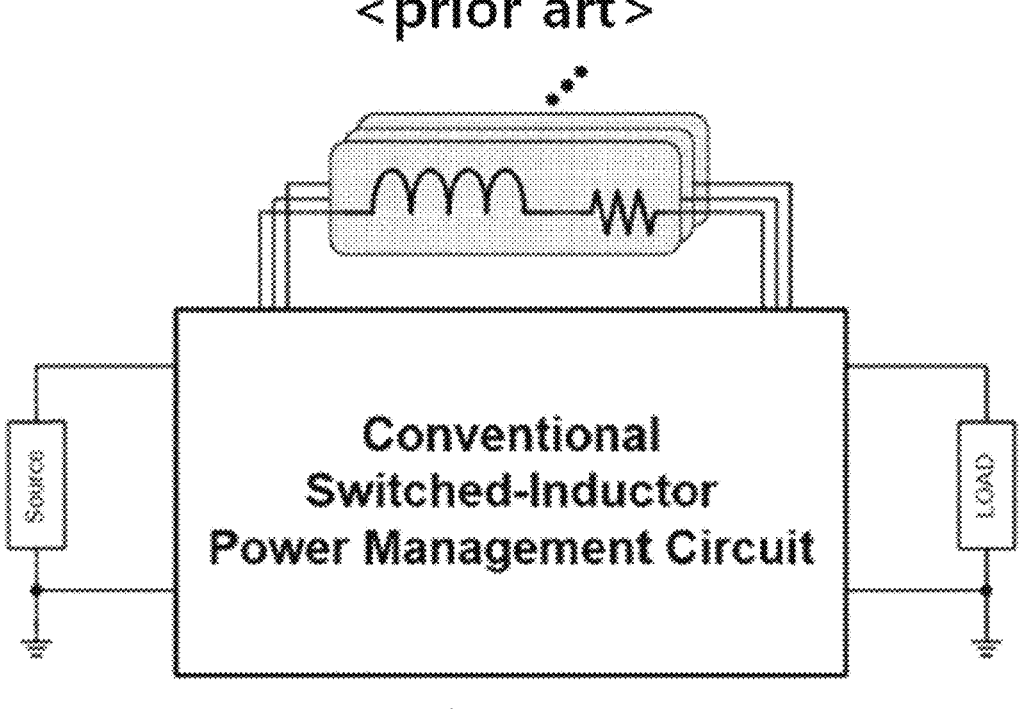
Figure 3:
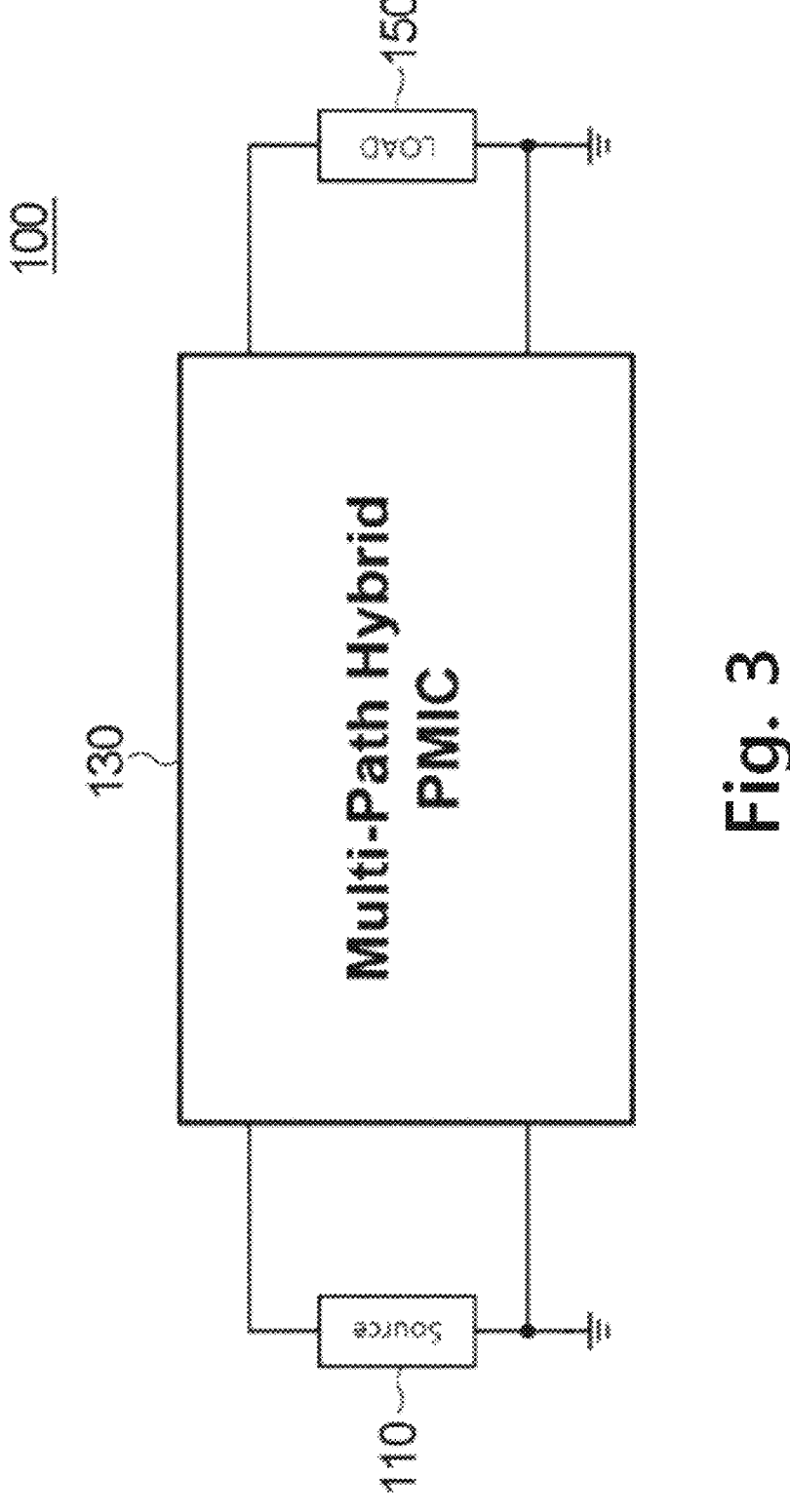
FIG. 3 is a block diagram illustrating a converter with a multi-path according to an exemplary embodiment.

FIG. 3 is a block diagram illustrating the multi-path converter according to the exemplary embodiment.

Referring to FIG. 3, in a converter 100 having multiple paths (hereinafter, referred to as a "converter") according to the exemplary embodiment, a current is divided and transferred to an output terminal through a plurality of parallel current transfer paths using inductors and capacitors. That is, the converter 100 uses a current transfer path using a capacitor in addition to a current transfer path using an inductor, a current flows through a plurality of parallel paths so as to be output to an output terminal (load), thereby reducing a total root mean square (RMS) current flowing in the inductor.

To this end, the converter 100 may include an input unit 110 to which power is input, a conversion unit 130 which converts (steps down or up) a voltage of the input power, and an output unit 150 which receives and transfers the converted power to an external device.

Here, the input unit 110 may include an alternating current (AC) power source, a direct current (DC) power source, a power supply source (various voltage or current power sources), and the like.

In addition, the output unit 150 may include any type of load that may be modeled using various passive elements including a resistor, a capacitor, and an inductor. That is, any type of load using a conventional power management integrated circuit (PMIC) may be included in the output unit 150.

The conversion unit 130 may include functions of all conventional converters. For example, the conversion unit 130 may perform a function of a step-down converter or buck converter in which a voltage of an output terminal is lower than a voltage of an input terminal. Also, the conversion unit 130 may perform a function of a step-up converter or boost converter in which a voltage of an output terminal is higher than a voltage of an input terminal. The conversion unit 130 may also perform a function of a step-up-and-down converter or buck-boost converter in which a voltage of an output terminal is lower or higher than a voltage of an input terminal.

The conversion unit 130 divides and transfers a current to the output unit through a plurality of current transfer paths. For example, the conversion unit 130 may divide and transfer a current to the output unit 150 through the plurality of current transfer paths including a first current transfer path using an inductor and a second current transfer path using a capacitor. Here, in the plurality of current transfer paths, at least one of the first current transfer path and the second current transfer path may include a plurality of current transfer paths. For example, the plurality of current transfer paths may include a current transfer path using an inductor, a current transfer path using a first capacitor, and a current transfer path using a second capacitor. Of course, one current transfer path may use one inductor, one capacitor, a plurality of inductors, a plurality of capacitors, or a combination of at least one inductor and at least one capacitor.

In addition, when the conversion unit 130 repeatedly performs an operation including a plurality of conversion operation modes (for example, a plurality of step-down operation modes or a plurality of step-up operation modes), the conversion unit 130 may divide and transfer a current to the output unit 150 through the plurality of current transfer paths in an entire section in which the plurality of conversion operation modes are driven or in a partial section in which some conversion operation modes of the plurality of conversion operation modes are driven.

As described above, in the converter 100 according to the exemplary embodiment, a current may be divided and supplied to a load through an additional parallel current transfer path using a capacitor unlike a conventional converter in which a current is supplied to a load by using only an inductor. That is, according to the converter 100, a DC current level of an inductor may be reduced. When the converter 100 performs a function of a step-down converter, a ripple current of an inductor may be reduced. In addition, an inductor and a capacitor of the converter 100 may supply a static current to the load (i.e., output terminal). In addition, as compared with an inductor, as can be confirmed in Table 1, a capacitor includes a much smaller parasitic resistor and has a relatively small volume and low unit cost. Therefore, as compared with only using a plurality of inductors, adding a capacitor may reduce a current level flowing in an inductor. Thus, it is possible to considerably reduce power loss occurring in a parasitic resistor and overcome a limitation of power efficiency which is not overcome by any conventional power management circuit technology. In addition, by using a capacitor having a relatively small volume and low unit cost, it is possible to reduce the volume and cost of inductor that is relatively large and expensive. Accordingly, it is possible to greatly reduce heat generated in a power management circuit, increase a usage time of a device, and reduce consumption of an area and volume of a printed circuit board (PCB).

130, one output unit 150, and a plurality of input units 110. Here, an output voltage may have various characteristics such as step-down, step-up, and step-down-and-up.

A plurality of inductors, a plurality of capacitors, and/or a plurality of switches may be included in the conversion unit 130. Here, examples of the input unit 110 may include, but are not limited to, an AC power source, a DC power source, a power supply source (various voltage or current power sources), and the like. In addition, the output unit 150 may include any type of load that may be modeled using various passive elements including a resistor, a capacitor, and an inductor, that is, any type of load using the conventional PMIC.

Figure 5:
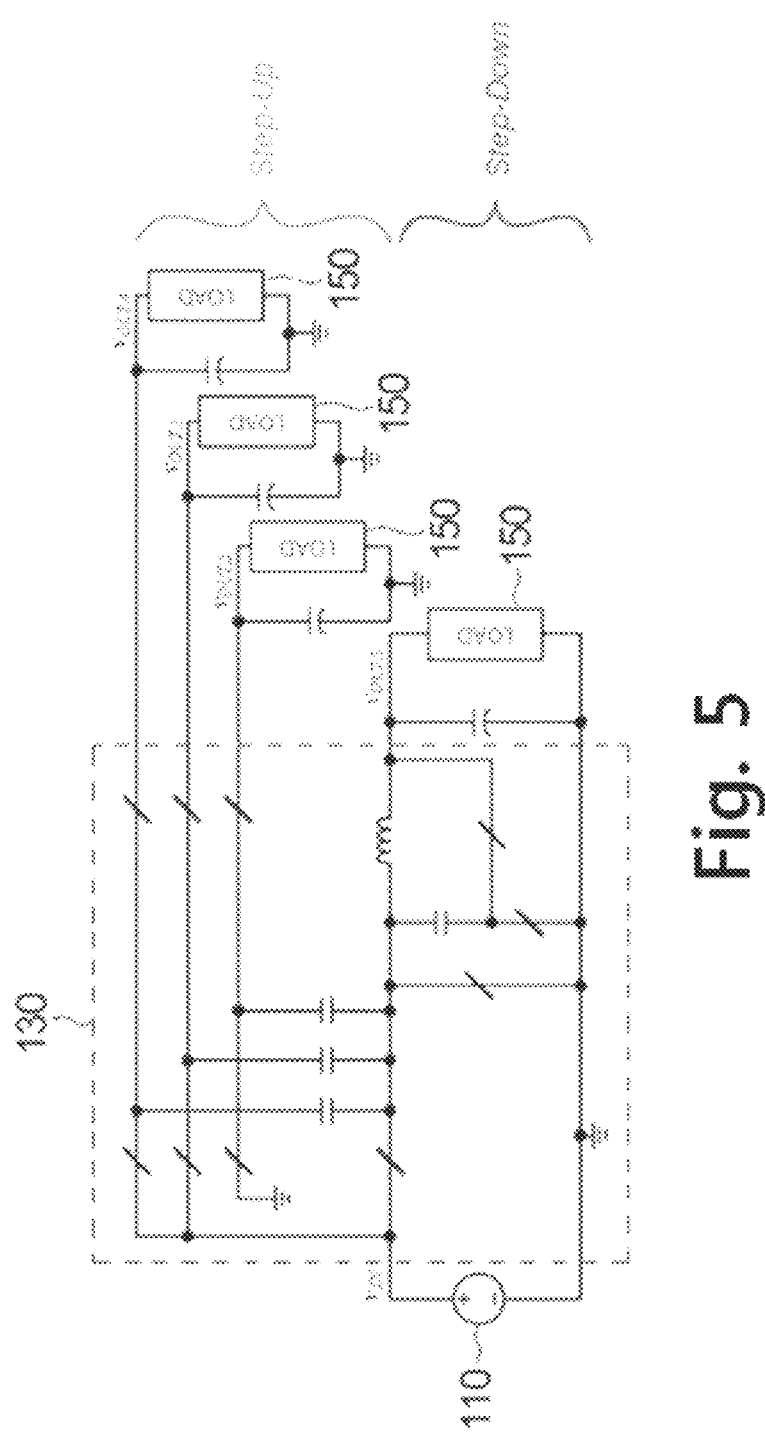
FIG. 5 is a diagram illustrating another extended example of the multi-path converter shown in FIG. 3.

FIG. 5 is a diagram illustrating another example of the multi-path converter shown in FIG. 3.

Referring to FIG. 5, a converter 100 according to the exemplary embodiment may include one input unit 110, one conversion unit 130, and a plurality of output units 150.

Here, an output voltage may have various characteristics such as step-down, step-up, and step-down-and-up.

A plurality of inductors, a plurality of capacitors, and/or a plurality of switches may be included in the conversion unit 130. In addition, examples of the input unit 110 may include, but are not limited to, an AC power source, a DC power source, a power supply source (various voltage or current power sources), and the like. Furthermore, the output unit 150 may include any type of load that may be modeled using various passive elements including a resistor, a capacitor, and an inductor. That is, any type of load using the conventional PMIC may be included in the output unit 150.

Figure 6:
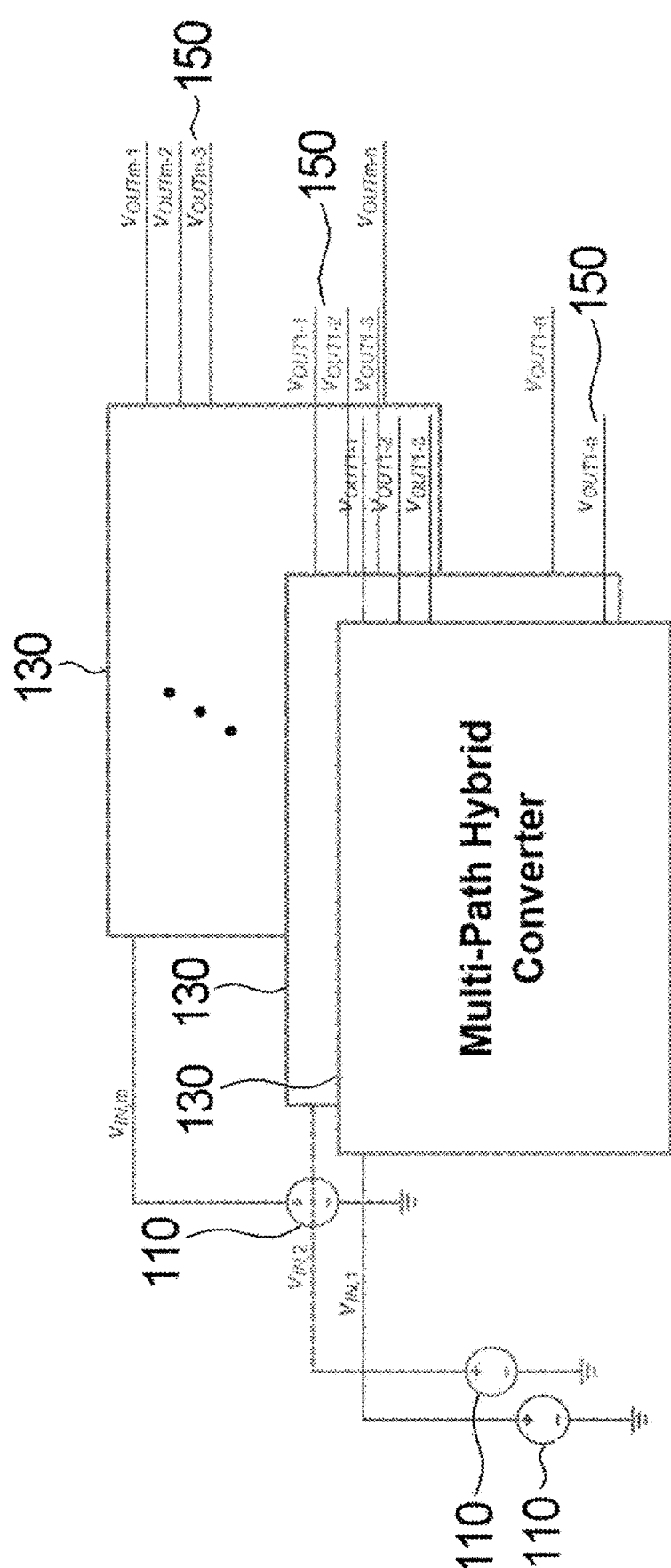
FIG. 6 is a diagram illustrating still another extended example of the multi-path converter shown in FIG. 3.

FIG. 6 is a diagram illustrating still another example of the multi-path converter shown in FIG. 3.

TABLE 1

| | | | | | | |
|---|---|---|---|---|---|---|
| | | | List of External Inductors | | | |
| | Inductance (uH) | Saturation current rating (A) | Dimension [L × W × H] (mm) | DCR (mΩ) | Cost($) @1000 | Type |
| Bulky size | 4.7 | 25.4 | 11.8 × 11.8 × 10.0 | 5.7 | 2.05 | XAL1010-472 |
| and small | 4.7 | 12 | 13.0 × 13.0 × 6.0 | 6.1 | 0.74 | SER1360-472 |
| DCR | 2.2 | 10 | 11.2 × 11.2 × 5.2 | 4.0 | 1.15 | SER1052-222 |
| | 2.2 | 19.6 | 8.0 × 8.0 × 7.0 | 6.3 | 1.45 | XAL7070-222 |
| Small | 4.7 | 0.57 | 2.2 × 1.45 × 1.0 | 680 | 0.29 | PFL2010-472 |
| size, large | 4.7 | 1.1 | 5.0 × 5.0 × 1.0 | 175 | 0.49 | LPS5050-472 |
| DCR, and | 2.2 | 1.4 | 3.2 × 2.3 × 1.5 | 130 | 0.28 | PFL3515-222 |
| cheap | 2.2 | 2.7 | 5.0 × 5.0 × 1.5 | 90 | 0.46 | LPS5015-222 |
| price | 2.2 | 0.79 | 2.2 × 1.45 × 1.0 | 465 | 0.29 | PFL2010-222 |
| | 2.2 | 1.6 | 5.0 × 5.0 × 1.0 | 100 | 0.49 | LPS5010-222 |

| | | | | | | |
|---|---|---|---|---|---|---|
| | | | List of External Capacitors | | | |
| | Capacitance (uF) | Rated Voltage [DC] (V) | Dimension [L × W × H] (mm) | ESR (mΩ) | Cost($) @1000 | Type |
| Small | 22 | 10 | 2.0 × 1.25 × 0.85 | 2.6 | 0.14 | C2012X5R1A226M085AC |
| size, small | 22 | 10 | 2.0 × 1.25 × 1.25 | 2.3 | 0.16 | C2012X5R1A226K125AB |
| ESR, and | 10 | 25 | 2.0 × 1.25 × 0.85 | 2.7 | 0.05 | C2012X5R1C106K085AC |
| cheap | 10 | 25 | 2.0 × 1.25 × 1.25 | 2.1 | 0.08 | C2012X5R1E106K125AB |
| price | 10 | 6.3 | 1.6 × 0.8 × 0.8 | 4.4 | 0.13 | C1608X5R0J106K080AB |

Extended examples of the multi-path converter according to the exemplary embodiment will be described with reference to FIGS. 4 to 10.

Figure 4:
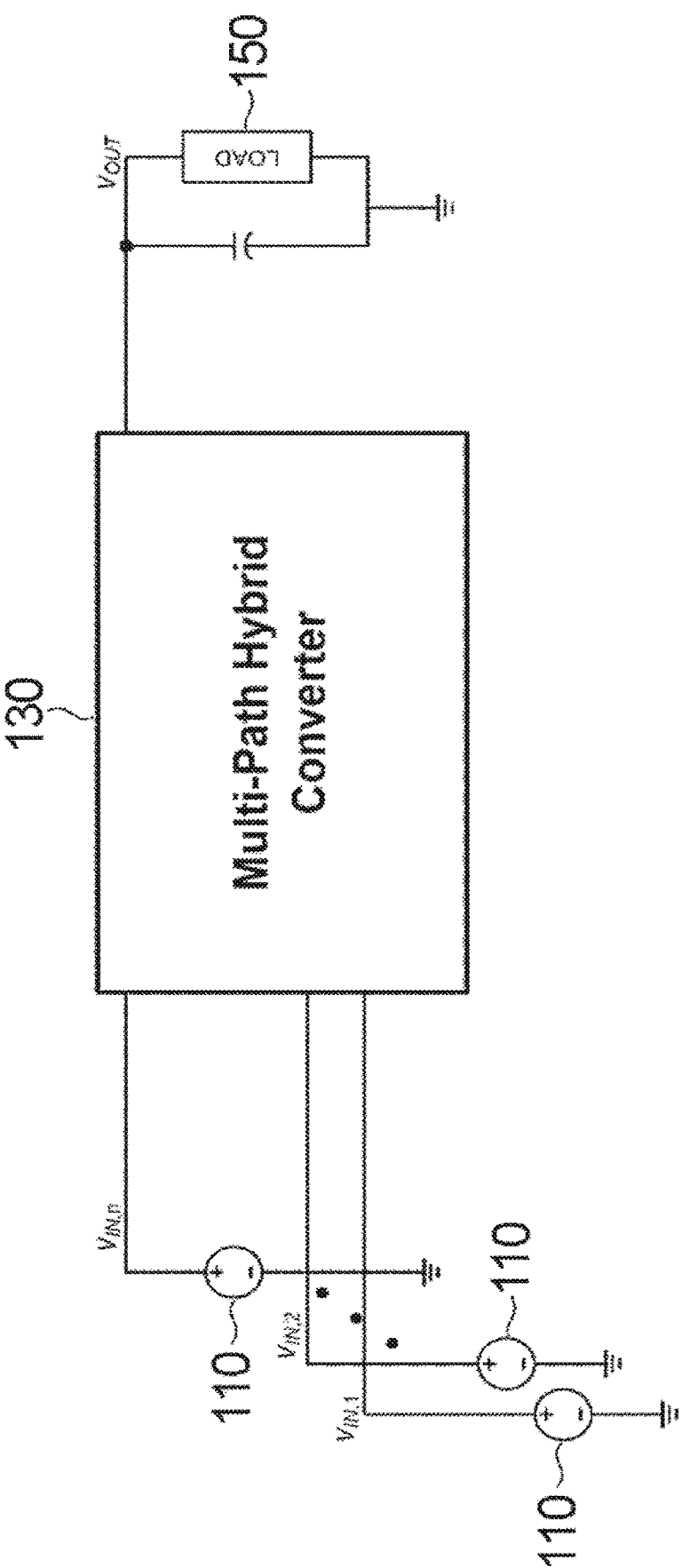
FIG. 4 is a diagram illustrating an extended example of the multi-path converter shown in FIG. 3.

FIG. 4 is a diagram illustrating an example of the multi-path converter shown in FIG. 3.

Referring to FIG. 4, a converter 100 according to the exemplary embodiment may include one conversion unit Referring to FIG. 6, a converter 100 according to the exemplary embodiment may include a plurality of input units 110, a plurality of conversion units 130, and a plurality of output units 150.

Here, an output voltage may have various characteristics such as step-down, step-up, and step-down-and-up.

A plurality of inductors, a plurality of capacitors, and/or a plurality of switches may be included in the conversion unit 130. In addition, the input unit 110 may include an AC power source, a DC power source, a power supply source (various voltage or current power sources), and the like. Furthermore, the output unit 150 may include any type of load that may be modeled using various passive elements including a resistor, a capacitor, and an inductor. That is, any type of load using the conventional PMIC may be included in the output unit 150.

Figure 7:
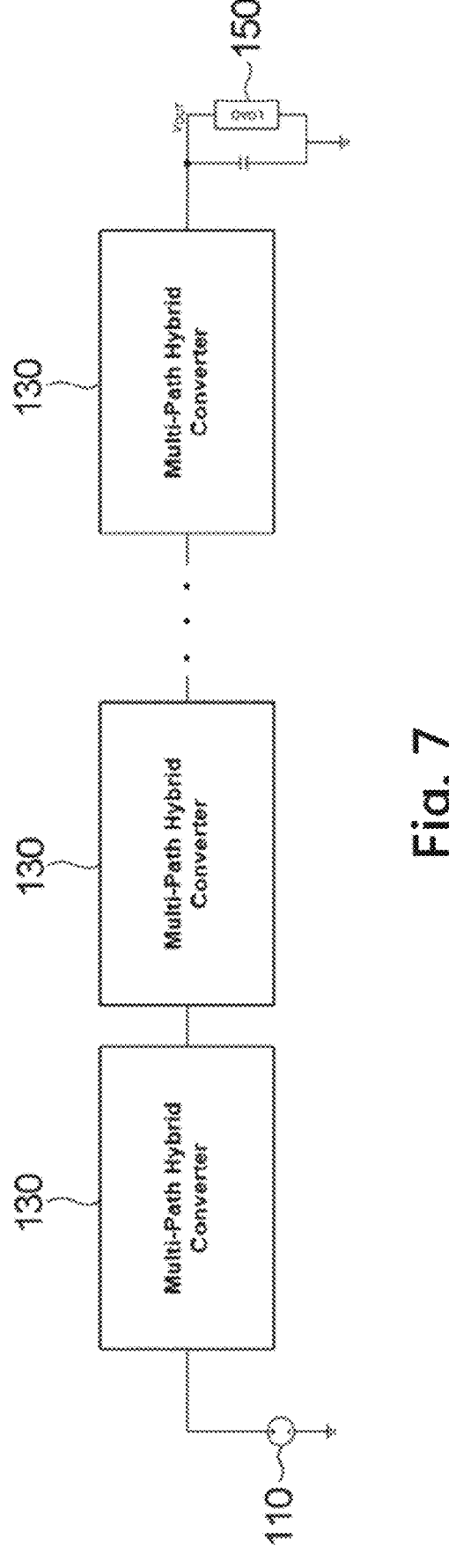
FIG. 7 is a diagram illustrating yet another extended example of the multi-path converter shown in FIG. 3.

FIG. 7 is a diagram illustrating yet another example of the multi-path converter shown in FIG. 3.

Referring to FIG. 7, a converter 100 according to the exemplary embodiment may include one input unit 110, one output unit 150, and a plurality of conversion units 130.

Here, the plurality of conversion units 130 may be connected in series with each other.

Figure 8:
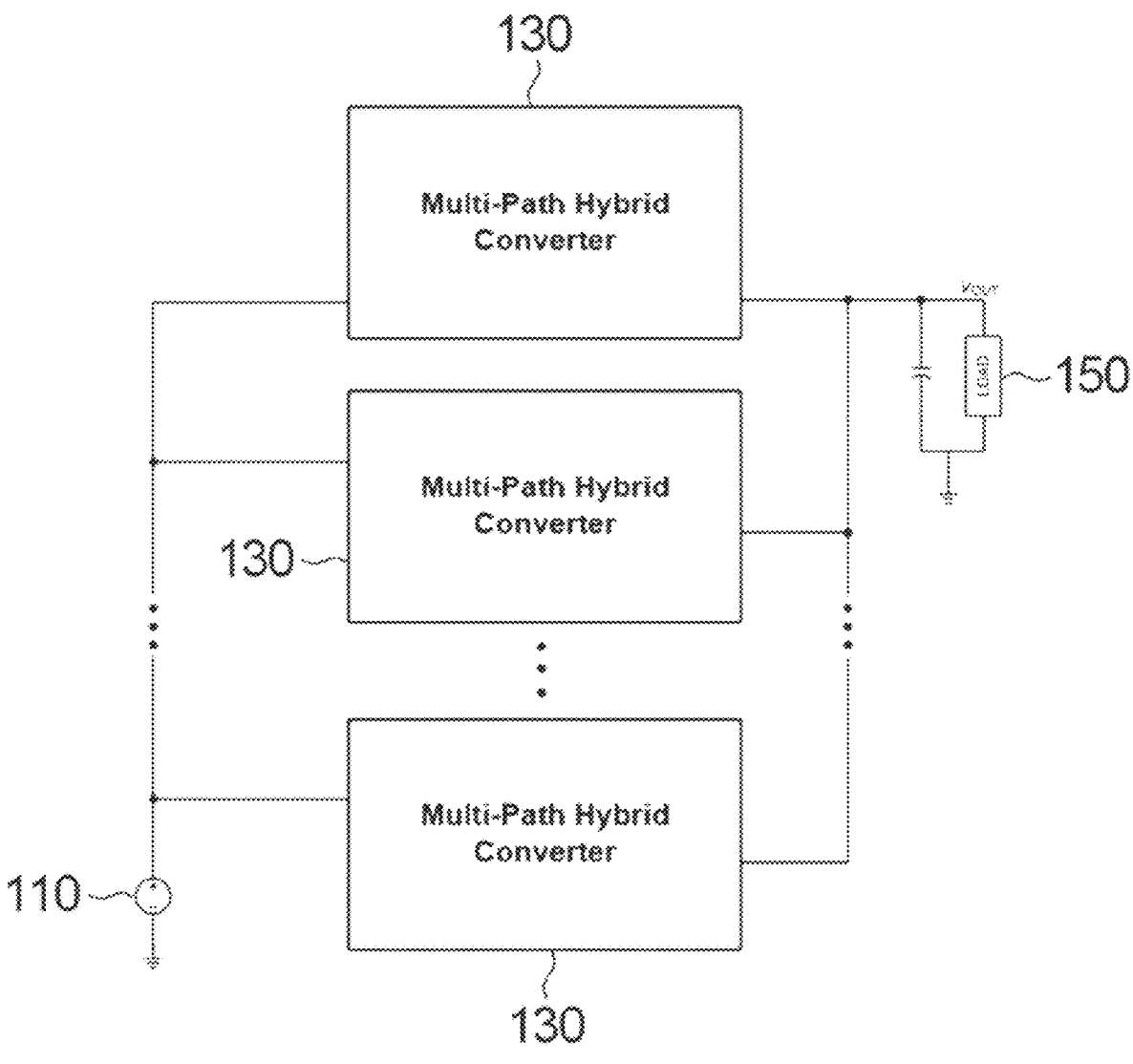
FIG. 8 is a diagram illustrating yet another extended example of the multi-path converter shown in FIG. 3.

FIG. 8 is a diagram illustrating yet another example of the multi-path converter shown in FIG. 3.

Referring to FIG. 8, a converter 100 according to the exemplary embodiment may include one input unit 110, one output unit 150, and a plurality of conversion units 130.

Here, the plurality of conversion units 130 may be connected in parallel with each other.

The conversion units 130 are arranged in parallel in FIG. 7 and arranged in parallel in FIG. 8, but the arrangement of the conversion units 130 is not limited thereto. For example, the plurality of conversion units 130 may be connected in series-parallel (combination of series and parallel) with each other according to exemplary embodiments.

Figure 9:
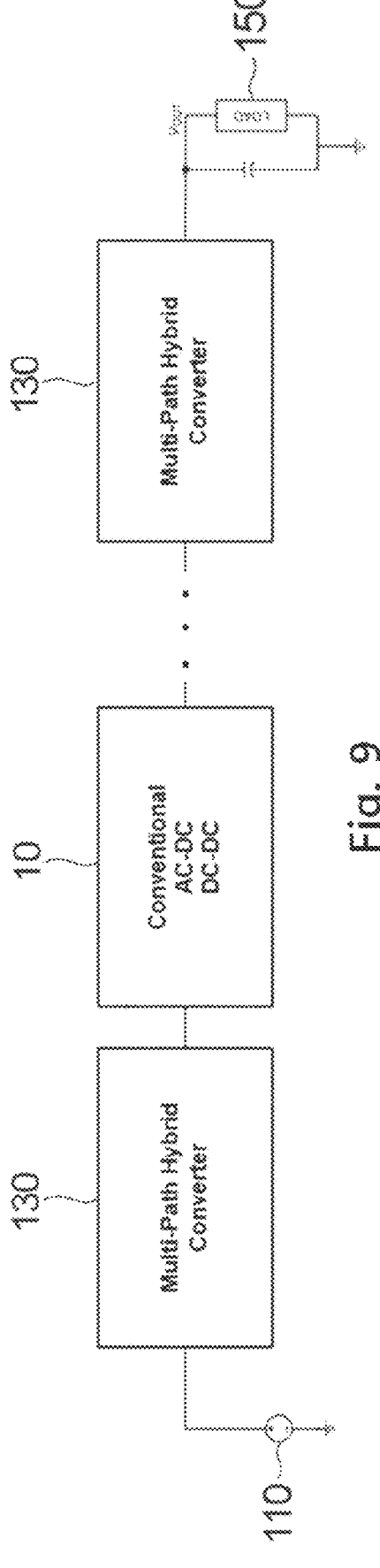
FIG. 9 is a diagram illustrating yet another extended example of the multi-path converter shown in FIG. 3.

FIG. 9 is a diagram illustrating yet another example of the multi-path converter shown in FIG. 3.

Referring to FIG. 9, a converter 100 according to the exemplary embodiment may include one input unit 110, one output unit 150, a plurality of conversion units 130, and a conventional converter module 10.

Here, the plurality of conversion units 130 and the conventional converter module 10 may be connected in series with each other.

Figure 10:
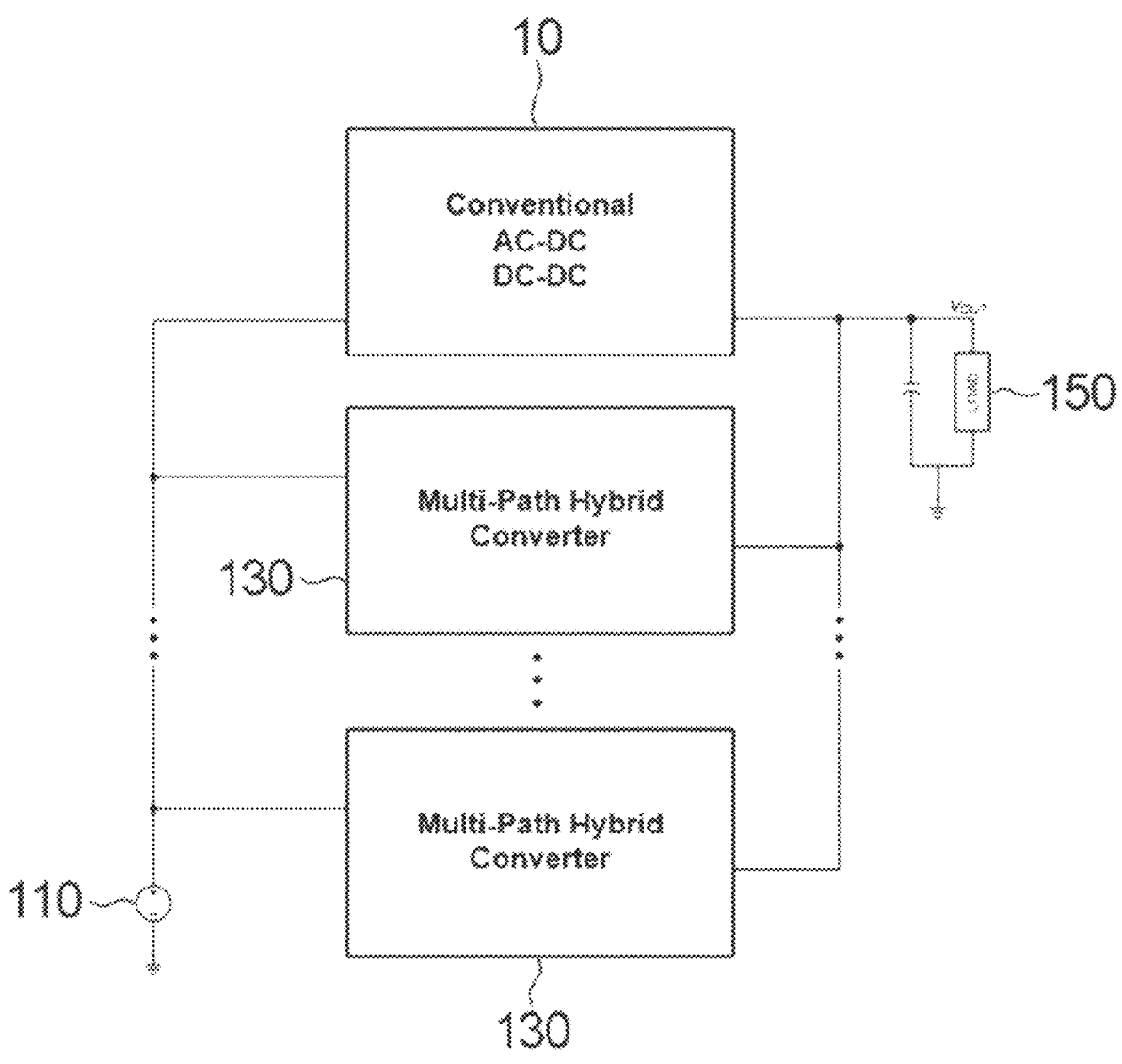
FIG. 10 is a diagram illustrating yet another extended example of the multi-path converter shown in FIG. 3.

FIG. 10 is a diagram illustrating yet another example of the multi-path converter shown in FIG. 3.

Referring to FIG. 10, a converter 100 according to the exemplary embodiment may include one input unit 110, one output unit 150, a plurality of conversion units 130, and a conventional converter module 10.

Here, the plurality of conversion units 130 and the conventional converter module 10 may be connected in parallel with each other.

The plurality of conversion units 130 and the conventional converter module 10 are connected in serial in FIG. 9 and connected in parallel in FIG. 10, the arrangement is not limited thereto. For example, the plurality of conversion units 130 and the conventional converter module 10 may be connected in series-parallel (combination of series and parallel) with each other according to exemplary embodiments.

In addition, in the converter 100 shown in FIGS. 7 to 10, the plurality of conversion units 130 may be operated in synchronization with each other. Otherwise, the plurality of conversion units 130 may be independently operated according to different clocks.

The control method of the multi-path converter according to the exemplary embodiment will be described with reference to FIG. 11.

Figure 11:
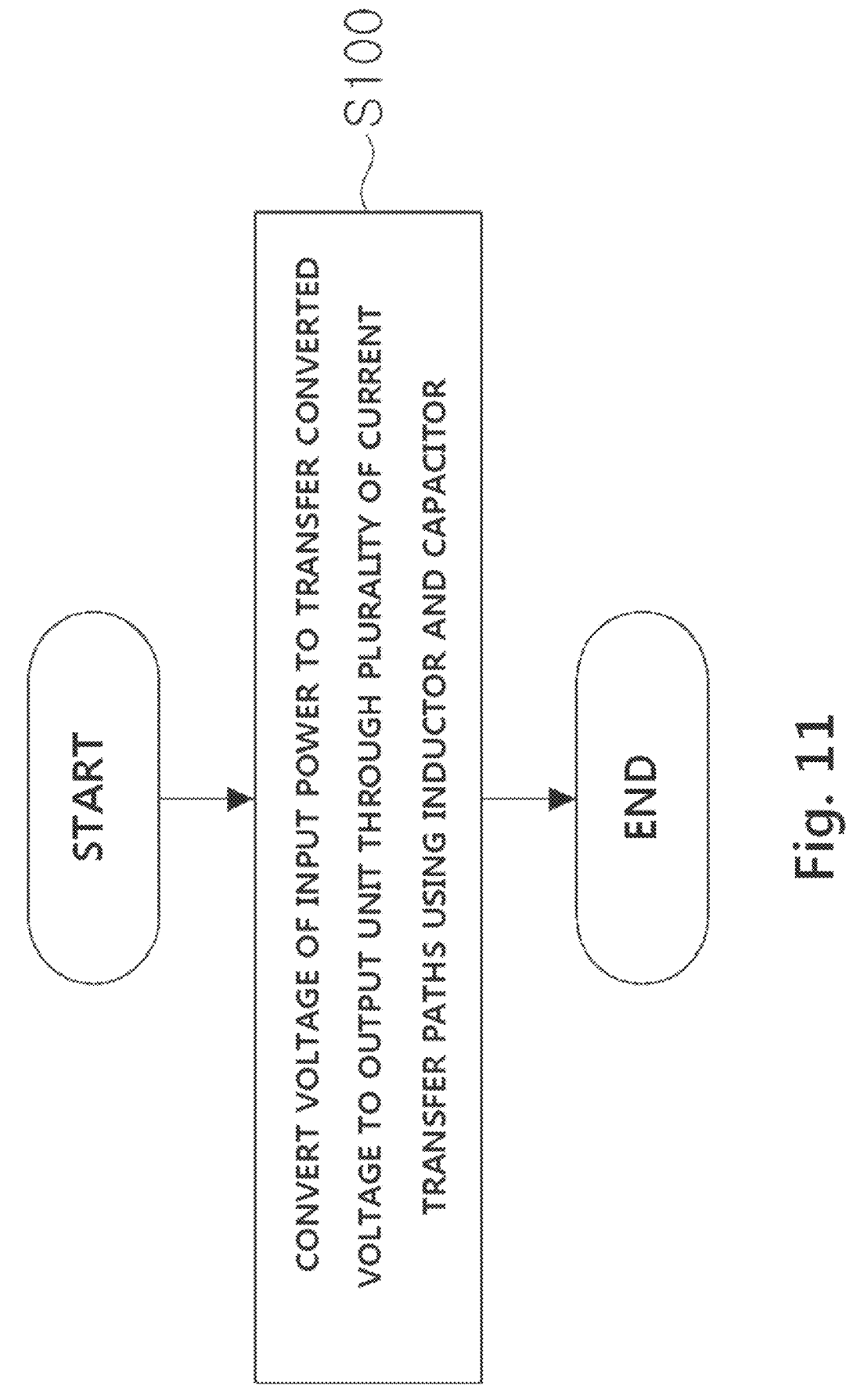
FIG. 11 is a flowchart illustrating a control method of the multi-path converter according to the exemplary embodiment.

FIG. 11 is a flowchart illustrating the control method of the multi-path converter according to the exemplary embodiment.

Referring to FIG. 11, the control method of the multi-path converter according to the exemplary embodiment includes converting (e.g., stepping down or up) a voltage of power input to the converter 10 and transferring a current to the output terminal. The current is divided and transferred to the output terminal through a plurality of current transfer paths using at least one inductor and at least one capacitor (S100).

In this case, in the transferring of the current, the current is divided and transferred to the output unit through the plurality of current transfer paths. For example, in the converter 100, the current may be divided and transferred to the output terminal through the plurality of current transfer paths including a first current transfer path using an inductor and a second current transfer path using a capacitor. Here, the plurality of current transfer paths may include a plurality of the first current transfer paths and/or a plurality of the second current transfer paths. For example, the plurality of current transfer paths may include a current transfer path using an inductor, a current transfer path using a first capacitor, and a current transfer path using a second capacitor. According to an exemplary embodiment, one current transfer path may use one or more inductors, one or more capacitors, or a combination thereof.

In addition, in the transferring of the current, when an operation including a plurality of conversion operation modes (for example, a plurality of step-down operation modes or a plurality of step-up operation modes) is periodically performed, the current may be divided and transferred to the output terminal through the plurality of current transfer paths in an entire section in which the plurality of conversion operation modes are driven or in a partial section in which some conversion operation modes of the plurality of conversion operation modes are driven.

As described above, in the multi-path converter and the control method thereof according to the exemplary embodiments, a current is divided and transferred through a plurality of current transfer paths using at least one inductor and at least one capacitor to flow to an output terminal (i.e., a load). As such, an amount of power loss may be reduced as compared with a conventional converter, thereby increasing power efficiency.

Embodiment 1: Multi-Path Step-Down Converter

A multi-path converter and a control method thereof according to exemplary embodiments will be described in detail with reference to FIGS. 12 and 43.

The multi-path converter according to the exemplary embodiment may perform a function of a step-down converter configured to step down input power. That is, in the converter according to the exemplary embodiment, an output voltage $V_{OUT}$ is lower than an input voltage $V_{IN}$, and a current is divided and transferred to an output terminal through a plurality of current transfer paths (for example, two current transfer paths, three current transfer paths, or n current transfer paths) using at least one inductor and at least one capacitor.

First, a first step-down converter with a dual-path according to the exemplary embodiment will be described with reference to FIGS. 12 to 14.

Figure 12:
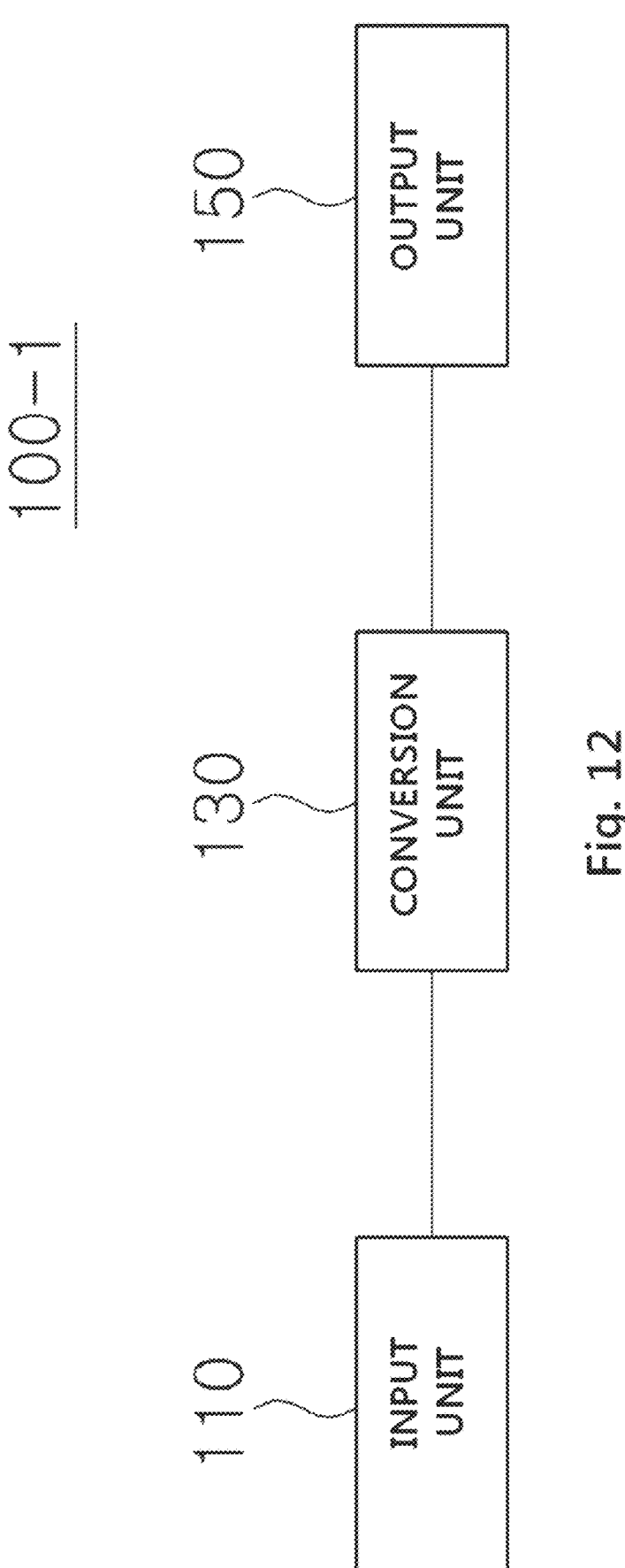
FIG. 12 is a block diagram illustrating a first step-down converter with a dual-path according to an exemplary embodiment.

FIG. 12 is a block diagram illustrating the first step-down converter with the dual-path according to the exemplary embodiment. FIG. 13 is a circuit diagram illustrating a configuration of the first step-down converter shown in FIG. 12. FIGS. 14A and 14B show diagrams for describing an example of a step-down operation mode of the first step-down converter shown in FIG. 13.

Figure 13:
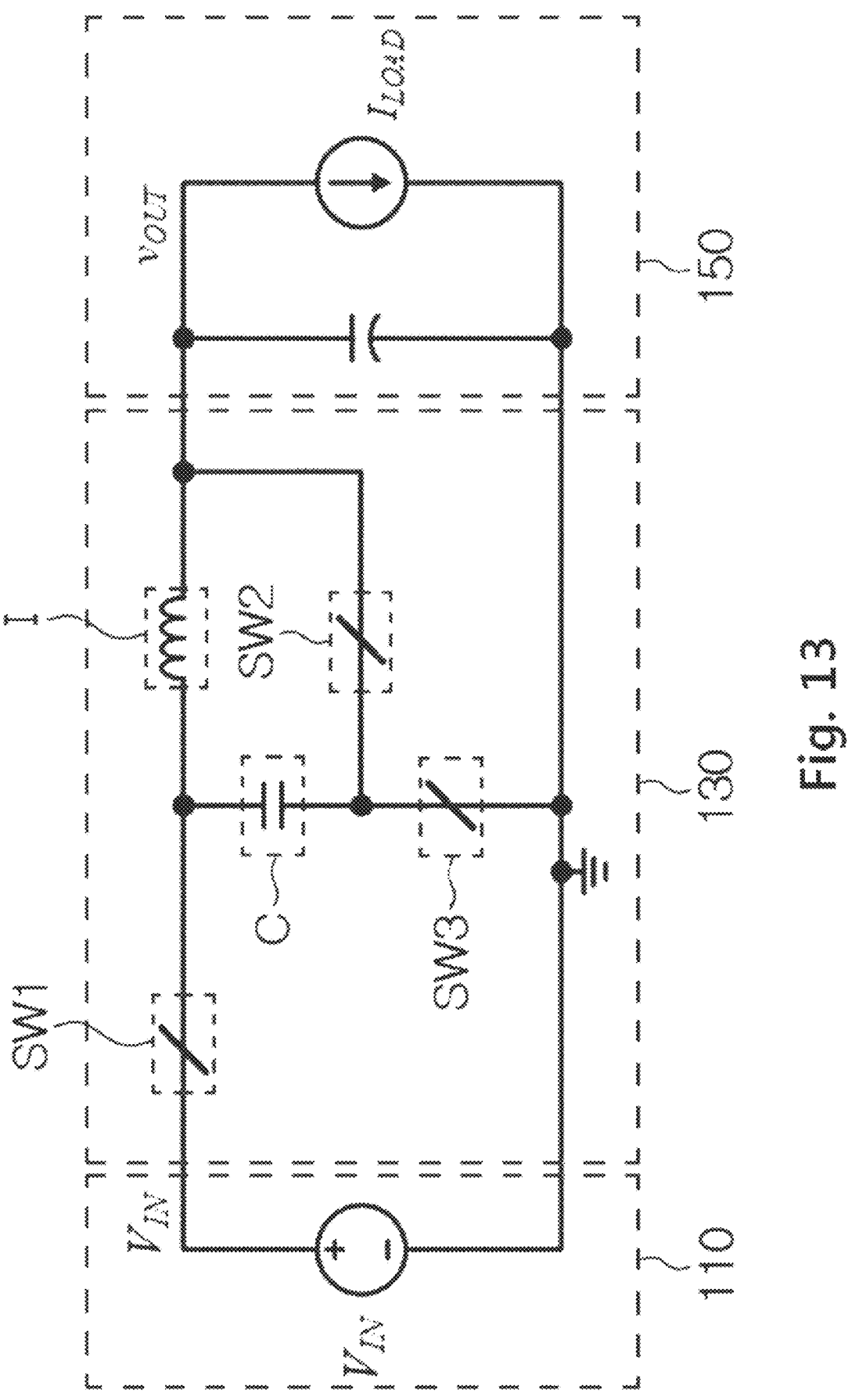
FIG. 13 is a circuit diagram illustrating a configuration of the first step-down converter shown in FIG. 12.
Figures 14A, 14B:
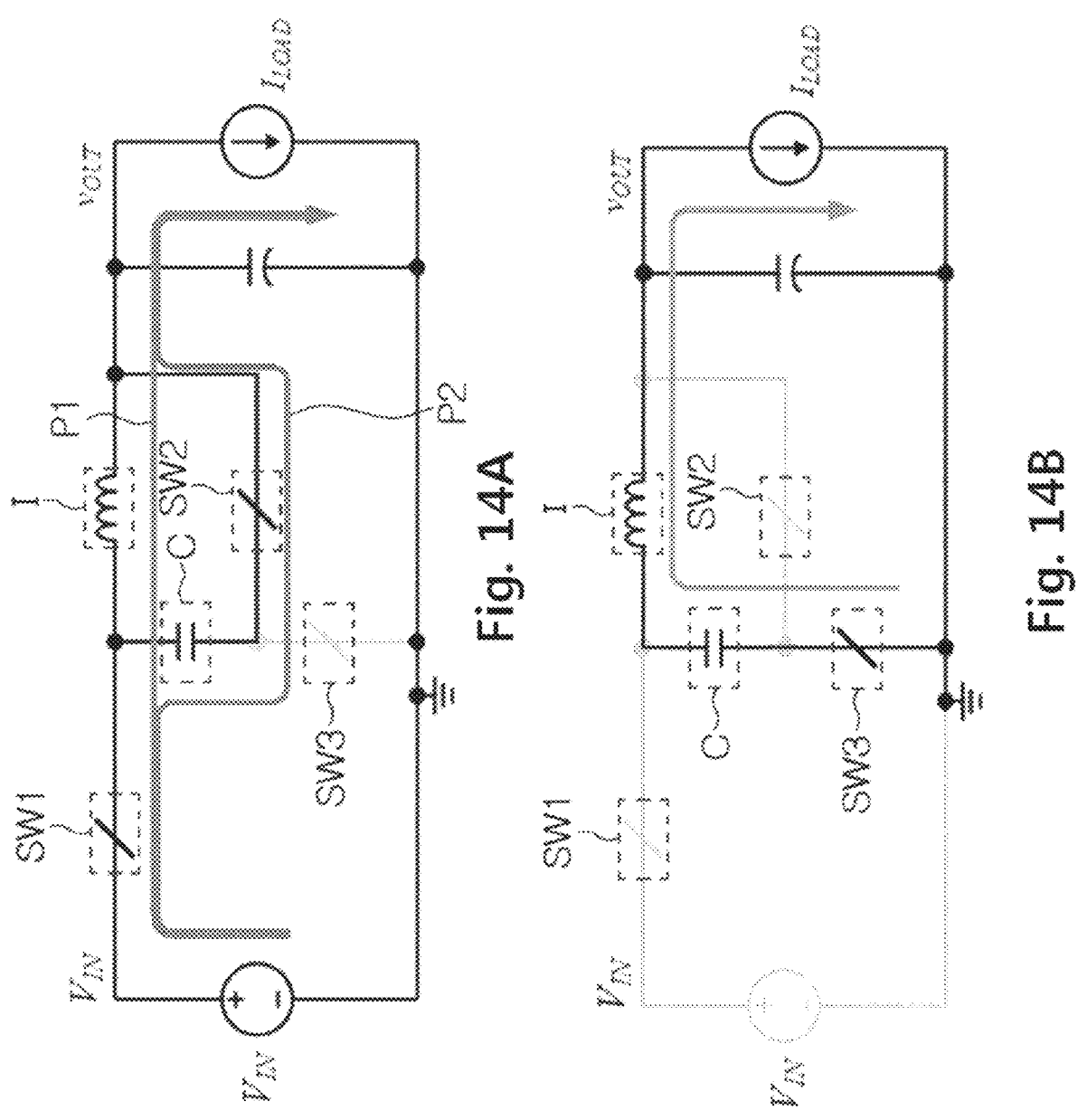
FIGS. 14A and 14B show diagrams for describing an example of a step-down operation mode of the first step-down converter shown in FIG. 13.

Referring to FIGS. 12 and 13, a first step-down converter 100-1 with a dual-path (hereinafter, referred to as a "first step-down converter") according to the exemplary embodiment includes an input unit 110 to which power is input, a conversion unit 130 which steps down the input power, and an output unit 150 which receives and transfers the stepped-down power to an external device. Here, a power conversion ratio ($V_{OUT}/V_{IN}$) of the first step-down converter 100-1 is in a range of 0.5 to 1.

That is, the conversion unit 130 steps down the power input through the input unit 110 and transfers the stepped-down power to the output unit 150. The conversion unit 130 transfers a current to the output unit 150 through two different current transfer paths. For example, the conversion unit 130 may divide and transfer the current to the output unit 150 through a first current transfer path using an inductor I and a second current transfer path using a capacitor C. Accordingly, as compared with a conventional step-down converter which transfers a current to an output terminal (i.e., load) only through an inductor, the first step-down converter 100 according to the exemplary embodiment divides and transfers the current to the output terminal through the first current transfer path including the inductor I and the second current transfer path including the capacitor C. As such, power loss is reduced and efficiency is increased.

To this end, the conversion unit 130 may include the inductor I, the capacitor C, a first switch SW1, a second switch SW2, and a third switch SW3.

One end of the inductor I is connected to a node between the first switch SW1 and the capacitor C, and the other end thereof is connected to a node between the output unit 150 and the second switch SW2.

One end of the capacitor C is connected to a node between the first switch SW1 and the inductor I, and the other end thereof is connected to a node between the second switch SW2 and the third switch SW3.

One end of the first switch SW1 is connected to the input unit 110, and the other end thereof is connected to a node between the inductor I and the capacitor C.

One end of the second switch SW2 is connected to a node between the capacitor C and the third switch SW3, and the other end thereof is connected to a node between the inductor I and the output unit 150.

One end of the third switch SW3 is connected to a node between the capacitor C and the second switch SW2, and the other end thereof is connected to a node between the input unit 110 and the output unit 150.

More specifically, the conversion unit 130 may be driven in the order of a first step-down operation mode and a second step-down operation mode. That is, the conversion unit 130 may periodically perform an operation that sequentially includes the first step-down operation mode and the second step-down operation mode. The conversion unit 130 may step down the power input from the input unit 110, and transfer the stepped-down power to the output unit 150. In this case, a duty ratio indicating a driving time of the first step-down operation mode may be determined based on an input voltage, an output voltage, and the like.

As shown in FIG. 14A, the conversion unit 130 may be driven in the first step-down operation mode in which the first switch SW1 and the second switch SW2 are turned on and the third switch SW3 is turned off. Accordingly, a current flowing to the output unit 150 (i.e., a load) is divided and transferred through a first current transfer path P1 composed of the inductor I and a second current transfer path P2 composed of the capacitor C. Therefore, an RMS value of the current flowing in the inductor I is reduced due to the additional current transfer path using the capacitor C.

After the conversion unit 130 is driven in the first step-down operation mode, the conversion unit 130 may be driven in the second step-down operation mode in which the third switch SW3 is turned on and the first switch SW1 and the second switch SW2 are turned off, as shown in FIG. 14B.

As described above, in the first step-down operation mode, while a current is accumulated in the inductor I, a current is divided and transferred to the output unit 150 (i.e., the load) through the first current transfer path using the inductor I and the second current transfer path using the capacitor C. In the second step-down operation mode, the current accumulated in the inductor I is transferred to the output unit 150, that is, the load. Accordingly, since a current to be transferred to the output unit 150 (i.e., the load) is divided and transferred through two paths (first current transfer path and second current transfer path), an amount of power loss of the first step-down converter 100-1 according to the exemplary embodiment may be further reduced as compared with the conventional step-down converter, thereby increasing power efficiency.

The first step-down converter according to the exemplary embodiment will be further described with reference to FIGS. 15 and 16.

FIG. 15 shows diagrams illustrating an example of the first step-down converter according to the exemplary embodiment, and FIG. 16 shows graphs each obtained by testing the first step-down converter according to the exemplary embodiment in an environment with a duty ratio of 0.4. That is, FIG. 16 illustrates waveforms obtained by testing the first step-down converter 100-1 according to the exemplary embodiment under conditions in which a duty ratio is 40%, a voltage $V_{IN}$ input through the input unit 110 is 5 V, a voltage $V_{OUT}$ output through the output unit 150 is 3.06 V, and a current output through the output unit 150 is 1 A.

Referring to FIGS. 15 and 16, the first step-down converter 100-1 according to the exemplary embodiment periodically performs an operation that sequentially includes a first step-down operation mode $\Phi_1$ and a second step-down operation mode $\Phi_2$ to step down and transfer input power to the output terminal, that is, the load.

In this case, when the first step-down converter 100-1 according to the exemplary embodiment is driven in the first step-down operation mode $\Phi_1$, in the first step-down converter 100-1, a current is divided and transferred to the output terminal (i.e., the load) through the first current transfer path using the inductor I and the second current transfer path using the capacitor C.

Performance of the first step-down converter according to the exemplary embodiment will be further described with respect to FIGS. 17 and 18.

FIG. 17 is a graph obtained by testing the first step-down converter with the dual-path according to the exemplary embodiment in a first simulation environment, and FIG. 18 is a graph obtained by testing the first step-down converter with the dual-path according to the exemplary embodiment in a second simulation environment.

In order to test the performance of the first step-down converter 100-1 according to the exemplary embodiment, experiments were performed so as to compare the first step-down converter 100-1 with the conventional step-down converter in two simulation environments.

In the first simulation environment, the input voltage $V_{IN}$ was fixed at 4.5 V, a driving time $D_1$ of the first step-down operation mode was changed between 0.05 and 0.95, and the current of the output terminal (that is, the load) was fixed at 1 A. Accordingly, the voltage $V_{OUT}$ of the output terminal (that is, the load) is $V_{IN}/(2-D_1)$, that is, 2.25 V$<V_{OUT}<$4.5 V, and a driving time $D_2$ of the second step-down operation mode is $1/(2-D_1)$.

In the second simulation environment, the voltage $V_{OUT}$ of the output terminal (that is, the load) was fixed at 2.8 V, the driving time $D_1$ of the first step-down operation mode was changed between 0.05 and 0.95, and the current of the output terminal (that is, the load) was fixed at 1 A. Accordingly, the input voltage $V_{IN}$ is $V_{OUT}(2-D_1)$, that is, 3.0 V$<V_{IN}<$5.5 V, and the driving time $D_2$ of the second step-down operation mode is $1/(2-D_1)$.

Referring to FIG. 17, a test result in the first simulation environment confirms that power efficiency (solid line in FIG. 17) of the first step-down converter according to the exemplary embodiment is increased by about 5% as compared with power efficiency (dashed line in FIG. 17) of the conventional step-down converter.

Referring to FIG. 18, as a test result in the second simulation environment, it may be confirmed that power efficiency (solid line in FIG. 18) of the first step-down converter according to the exemplary embodiment is further increased by about 4.7% as compared with power efficiency (dashed line in FIG. 18) of the conventional step-down converter.

A control method of the first step-down converter according to the exemplary embodiment will be described with reference to FIGS. 19 and 20.

Figure 19:
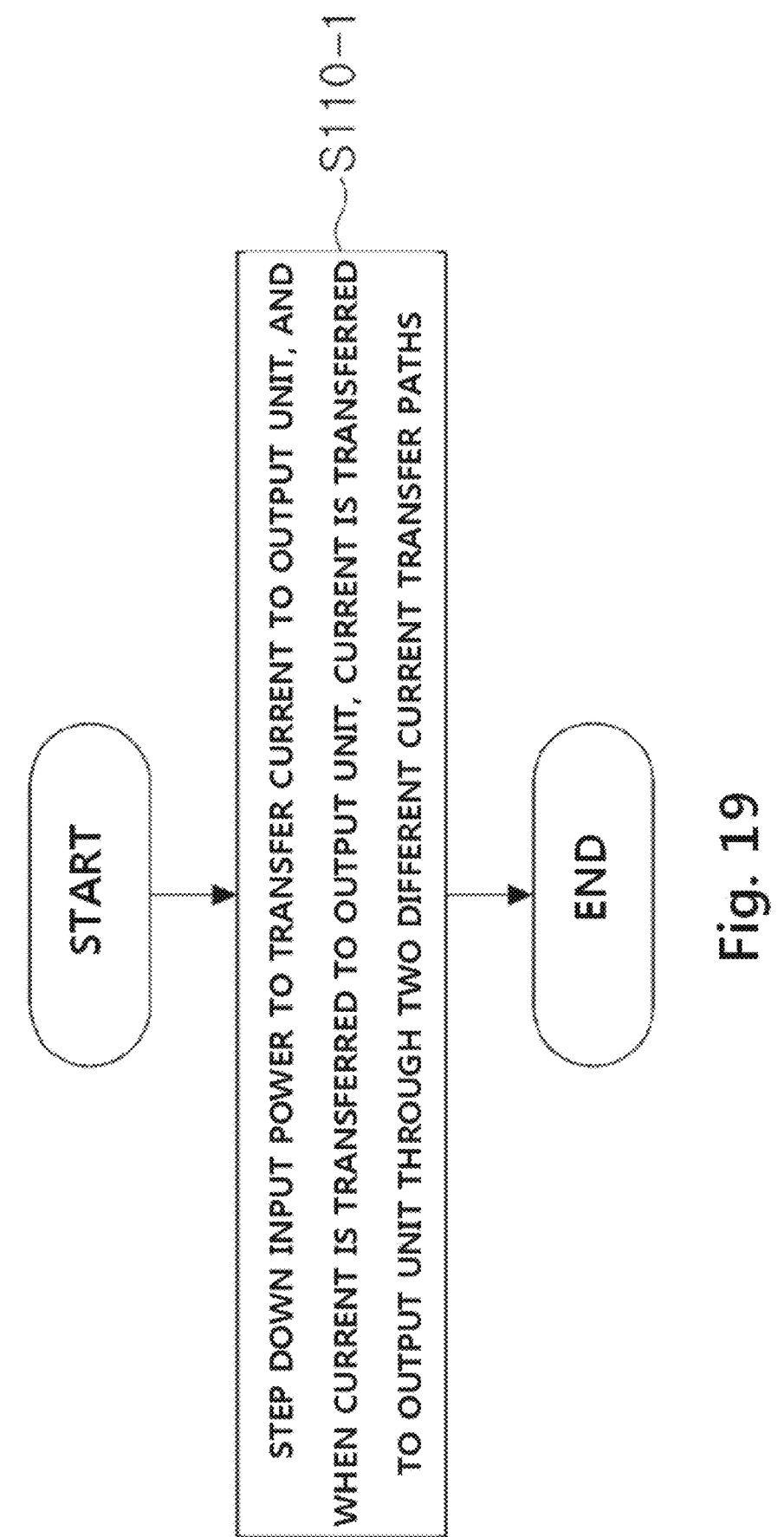
FIG. 19 is a flowchart illustrating a control method of the first step-down converter with the dual-path according to the exemplary embodiment.

FIG. 19 is a flowchart illustrating the control method of the first step-down converter according to the exemplary embodiment.

Referring to FIG. 19, the first step-down converter 100-1 steps down an input power to transfer a current to the output unit 150, and when the current is transferred to the output unit 150, the current is transferred to the output unit 150 through two different current transfer paths (S110-1).

For example, in the first step-down converter 100-1, the current may be divided and transferred to the output unit 150 through a first current transfer path using the inductor I and a second current transfer path using the capacitor C. Accordingly, as compared with the conventional step-down converter which transfers a current to the output terminal (i.e., load) only through an inductor, the first step-down converter 100-1 according to the exemplary embodiment divides and transfers the current to the output terminal through the first current transfer path including the inductor I and the second current transfer path including the capacitor C, thereby reducing power loss and increasing efficiency.

Figure 20:
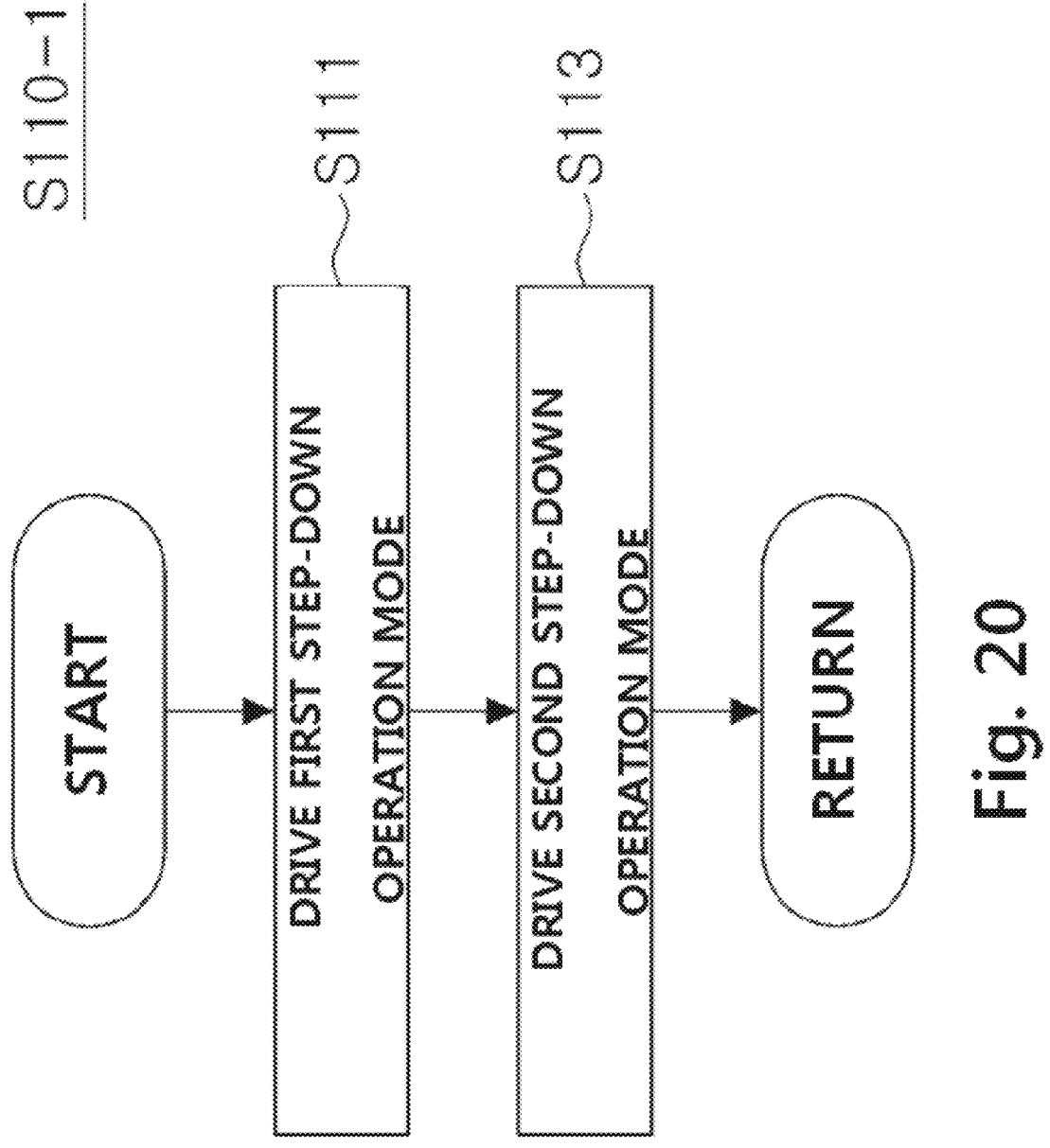
FIG. 20 is a flowchart illustrating a current transferring operation shown in FIG. 19 in more detail.

FIG. 20 is a flowchart illustrating a current transferring operation shown in FIG. 19 in more detail.

Referring to FIG. 20, the first step-down converter 100-1 may be driven in a first step-down operation mode (S111). That is, the first step-down converter 100-1 may be driven in the first step-down operation mode in which the first switch SW1 and a second switch SW2 are turned on and the third switch SW3 is turned off. Accordingly, a current which flows to the output unit 150 (i.e., the load) is divided and transferred through a first current transfer path P1 using the inductor I and a second current transfer path P2 using the capacitor C.

After the first step-down converter 100-1 is driven in the first step-down operation mode, the first step-down converter 100-1 may be driven in a second step-down operation mode (S113). In the second step-down operation mode, the third switch SW3 is turned on and the first switch SW1 and the second switch SW2 are turned off.

As described above, the first step-down converter 100-1 may periodically perform an operation that sequentially includes the first step-down operation mode and the second step-down operation mode. As such, the first step-down converter 100-1 may step down and transfer the power input from the input unit 110 to the output unit 150.

In the first step-down operation mode, while a current is accumulated in the inductor I, a current is divided and transferred to the output unit 150 (i.e., the load) through the first current transfer path using the inductor I and the second current transfer path using the capacitor C. In the second step-down operation mode, the current accumulated in the inductor I is transferred to the output unit 150, that is, the load. Accordingly, since the current to be transferred to the output unit 150 (i.e., the load) is divided and transferred through two paths (first current transfer path and second current transfer path), an amount of power loss of the first step-down converter 100-1 according to the exemplary embodiment may be reduced as compared with the conventional step-down converter, thereby increasing power efficiency.

A second step-down converter with a dual-path according to the exemplary embodiment will be described with reference to FIGS. 21 to 22.

Figure 21:
FIG. 21 is a circuit diagram illustrating a configuration of a second step-down converter with a dual-path according to the exemplary embodiment.
Figure 22A:
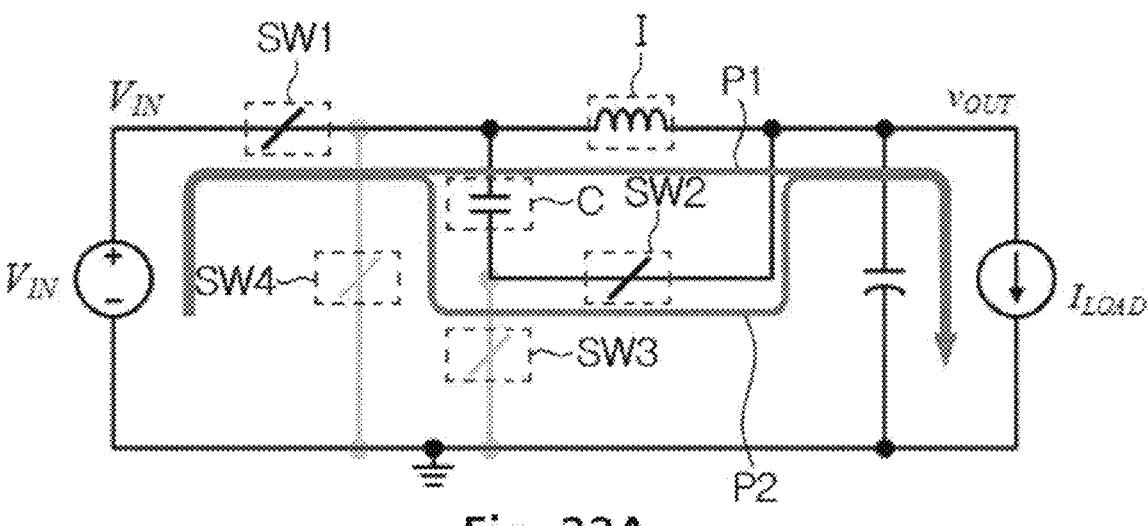
FIGS. 22A to 22C show diagrams for describing an example of a step-down operation mode of the second step-down converter shown in FIG. 21
Figure 22B:
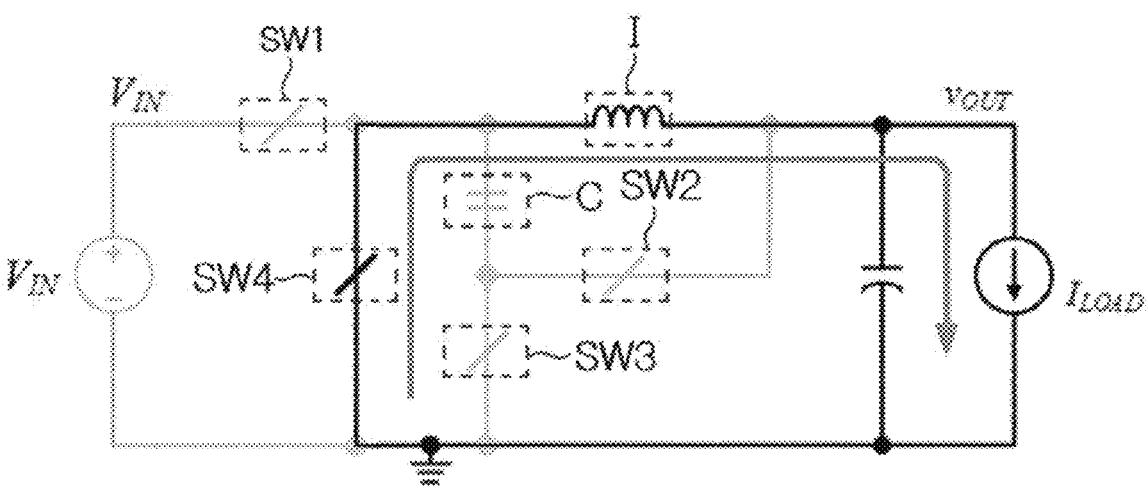
Figure 22C:
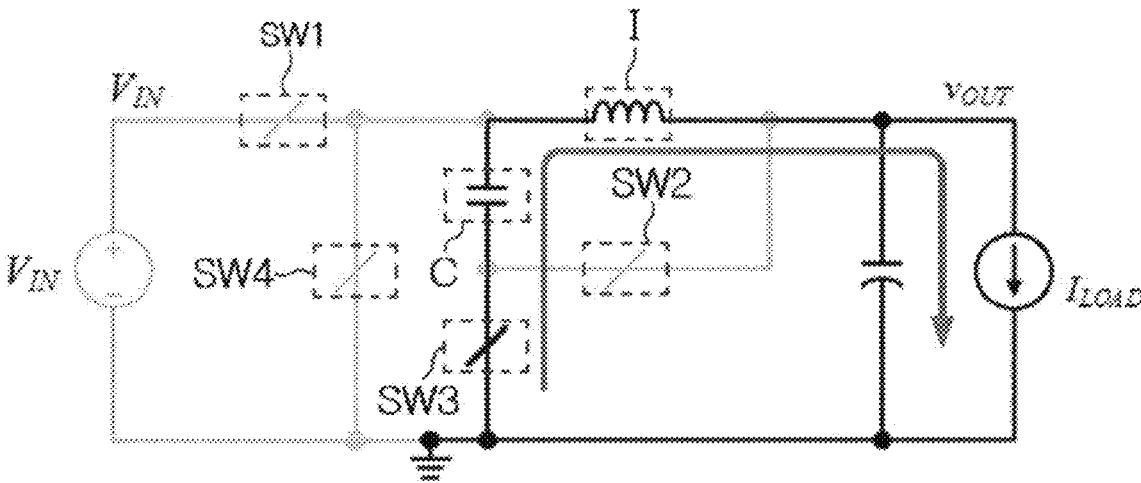

FIG. 21 is a circuit diagram illustrating a configuration of the second step-down converter with the dual-path according to the exemplary embodiment. FIGS. 22A to 22C show diagrams for describing an example of a step-down operation mode of the second step-down converter shown in FIG. 21.

Since a second step-down converter 200-1 with a dual-path (hereinafter referred to as a "second step-down converter") according to the exemplary embodiment is substantially similar to the first step-down converter 100-1 according to the above-described exemplary embodiment, differences therebetween will be described.

Referring to FIG. 21, the second step-down converter 200-1 according to the exemplary embodiment further includes a fourth switch SW4 added to the first step-down converter 100-1 according to the exemplary embodiment.

That is, a conversion unit 230 may include an inductor I, a capacitor C, a first switch SW1, a second switch SW2, a third switch SW3, and the fourth switch SW4.

One end of the fourth switch SW4 is connected to a node between the first switch SW1 and the inductor I, and the other end thereof is connected to a node between the input unit 110 and the third switch SW3.

Here, the first switch SW1 may be a P-type metal oxide semiconductor (PMOS) switch. The second switch SW2, the third switch SW3, and the fourth switch SW4 may be N-type metal oxide semiconductor (NMOS) switches.

More specifically, the conversion unit 230 may be driven in the order of a first step-down operation mode, a third step-down operation mode, and a second step-down operation mode. That is, the conversion unit 230 may periodically perform an operation that sequentially includes the first step-down operation mode, the third step-down operation mode, and the second step-down operation mode. As such, the conversion unit 230 may step down and transfer power input from an input unit 210 to an output unit 250.

That is, as shown in FIG. 22A, the conversion unit 230 may be driven in the first step-down operation mode in which the first switch SW1 and the second switch SW2 are turned on and the third switch SW3 and the fourth switch SW4 are turned off. Accordingly, a current which flows to the output unit 250 (i.e., a load) is divided and transferred through a first current transfer path P1 using an inductor I and a second current transfer path P2 using a capacitor C. Therefore, an RMS value of the current flowing in the inductor I is reduced due to the additional current transfer path using the capacitor C.

After the conversion unit 230 is driven in the first step-down operation mode, as shown in FIG. 22B, the conversion unit 230 may be driven in third step-down operation mode in which the fourth switch SW4 is turned on and the first switch SW1, the second switch SW2, and the third switch SW3 are turned off.

In addition, after the conversion unit 230 is driven in the third step-down operation mode, as shown in FIG. 22C, the conversion unit 230 may be driven in the second step-down operation mode in which the third switch SW3 is turned on and the first switch SW1, the second switch SW2, and the fourth switch SW4 are turned off.

As described above, in the first step-down operation mode, while a current is accumulated in the inductor I, a current is divided and transferred to the output unit 250 (i.e., the load) through the first current transfer path using the inductor I and the second current transfer path using the capacitor C. Accordingly, since a current to be transferred to the output unit 250 (i.e., the load) is divided and transferred through two paths (first current transfer path and second current transfer path), an amount of power loss of the second step-down converter 200-1 according to the exemplary embodiment may be reduced as compared with the conventional step-down converter, thereby increasing power efficiency.

In addition, unlike the first step-down converter 100-1, the second step-down converter 200-1 includes the fourth switch SW4 which enables the third step-down operation mode. Thus, the second step-down converter 200-1 has a power conversion ratio ($V_{OUT}/V_{IN}$) ranging from 0 and 1, which is a range wider than that of the first step-down converter 100-1. Furthermore, in the second step-down converter 200-1, an RMS current flowing in the first switch SW1 may be reduced as compared with the first step-down converter 100-1. Also, an RMS current flowing in the capacitor C may be reduced by adjusting a duty ratio of the first step-down operation mode $\Phi_1$ and the second step-down operation mode $\Phi_3$.

That is, the first step-down converter 100-1 according to the exemplary embodiment may provide an output voltage having a range represented by [Expression 1] below.

$$V_{OUT}=1/(2-D_1)*V_{IN}$$

$$(\frac{1}{2}*V_{IN}\leq V_{OUT}\leq V_{IN}) \quad \text{[Expression 1]}$$

Here, $V_{IN}$ refers to an input voltage, $V_{OUT}$ refers to an output voltage, and $D_1$ refers to a driving time of the first step-down operation mode.

On the other hand, the second step-down converter 200-1 according to the exemplary embodiment may provide an output voltage having a range represented by [Expression 2] below.

$$V_{OUT}=(1-D_2)/(2-D_1-D_2)*V_{IN}$$

$$(0\leq V_{OUT}\leq V_{IN}) \quad \text{[Expression 2]}$$

Here, $V_{IN}$ refers to an input voltage, $V_{OUT}$ refers to an output voltage, $D_1$ refers to a driving time of the first step-down operation mode, and $D_2$ refers to a driving time of the third step-down operation mode.

An example of the second step-down converter according to the exemplary embodiment will be described with reference to FIG. 23.

FIG. 23 is a diagram illustrating an example of the second step-down converter according to the exemplary embodiment.

Referring to FIG. 23, the second step-down converter 200-1 according to the exemplary embodiment repeatedly performs an operation including a first step-down operation mode $\Phi_1$, a third step-down operation mode $\Phi_2$, and a second step-down operation mode $\Phi_3$ and steps down and transfers input power to an output terminal, i.e., a load.

In this case, when the second step-down converter 200-1 according to the exemplary embodiment is driven in the first step-down operation mode $\Phi_1$, in the first step-down converter 100-1, a current is divided and transferred to the output terminal (i.e., the load) through the first current transfer path using the inductor I and the second current transfer path using the capacitor C.

A control method of the second step-down converter according to the exemplary embodiment will be described with reference to FIGS. 24 and 25.

Figure 24:
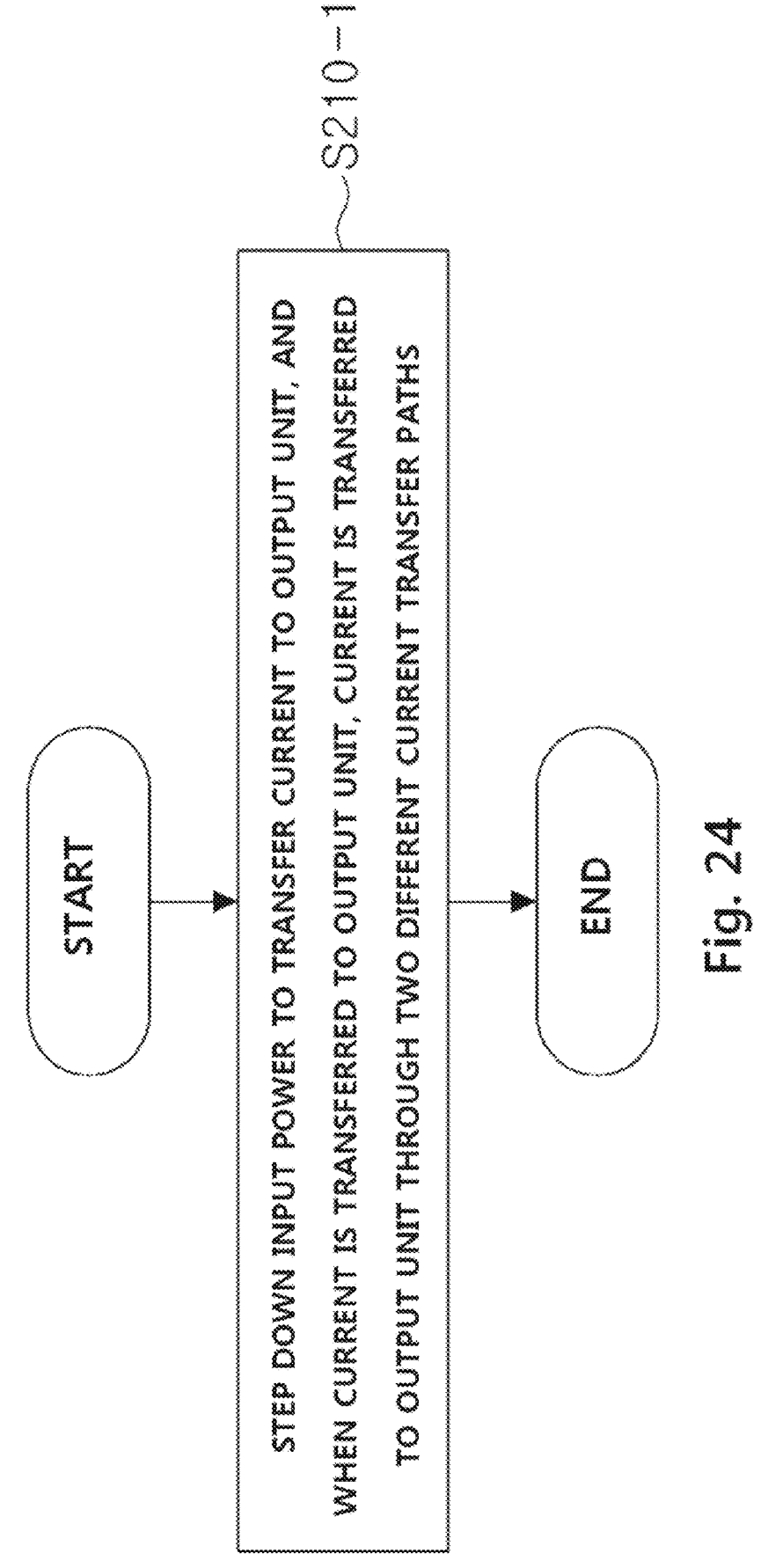
FIG. 24 is a flowchart illustrating a control method of the second step-down converter with the dual-path according to the exemplary embodiment.

FIG. 24 is a flowchart illustrating the control method of the second step-down converter according to the exemplary embodiment.

Referring to FIG. 24, the second step-down converter 200-1 steps down input power to transfer a current to the output unit 250, and when the current is transferred to the output unit 250, the current is transferred to the output unit 250 through two different current transfer paths (S210-1).

For example, in the second step-down converter 200-1, the current may be divided and transferred to the output unit 250 through the first current transfer path using the inductor I and the second current transfer path using the capacitor C. Accordingly, as compared with the conventional step-down converter which transfers a current to an output terminal (i.e., load) through only an inductor, the second step-down converter 200-1 according to the exemplary embodiment divides and transfers a current to an output terminal through the first current transfer path passing including the inductor I and the second current transfer path including the capacitor C, thereby reducing power loss and increasing efficiency.

Figure 25:
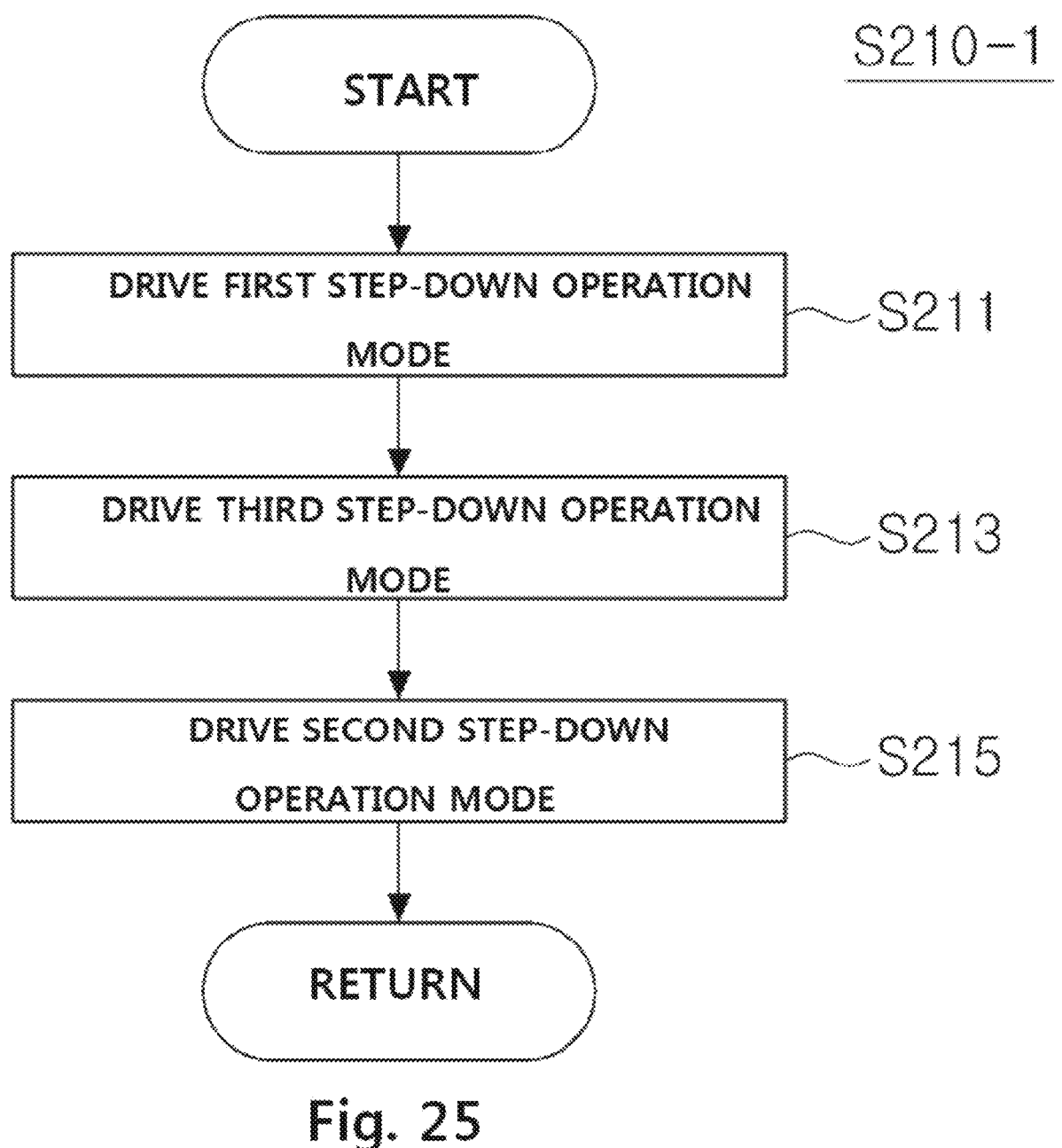
FIG. 25 is a flowchart illustrating a current transferring operation shown in FIG. 24 in more detail.

FIG. 25 is a flowchart illustrating a current transferring operation shown in FIG. 24 in more detail.

Referring to FIG. 25, the second step-down converter 200-1 may be driven in the first step-down operation mode (S211). That is, the second step-down converter 200-1 may be driven in the first step-down operation mode of turning the first switch SW1 and the second switch SW2 on and turning the third switch SW3 and the fourth switch SW4 off. Accordingly, a current flowing to the output unit 250 (i.e., the load) is divided and transferred through the first current transfer path P1 using the inductor I and the second current transfer path P2 using the capacitor C.

After the second step-down converter 200-1 is driven in the first step-down operation mode, the second step-down converter 200-1 may be driven in the third step-down operation mode (S213) in which the fourth switch SW4 is turned on and the first switch SW1, the second switch SW2, and the third switch SW3 are turned off.

After the second step-down converter 200-1 is driven in the third step-down operation mode, the second step-down converter 200-1 may be driven in the second step-down operation mode (S215) in which the third switch SW4 is turned on and the first switch SW1, the second switch SW2, and the fourth switch SW4 are turned off.

As described above, the second step-down converter 200-1 may periodically perform an operation that sequentially includes the first step-down operation mode, the third step-down operation mode, and the second step-down operation mode. As such, the second step-down converter 200-1 may step down and transfer the power input from the input unit 210 to the output unit 250.

That is, in the first step-down operation mode, while a current is accumulated in the inductor I, a current is divided and transferred to the output unit 250 (i.e., the load) through the first current transfer path using the inductor I and the second current transfer path using the capacitor C. Accordingly, since the current to be transferred to the output unit 250 (i.e., the load) is divided and transferred through two paths (first current transfer path and second current transfer path), an amount of power loss of the first step-down converter 200-1 according to the exemplary embodiment may be reduced as compared with the conventional step-down converter, thereby increasing power efficiency.

A third step-down converter with a dual-path according to the exemplary embodiment will be described with reference to FIGS. 26 to 27.

Figure 26:
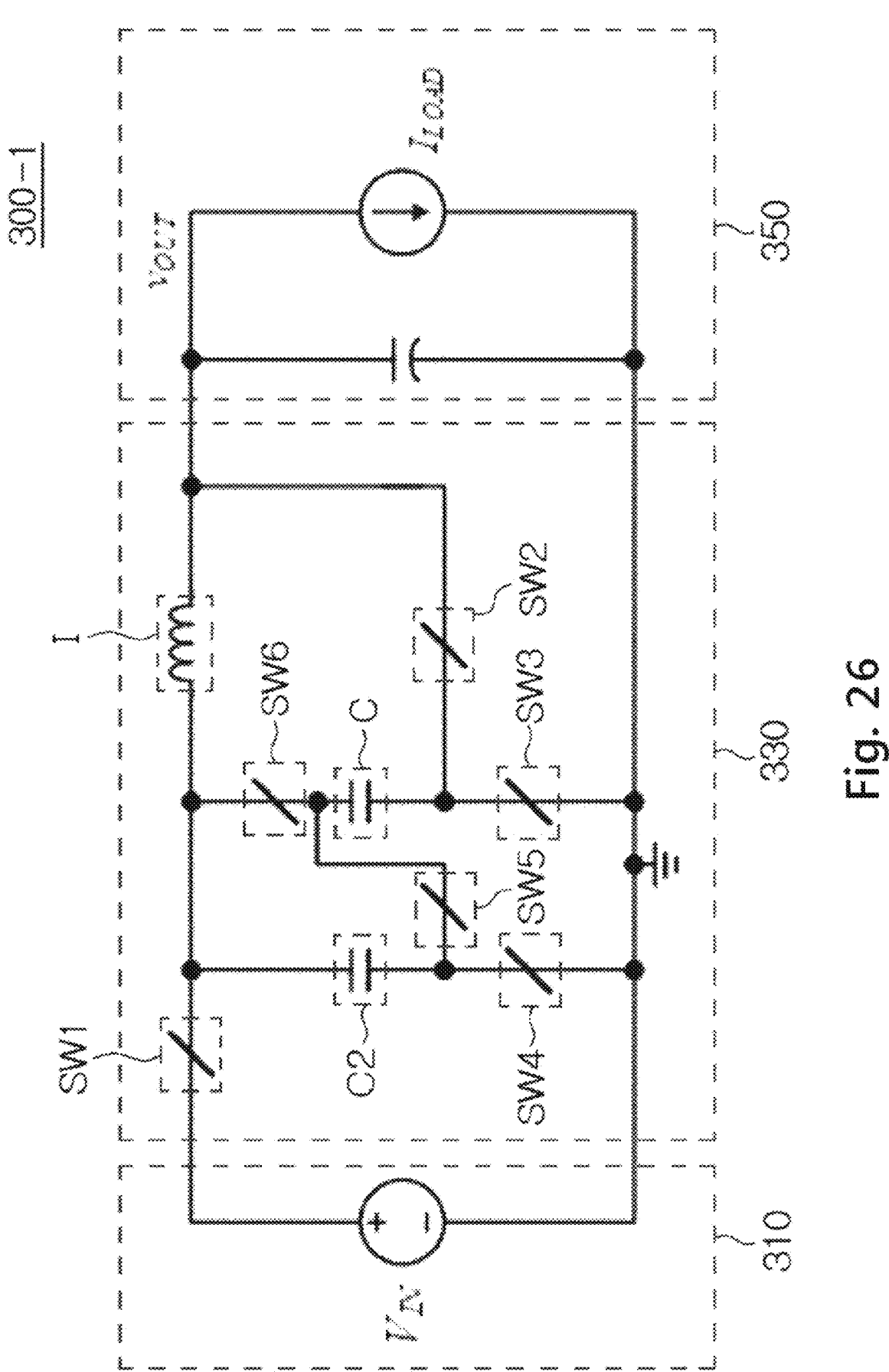
FIG. 26 is a circuit diagram illustrating a configuration of a third step-down converter with a dual-path according to the exemplary embodiment.
Figure 27A:
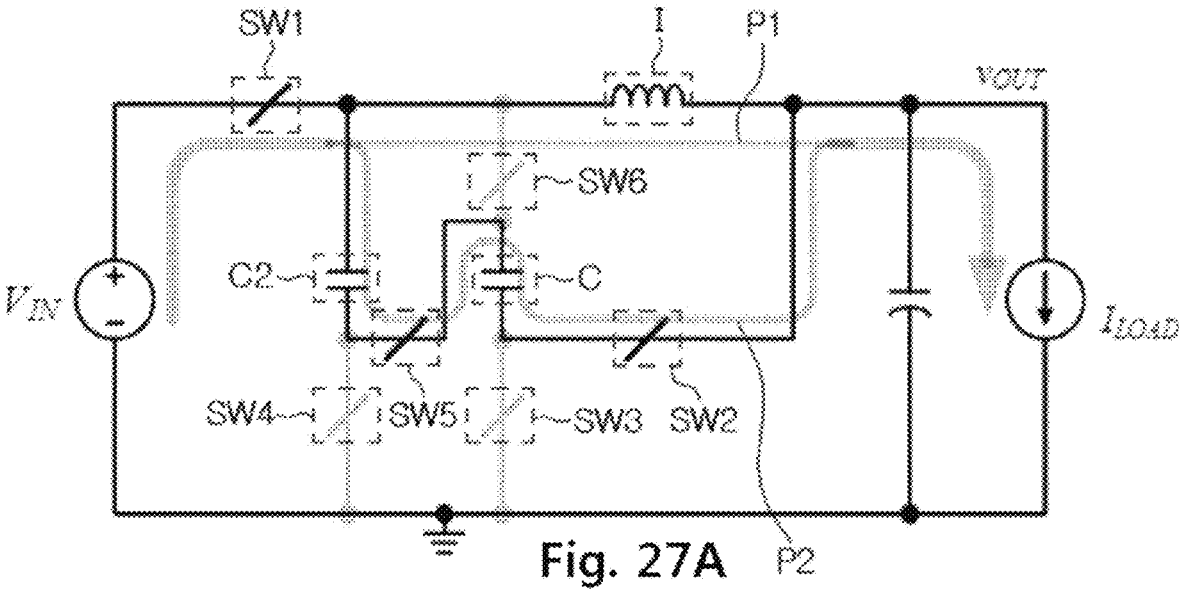
FIGS. 27A and 27B show diagrams for describing an example of a step-down operation mode of the third step-down converter shown in FIG. 26.
Figure 27B:
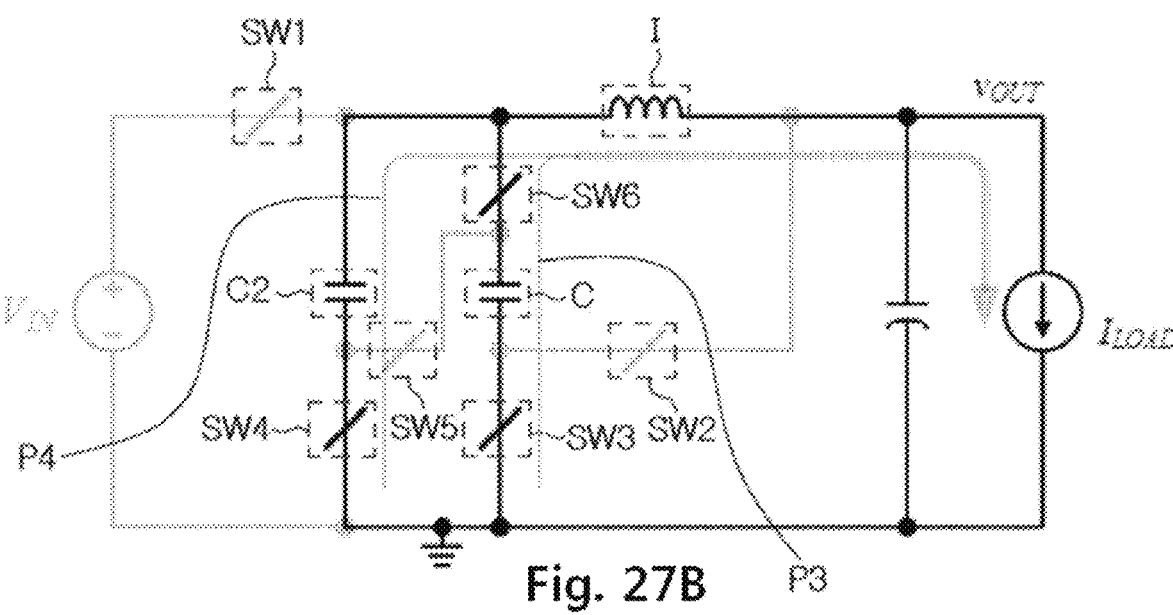

FIG. 26 is a circuit diagram illustrating a configuration of the third step-down converter with the dual-path according to the exemplary embodiment. FIGS. 27A and 27B show diagrams for describing an example of a step-down operation mode of the third step-down converter shown in FIG. 26.

Since a third step-down converter 300-1 with a dual-path (hereinafter referred to as a "third step-down converter") according to the exemplary embodiment is substantially similar to the second step-down converter 200-1 according to the above-described exemplary embodiment, differences therebetween will be described.

Referring to FIG. 26, the third step-down converter 300-1 according to the exemplary embodiment additionally includes a fifth switch SW5, a sixth switch SW6, and a capacitor C2, in comparison with the second step-down converter 200-1.

That is, a conversion unit 330 may include an inductor I, a capacitor C, a first switch SW1, a second switch SW2, a third switch SW3, a fourth switch SW4, a fifth switch SW5, a sixth switch SW6, and a capacitor C2.

One end of the capacitor C2 is connected to a node between the first switch SW1 and the inductor I, and the other end thereof is connected to the fourth switch SW4.

One end of the sixth switch SW6 is connected to a node between the capacitor C2 and the inductor I, and the other end thereof is connected to the capacitor C.

One end of the fifth switch SW5 is connected to a node between the capacitor C2 and the fourth switch SW4, and the other end thereof is connected to a node between the sixth switch SW6 and the capacitor C.

More specifically, the conversion unit 330 may be driven in the order of a first step-down operation mode and a second step-down operation mode. That is, the conversion unit 330 may periodically perform an operation that sequentially includes the first step-down operation mode and the second step-down operation mode. As such, the conversion unit 330 may step down and transfer power input from an input unit 310 to an output unit 350.

That is, as shown in FIG. 27A, the conversion unit 330 may be driven in the first step-down operation mode in which the first switch SW1, the second switch SW2, and the fifth switch SW5 are turned on and the third switch SW3, the fourth switch SW4, and the sixth switch SW6 are turned off. Accordingly, a current which flows to the output unit 350 (i.e., a load) is divided and transferred through a first current transfer path P1 using the inductor I and a second current transfer path P2 using the capacitor C2 and the capacitor C.

After the conversion unit 330 is driven in the first step-down operation mode, the conversion unit 330 may be driven in the second step-down operation mode in which the third switch SW3, the fourth switch SW4, and the sixth switch SW6 are turned on and the first switch SW1, the second switch SW2, and the fifth switch SW5 are turned off, as shown in FIG. 27B. Accordingly, the current flowing to the output unit 350 (i.e., the load) is divided and transferred through a third current transfer path P3 using the capacitor C and a fourth current transfer path P4 using the capacitor C2.

As described above, in the first step-down operation mode, a current is divided and transferred to the output unit 350 (i.e., the load) through the first current transfer path P1 using the inductor I and the second current transfer path P2 using the capacitor C2 and the capacitor C. In the second step-down operation mode, a current is divided to the output unit 350 (i.e., the load) through a third current transfer path P3 using the capacitor C and a fourth current transfer path using the capacitor C2. Accordingly, since the current is divided and transferred through a plurality of current transfer paths in an entire section in which a plurality of step-down operation modes are driven, an amount of power loss of the third step-down converter 300-1 according to the exemplary embodiment may be reduced as compared with the conventional step-down converter, thereby increasing power efficiency.

A control method of the third step-down converter according to the exemplary embodiment will be described with reference to FIG. 28.

Figure 28:
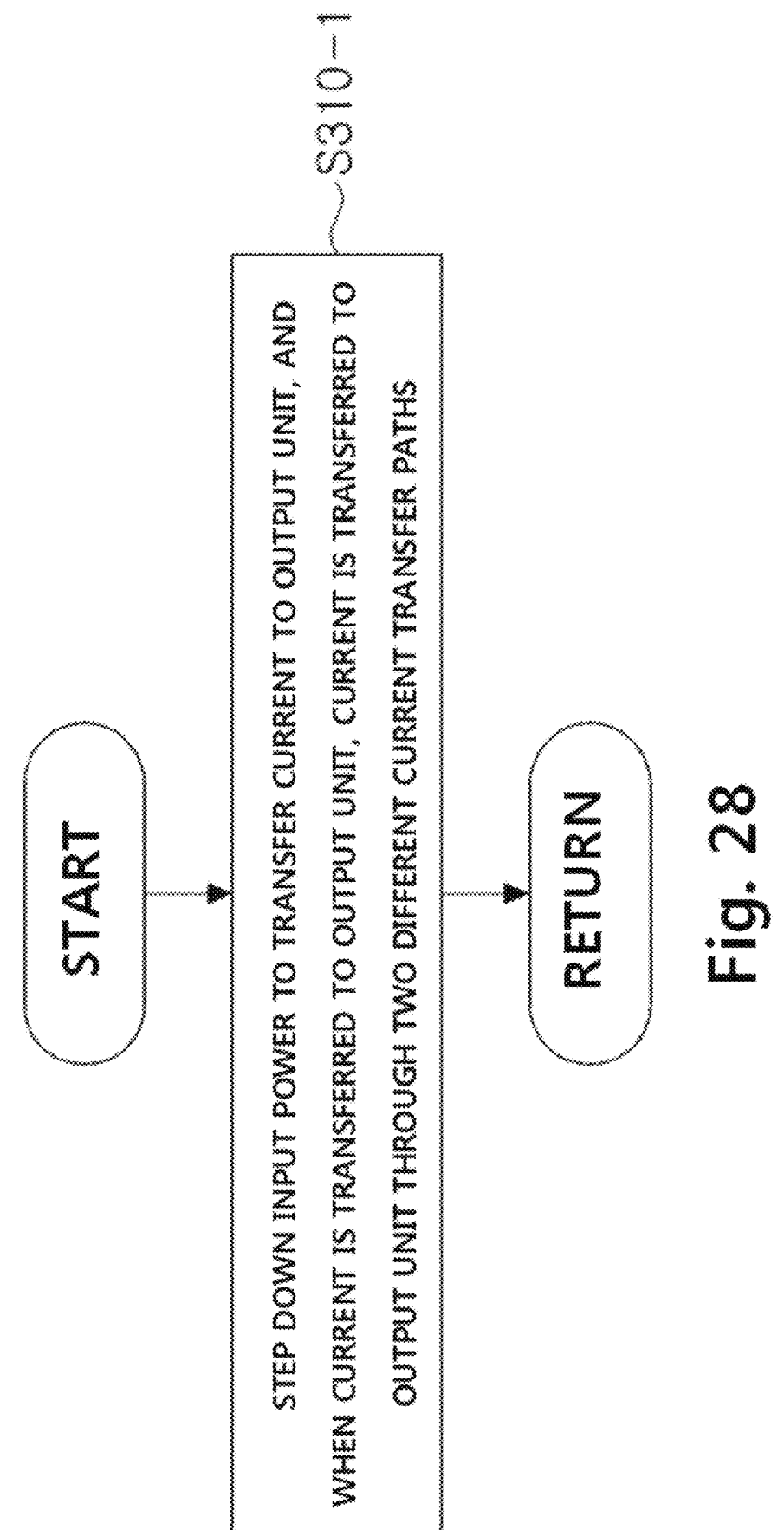
FIG. 28 is a flowchart illustrating a control method of the third step-down converter with the dual-path according to the exemplary embodiment.

FIG. 28 is a flowchart illustrating the control method of the third step-down converter with the dual-path according to the exemplary embodiment.

Referring to FIG. 28, the third step-down converter 300-1 steps down an input power to transfer a current to the output unit 350 through two different current transfer paths (S310-1).

More specifically, the third step-down converter 300-1 may be driven in the first step-down operation mode in which the first switch SW1, the second switch SW2, and the fifth switch SW5 are turned on and the third switch SW3, the fourth switch SW4, and the sixth switch SW6 are turned off. Accordingly, a current flowing to the output unit 350 (i.e., the load) is divided and transferred through the first current transfer path P1 using the inductor I and the second current transfer path P2 using the capacitor C2 and the capacitor C.

After the third step-down converter 300-1 is driven in the first step-down operation mode, the third step-down converter 300-1 may be driven in the second step-down operation mode in which the third switch SW3, the fourth switch SW4, and the sixth switch SW6 are turned on and the first switch SW1, the second switch SW2, and the fifth switch SW5 are turned off. Accordingly, a current flowing to the output unit 350 (i.e., the load) is divided and transferred through the third current transfer path P3 using the capacitor C and the fourth current transfer path P4 using the capacitor C2.

A fourth step-down converter with a dual-path according to the exemplary embodiment will be described with reference to FIGS. 29 and 30.

Figure 29:
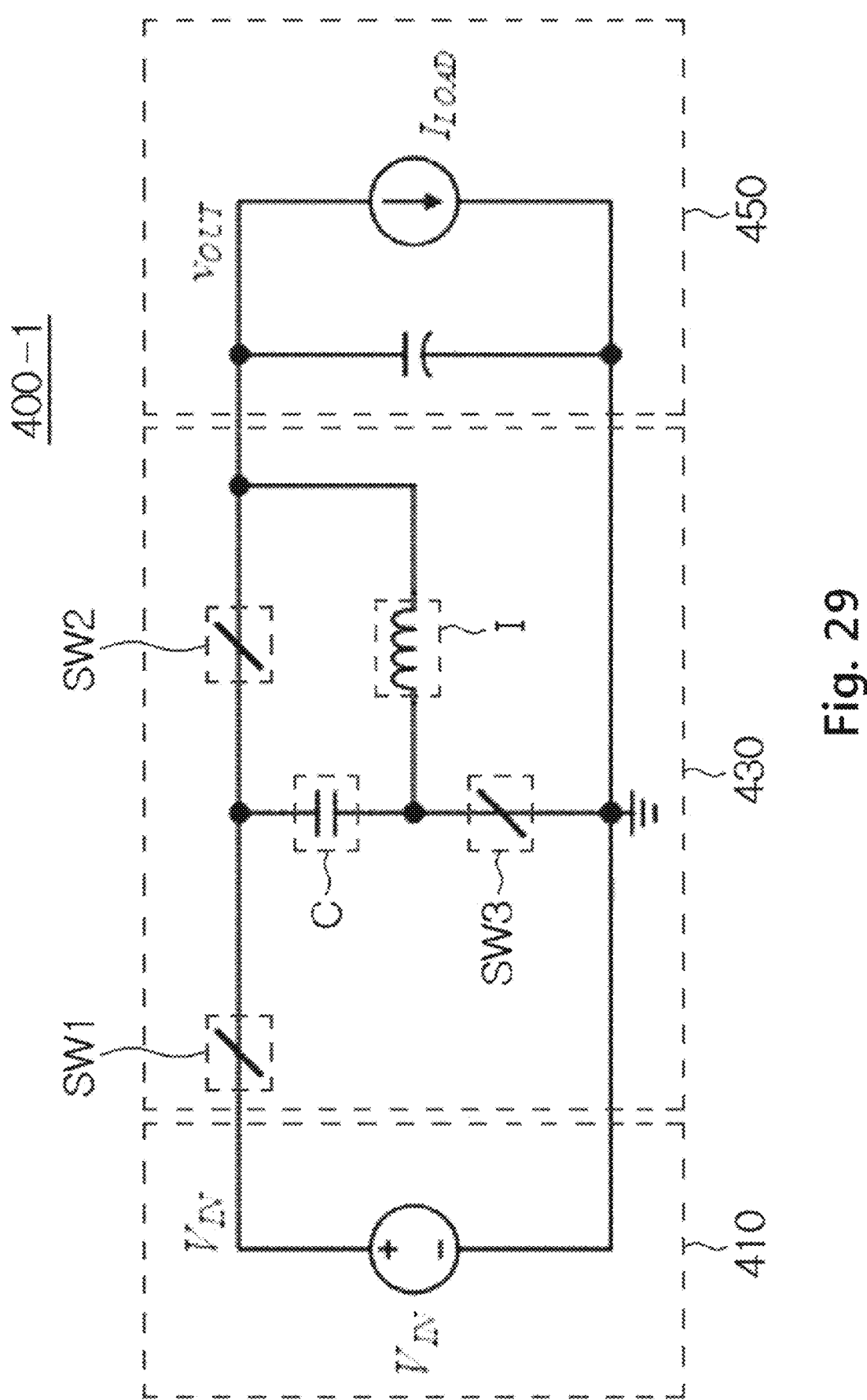
FIG. 29 is a circuit diagram illustrating a configuration of a fourth step-down converter with a dual-path according to the exemplary embodiment.
Figures 30A, 30B:
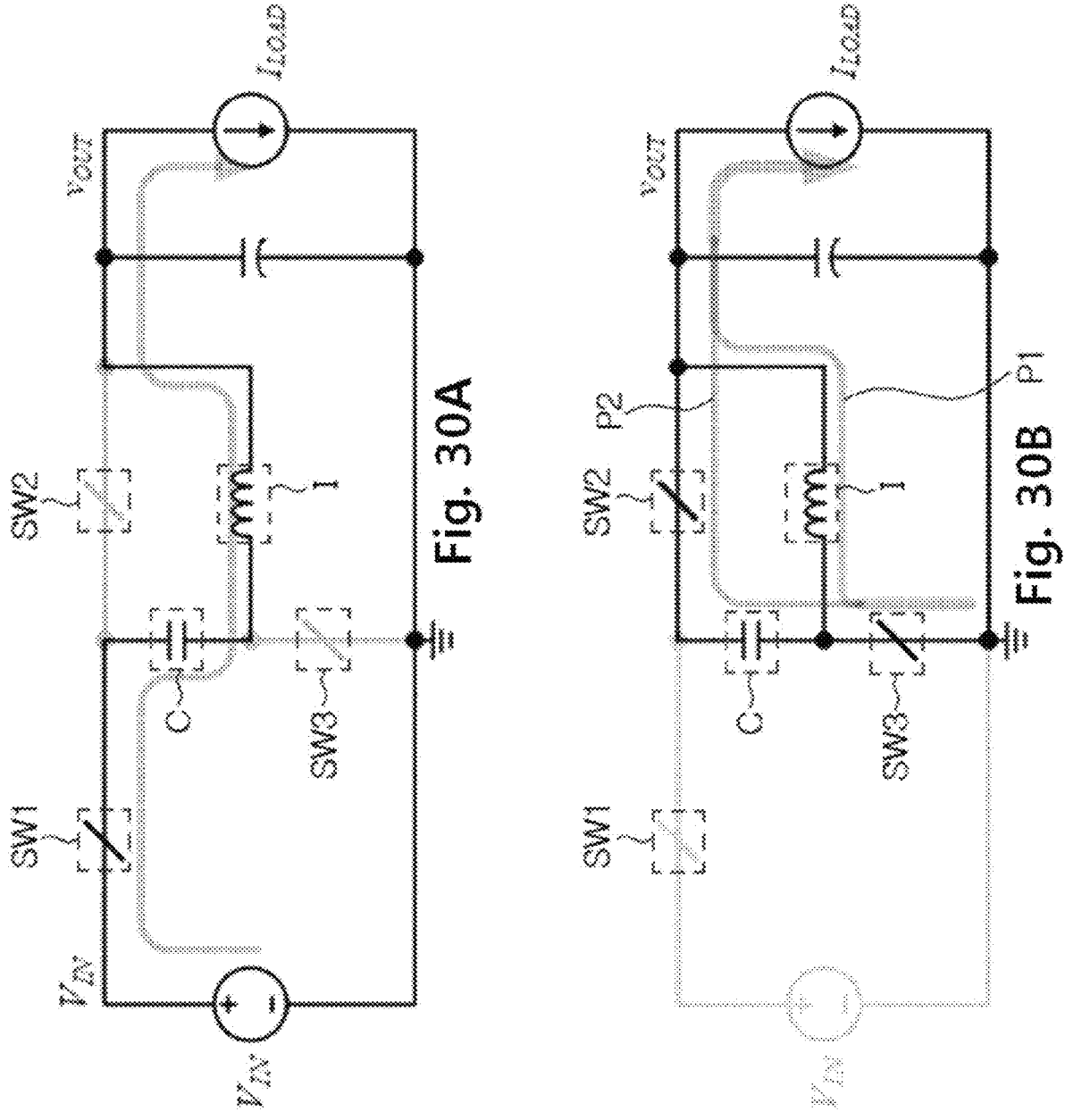
FIGS. 30A to 30B show diagrams for describing an example of a step-down operation mode of the fourth step-down converter shown in FIG. 29.

FIG. 29 is a circuit diagram illustrating a configuration of the fourth step-down converter with the dual-path according to the exemplary embodiment, and FIGS. 30A and 30B show diagrams for describing an example of a step-down operation mode of the fourth step-down converter shown in FIG. 29.

Referring to FIG. 29, a fourth step-down converter 400-1 with a dual-path (hereinafter referred to as a "fourth step-down converter") according to the present exemplary embodiment is configured by changing positions of some elements of the first step-down converter 100-1. Here, a power conversion ratio ($V_{OUT}/V_{IN}$) of the fourth step-down converter 400-1 is in the range of 0 to 0.5.

That is, a conversion unit 430 may include an inductor I, a capacitor C, a first switch SW1, a second switch SW2, and a third switch SW3.

One end of the inductor I is connected to a node between the capacitor C and the third switch SW3, and the other end thereof is connected to a node between the second switch SW2 and an output unit 450.

One end of the capacitor C is connected to a node between the first switch SW1 and the second switch SW2, and the other end thereof is connected to a node between the inductor I and the third switch SW3.

One end of the first switch SW1 is connected to an input unit 410, and the other end thereof is connected to a node between the second switch SW2 and the capacitor C.

One end of the second switch SW2 is connected to a node between the first switch SW1 and the capacitor C, and the other end thereof is connected to a node between the output unit 450 and the inductor I.

One end of the third switch SW3 is connected to a node between the capacitor C and the inductor I, and the other end thereof is connected to a node between the input unit 410 and the output unit 450.

More specifically, the conversion unit 430 may be driven in the order of a first step-down operation mode and a second step-down operation mode. That is, the conversion unit 430 may periodically perform an operation that sequentially includes the first step-down operation mode and the second step-down operation mode. As such, the conversion unit 430 may step down and transfer power input from the input unit 410 to the output unit 450.

That is, as shown in FIG. 30A, the conversion unit 430 may be driven in the first step-down operation mode in which the first switch SW1 is turned on and the second switch SW2 and the third switch SW3 are turned off.

After the conversion unit 430 is driven in the first step-down operation mode, the conversion unit 430 may be driven in the second step-down operation mode in which the second switch SW2 and the third switch SW3 are turned on and the first switch SW1 is turned off, as shown in FIG. 30B. Accordingly, a current which flows to the output unit 450 (i.e., a load) is divided and transferred through a first current transfer path P1 using the inductor I and a second current transfer path P2 using the capacitor C. Therefore, an RMS value of the current flowing in the inductor I is reduced due to the additional current transfer path using the capacitor C.

A fifth step-down converter with a dual-path according to the exemplary embodiment will be described with reference to FIGS. 31 and 32.

Figure 31:
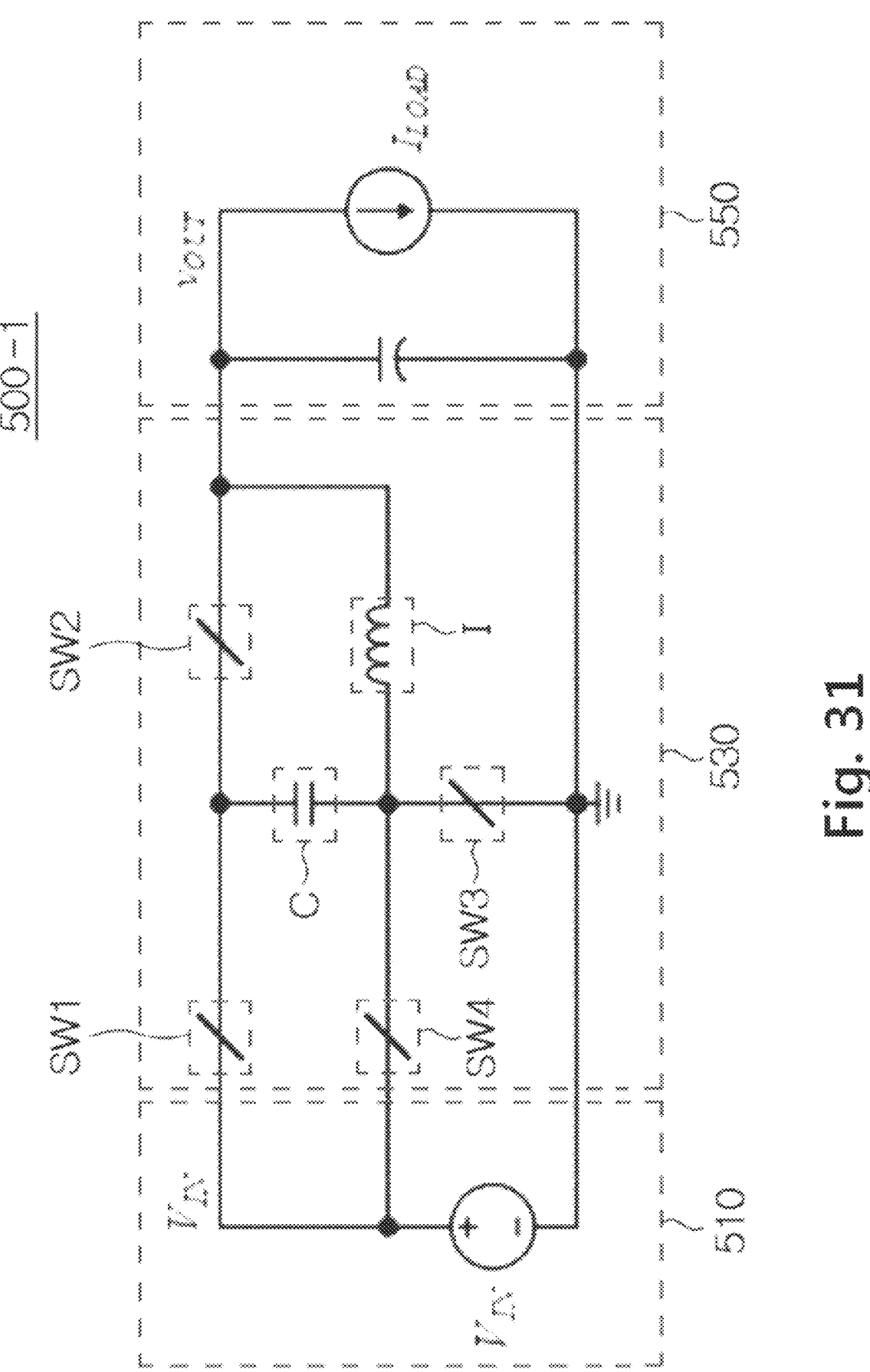
FIG. 31 is a circuit diagram illustrating a configuration of a fifth step-down converter with a dual-path according to the exemplary embodiment.
Figure 32A:
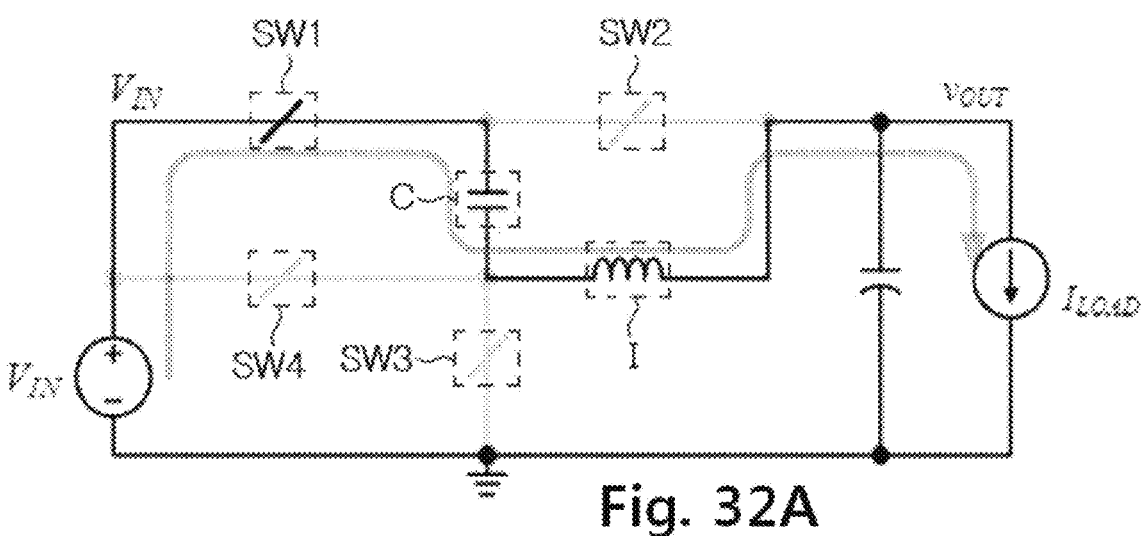
FIGS. 32A to 32C show diagrams for describing an example of a step-down operation mode of the fifth step-down converter shown in FIG. 31.
Figure 32B:
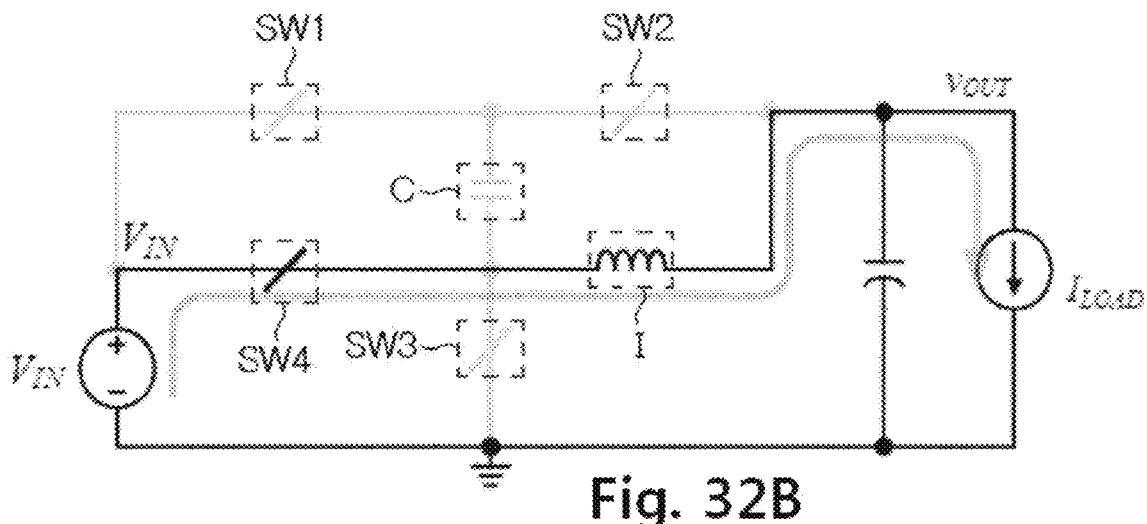
Figure 32C:
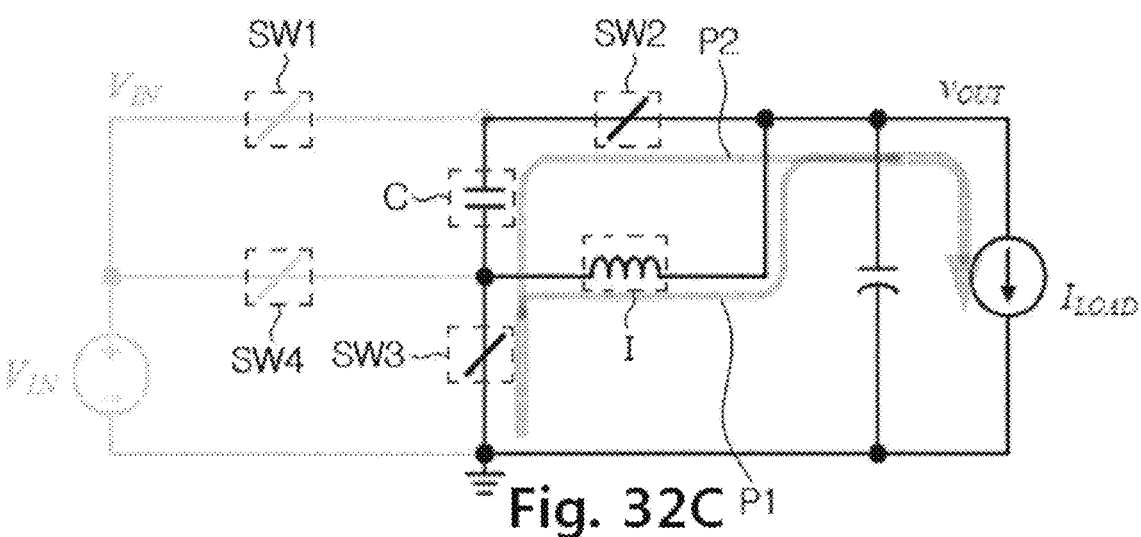

FIG. 31 is a circuit diagram illustrating a configuration of the fifth step-down converter with the dual-path according to the exemplary embodiment, and FIGS. 32A to 32C show diagrams for describing an example of a step-down operation mode of the fifth step-down converter shown in FIG. 31.

Since a fifth step-down converter 500-1 with a dual-path (hereinafter referred to as a "fifth step-down converter") according to the exemplary embodiment is substantially similar to the fourth step-down converter 400-1 according to the above-described exemplary embodiment, differences therebetween will be described.

Referring to FIG. 31, the fifth step-down converter 500-1 according to the exemplary embodiment may further include a fourth switch SW4 in comparison with the fourth step-down converter 400-1.

That is, a conversion unit 530 may include an inductor I, a capacitor C, a first switch SW1, a second switch SW2, a third switch SW3, and a fourth switch SW4.

One end of the inductor I is connected to a node between the capacitor C and the third switch SW3, and the other end thereof is connected to a node between the second switch SW2 and an output unit 550.

One end of the fourth switch SW4 is connected to an input unit 510, and the other end thereof is connected to a node between the capacitor C and the third switch SW3.

More specifically, the conversion unit 530 may be driven in the order of a first step-down operation mode, a third step-down operation mode, and a second step-down operation mode. That is, the conversion unit 530 may periodically perform an operation that sequentially includes the first step-down operation mode, the third step-down operation mode, and the second step-down operation mode. As such, the conversion unit 530 may step down and transfer power input from the input unit 510 to the output unit 550.

That is, as shown in FIG. 32A, the conversion unit 530 may be driven in the first step-down operation mode in which the first switch SW1 is turned on and the second switch SW2, the third switch SW3, and the fourth switch SW4 are turned off.

After the conversion unit 530 is driven in the first step-down operation mode, the conversion unit 530 may be driven in the third step-down operation mode in which the fourth switch SW4 is turned on and the first switch SW1, the second switch SW2, and the third switch SW3 are turned off, as shown in FIG. 32B.

In addition, after the conversion unit 530 is driven in the third step-down operation mode, the conversion unit 530 may be driven in the second step-down operation mode in which the second switch SW2 and the third switch SW3 are turned on and the first switch SW1 and the fourth switch SW4 are turned off, as shown in FIG. 32C. Accordingly, a current which flows to the output unit 550 (i.e., a load) is divided and transferred through a first current transfer path P1 using the inductor I and a second current transfer path P2 using the capacitor C. Therefore, an RMS value of the current flowing in the inductor I is reduced due to the additional current transfer path using the capacitor C.

As described above, since the current to be transferred to the output unit 550 (i.e., the load) is divided and transferred through two paths (first current transfer path and second current transfer path), an amount of power loss of the fifth step-down converter 500-1 according to the exemplary embodiment may be reduced as compared with the conventional step-down converter, thereby increasing power efficiency.

In addition, unlike the fourth step-down converter 400-1, the fifth step-down converter 500-1 includes the fourth switch SW4 which enables the third step-down operation mode. As such, the fifth step-down converter 500-1 has a power conversion ratio ($V_{OUT}/V_{IN}$) ranging from 0 to 1, which is a range wider than that of the fourth step-down converter 400-1. Furthermore, in the fifth step-down converter 500-1, an RMS current flowing in the third switch SW3 may be reduced as compared with the fourth step-down converter 400-1, and an RMS current flowing in the capacitor C may be further reduced by adjusting a duty ratio of the first step-down operation mode $\Phi_1$ and the second step-down operation mode $\Phi_3$.

A sixth step-down converter with a dual-path according to the exemplary embodiment will be described with reference to FIGS. 33 to 35.

Figure 33:
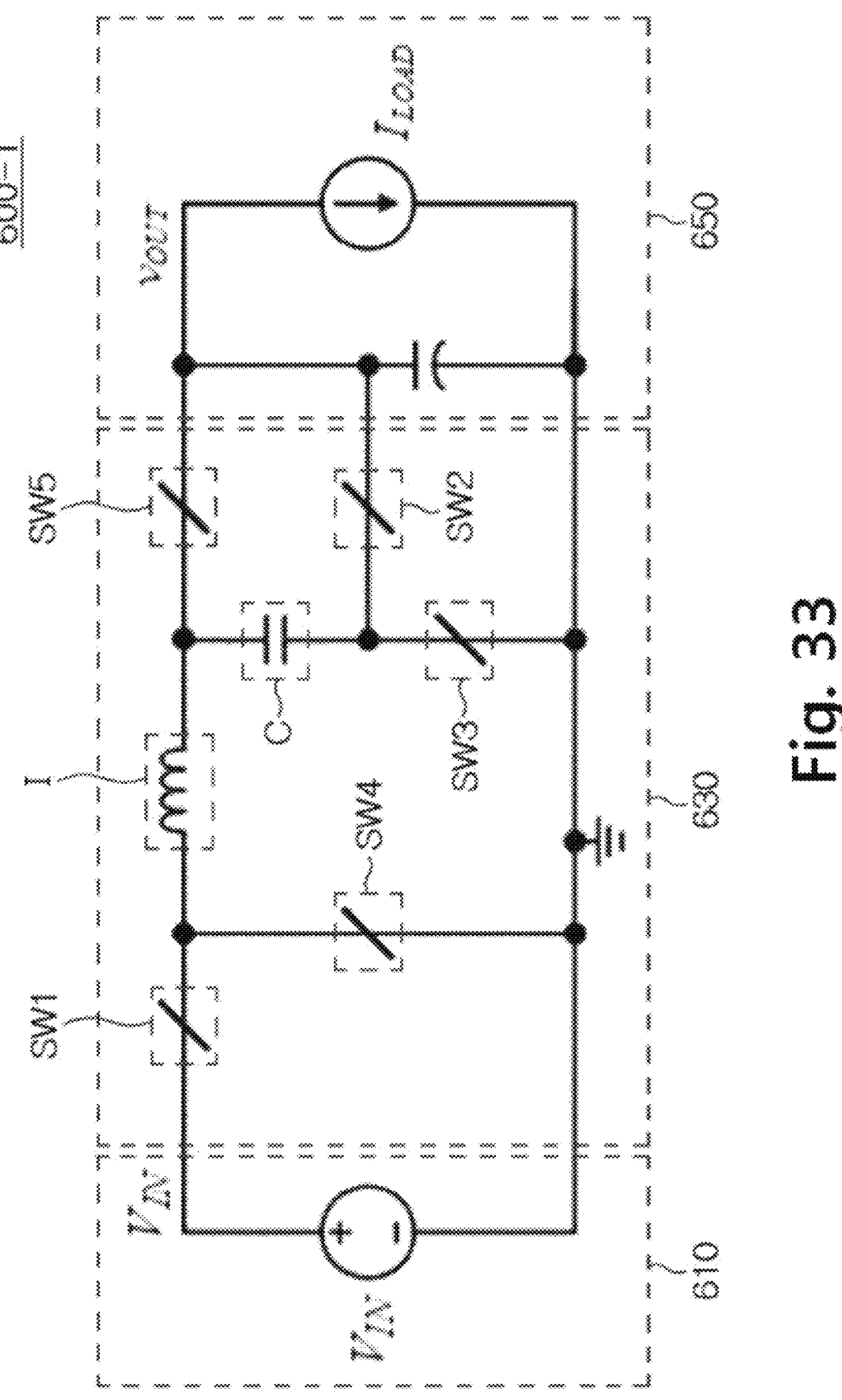
FIG. 33 is a circuit diagram illustrating a configuration of a sixth step-down converter with a dual-path according to the exemplary embodiment.
Figures 34A, 34B:
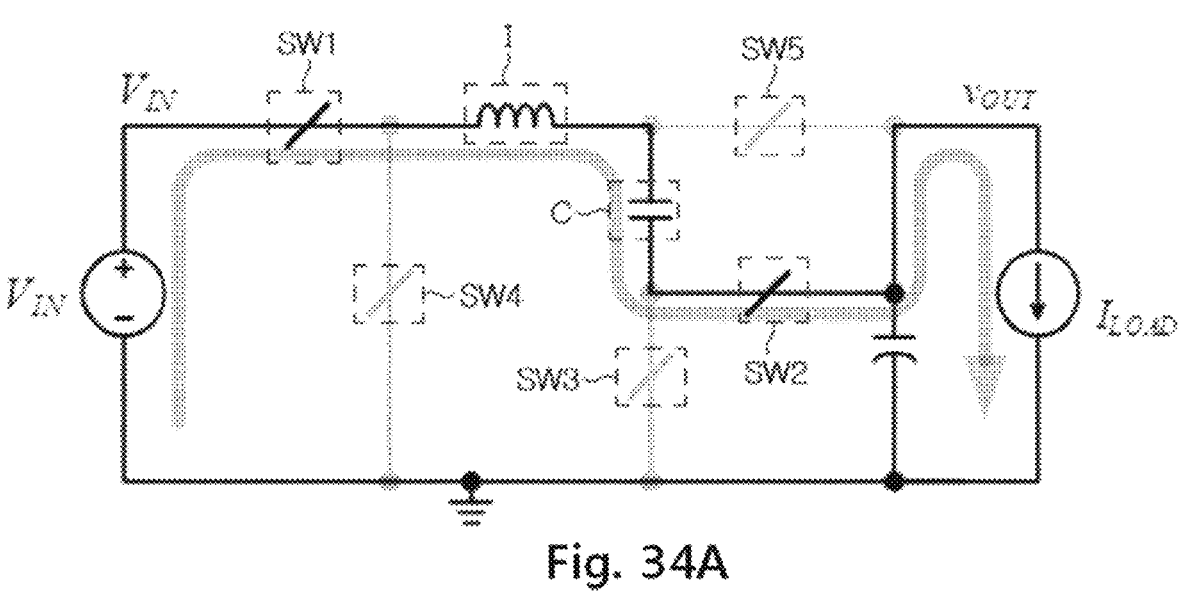
FIGS. 34A and 34B show diagrams for describing an example of a step-down operation mode of the sixth step-down converter shown in FIG. 33.
Figure 35A:
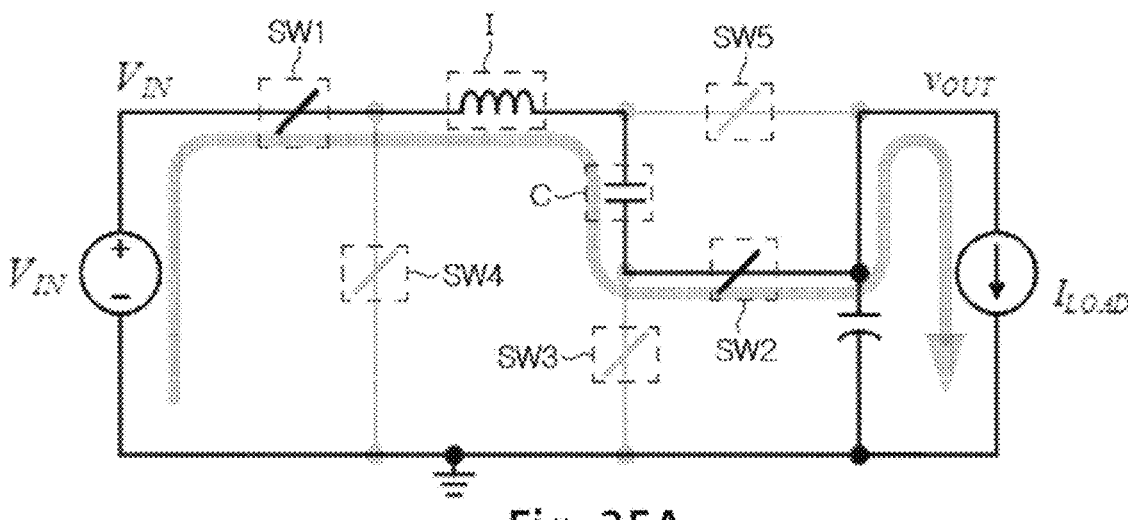
FIGS. 35A to 35C show diagrams for describing another example of a step-down operation mode of the sixth step-down converter shown in FIG. 33.
Figure 35B:
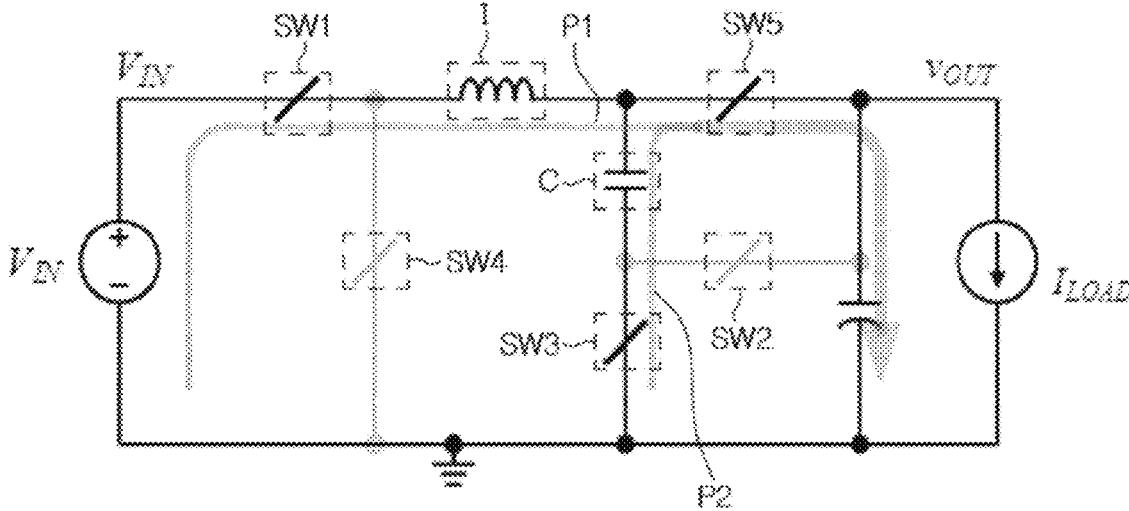
Figure 35C:
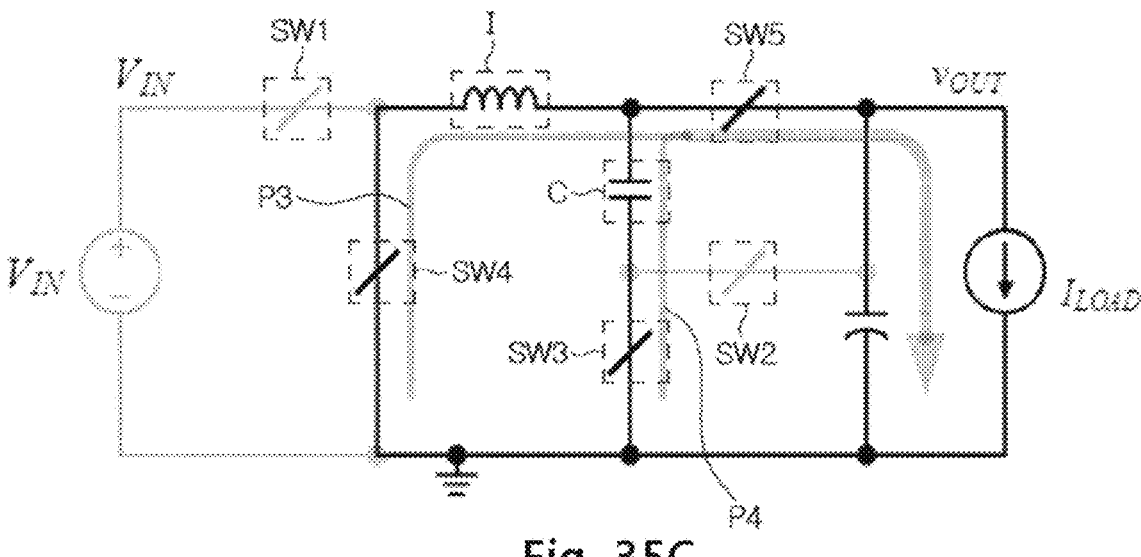

FIG. 33 is a circuit diagram illustrating a configuration of the sixth step-down converter with the dual-path according to the exemplary embodiment. FIGS. 34A and 34B show diagrams for describing an example of a step-down operation mode of the sixth step-down converter shown in FIG. 33. FIGS. 35A to 35C show diagrams for describing another example of a step-down operation mode of the sixth step-down converter shown in FIG. 33.

Referring to FIG. 33, a sixth step-down converter 600-1 with a dual-path (hereinafter, referred to as a "sixth step-down converter") according to the exemplary embodiment is configured by changing positions of some elements of the second step-down converter 200-1 and adding a fifth switch SW5. Here, a power conversion ratio ($V_{OUT}/V_{IN}$) of the sixth step-down converter 600-1 is in the range of 0 to 1.

That is, a conversion unit 630 may include an inductor I, a capacitor C, a first switch SW1, a second switch SW2, a third switch SW3, a fourth switch SW4, and a fifth switch SW5.

One end of the inductor I is connected to a node between the first switch SW1 and the fourth switch SW4, and the other end thereof is connected to a node between the fifth switch SW5 and the capacitor C.

One end of the capacitor C is connected to a node between the inductor I and the fifth switch SW5, and the other end thereof is connected to a node between the second switch SW2 and the third switch SW3.

One end of the first switch SW1 is connected to an input unit 610, and the other end thereof is connected to a node between the inductor I and the fourth switch SW4.

One end of the second switch SW2 is connected to a node between the capacitor C and the third switch SW3, and the other end thereof is connected to a node between the fifth switch SW5 and an output unit 650.

One end of the third switch SW3 is connected to a node between the capacitor C and the second switch SW2, and the other end thereof is connected to a node between the fourth switch SW4 and the output unit 650.

One end of the fourth switch SW4 is connected to a node between the first switch SW1 and the inductor I, and the other end thereof is connected to a node between the input unit 610 and the third switch SW3.

One end of the fifth switch SW5 is connected to a node between the inductor I and the capacitor C, and the other end thereof is connected to a node between the output unit 650 and the second switch SW2.

More specifically, the conversion unit 630 may be driven in the order of a first step-down operation mode and a third step-down operation mode. That is, the conversion unit 630 may periodically perform an operation that sequentially includes the first step-down operation mode and the third step-down operation mode. As such, the conversion unit 630 may step down and transfer power input from the input unit 610 to the output unit 650.

That is, as shown in FIG. 34A, the conversion unit 630 may be driven in the first step-down operation mode in which the first switch SW1 and the second switch SW2 are turned on and the third switch SW3, the fourth switch SW4, and the fifth switch SW5 are turned off.

After the conversion unit 630 is driven in the first step-down operation mode, the conversion unit 630 may be driven in the third step-down operation mode in which the first switch SW1, the third switch SW3, and the fifth switch SW5 are turned on and the second switch SW2 and the fourth switch SW4 are turned off, as shown in FIG. 34B. Accordingly, a current which flows to the output unit 650 (i.e., a load) is divided and transferred through a first current transfer path P1 using the inductor I and a second current transfer path P2 using the capacitor C. Therefore, an RMS value of the current flowing in the inductor I is reduced due to the additional current transfer path using the capacitor C.

Furthermore, the conversion unit 630 may be driven in the order of the first step-down operation mode and a second step-down operation mode. That is, the conversion unit 630 may periodically perform an operation that sequentially includes the first step-down operation mode and the second step-down operation mode. As such, the conversion unit 630 may step down and transfer power input from the input unit 610 to the output unit 650.

That is, as shown in FIG. 35A, the conversion unit 630 may be driven in the first step-down operation mode in which the first switch SW1 and the second switch SW2 are turned on and the third switch SW3, the fourth switch SW4, and the fifth switch SW5 are turned off.

After the conversion unit 630 is driven in the first step-down operation mode, the conversion unit 630 may be driven in the second step-down operation mode in which the third switch SW3, the fourth switch SW4, the fifth switch SW5 are turned on and the first switch SW1 and the second switch SW2 are turned off, as shown in FIG. 35C. Accordingly, a current which flows to the output unit 650 (i.e., a load) is divided and transferred through a third current transfer path P3 using the inductor I and a fourth current transfer path P4 using the capacitor C. Therefore, an RMS value of the current flowing in the inductor I is reduced due to the additional current transfer path using the capacitor C.

According to an exemplary embodiment, the conversion unit 630 may be driven in the order of the first step-down operation mode, the third step-down operation mode, and a second step-down operation mode. That is, the conversion unit 630 may periodically perform an operation that sequentially includes the first step-down operation mode, the third step-down operation mode, and the second step-down operation mode. As such, the conversion unit 630 may step down and transfer power input from the input unit 610 to the output unit 650.

That is, as shown in FIG. 35A, the conversion unit 630 may be driven in the first step-down operation mode in which the first switch SW1 and the second switch SW2 are turned on and the third switch SW3, the fourth switch SW4, and the fifth switch SW5 are turned off.

After the conversion unit 630 is driven in the first step-down operation mode, the conversion unit 630 may be driven in the third step-down operation mode in which the first switch SW1, the third switch SW3, the fifth switch SW5 are turned on and the second switch SW2 and the fourth switch SW4 are turned off, as shown in FIG. 35B. Accordingly, a current which flows to the output unit 650 (i.e., a load) is divided and transferred through a first current transfer path P1 using the inductor I and a second current transfer path P2 using the capacitor C. Therefore, an RMS value of the current flowing in the inductor I is reduced due to the additional current transfer path using the capacitor C.

In addition, after the conversion unit 630 is driven in the third step-down operation mode, the conversion unit 630 may be driven in the second step-down operation mode in which the third switch SW3, the fourth switch SW4, and the fifth switch SW5 are turned on and the first switch SW1 and the second switch SW2 are turned off, as shown in FIG. 35C. Accordingly, a current flowing to the output unit 650 (i.e., the load) is divided and transferred through a third current transfer path P3 using the inductor I and a fourth current transfer path P4 using the capacitor 2. Therefore, an RMS value of the current flowing in the inductor I is reduced due to the additional current transfer path using the capacitor C.

A seventh step-down converter with a dual-path according to the exemplary embodiment will be described with reference to FIG. 36.

Figure 36:
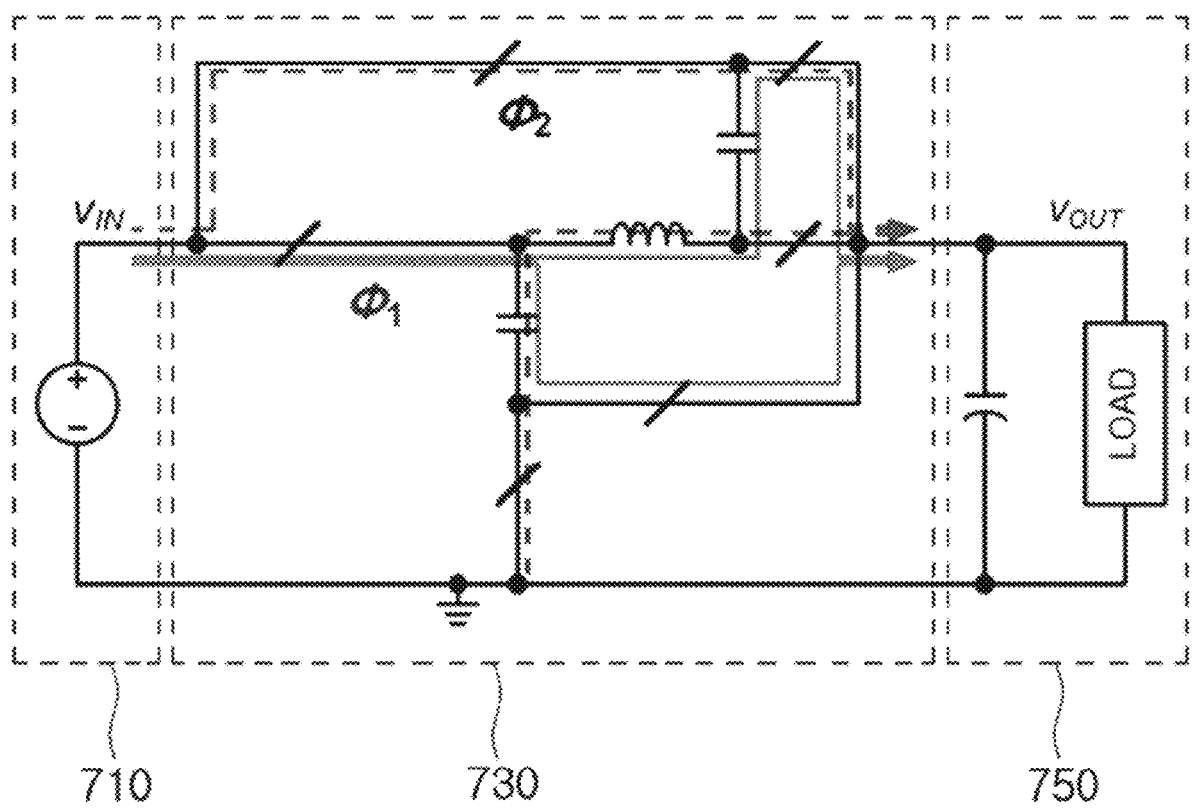
FIG. 36 is a circuit diagram illustrating a configuration of a seventh step-down converter with a dual-path according to the exemplary embodiment.

FIG. 36 is a circuit diagram illustrating a configuration of the seventh step-down converter with the dual-path according to the exemplary embodiment.

Since a seventh step-down converter 700-1 with a dual-path (hereinafter referred to as a "seventh step-down converter") according to the exemplary embodiment is substantially the similar to the first step-down converter 100-1, differences therebetween will be described.

Referring to FIG. 36, the seventh step-down converter 700-1 according to the exemplary embodiment further includes three switches and one capacitor added to the first step-down converter 100-1.

Accordingly, in the seventh step-down converter 700-1 according to the exemplary embodiment, unlike the first step-down converter 100-1, sections in which currents are supplied in parallel may be expanded to two phases according to the exemplary embodiment.

More specifically, a conversion unit 730 may be driven in the order of a first step-down operation mode $\Phi_1$ and a second step-down operation mode $\Phi_2$. That is, the conversion unit 730 may periodically perform an operation that sequentially includes the first step-down operation mode $\Phi_1$ and the second step-down operation mode $\Phi_2$ and may step down and transfer power input from an input unit 710 to an output unit 750.

That is, as shown in FIG. 36, the conversion unit 730 may be driven in the first step-down operation mode $\Phi_1$ in which a current flowing to the output unit 750 (i.e., a load) is divided and transferred through a first current transfer path using a capacitor and a second current transfer path using at least one inductor and at least one capacitor.

After the conversion unit 730 is driven in the first step-down operation mode $\Phi_1$, the conversion unit 730 may be driven in the second step-down operation mode $\Phi_2$, as shown in FIG. 36. Accordingly, a current flowing to the output unit 750 (i.e., the load) is divided and transferred through a third current transfer path using a capacitor and an inductor and a fourth current transfer path using a switch.

As described above, in the seventh step-down converter 700-1 according to the exemplary embodiment, sections in which currents are supplied in parallel may be expanded to the step-down operation modes $\Phi_1$ and $\Phi_2$, that is, two phases, unlike the first step-down converter 100-1.

An eighth step-down converter with a dual-path according to the exemplary embodiment will be described with reference to FIG. 37.

Figure 37:
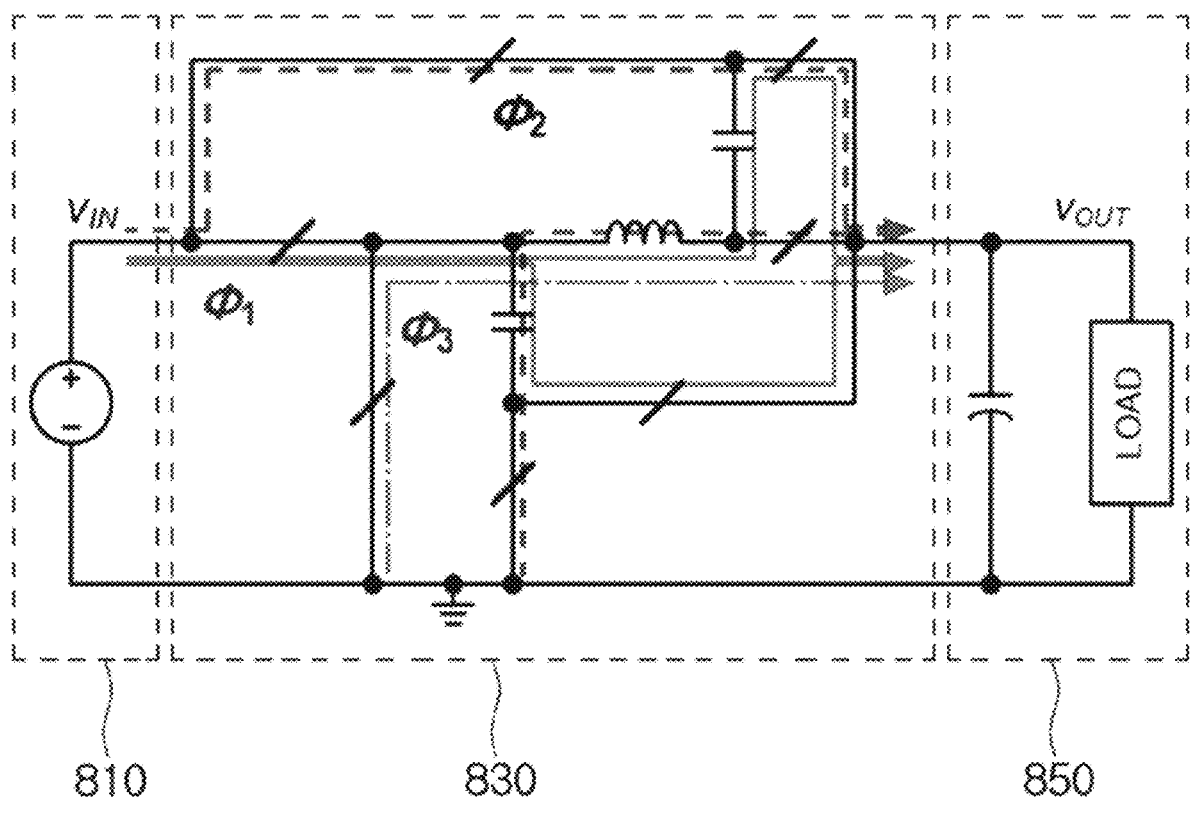
FIG. 37 is a circuit diagram illustrating a configuration of an eighth step-down converter with a dual-path according to the exemplary embodiment.

FIG. 37 is a circuit diagram illustrating a configuration of the eighth step-down converter with the dual-path according to the exemplary embodiment.

Since an eighth step-down converter 800-1 with a dual-path (hereinafter referred to as an "eighth step-down converter") according to the exemplary embodiment is substantially similar to the second step-down converter 200-1 according to the, differences therebetween will be described.

Referring to FIG. 37, the eighth step-down converter 800-1 according to the exemplary embodiment further includes three switches and one capacitor added to the second step-down converter 200-1.

Accordingly, in the eighth step-down converter 800-1 according to the exemplary embodiment, sections in which currents are supplied in parallel may be expanded to two phases, unlike the second step-down converter 200-1.

More specifically, a conversion unit 830 may be driven in the order of a first step-down operation mode $\Phi_1$, a third step-down operation mode $\Phi_2$, and a second step-down operation mode $\Phi_3$. That is, the conversion unit 830 may periodically perform an operation that sequentially includes the first step-down operation mode $\Phi_1$, the third step-down operation mode 2, and the second step-down operation mode $\Phi_2$ and may step down and transfer power input from an input unit 810 to an output unit 850.

That is, as shown in FIG. 37, the conversion unit 830 may be driven in the first step-down operation mode $\Phi_1$. Accordingly, a current which flows to the output unit 850 (i.e., a load) is divided and transferred through a first current transfer path using a capacitor and a second current transfer path using at least one inductor and at least one capacitor.

After the conversion unit 830 is driven in the first step-down operation mode $\Phi_1$, the conversion unit 630 may be driven in the third step-down operation mode $\Phi_2$, as shown in FIG. 37. Accordingly, a current which flows to the output unit 850 (i.e., the load) is divided and transferred through a third current transfer path using a capacitor and an inductor and a fourth current transfer path using a switch.

In addition, after the conversion unit 830 is driven in the third step-down operation mode $\Phi_2$, as shown in FIG. 37, the conversion unit 830 may be driven in the second step-down operation mode $\Phi_3$. Accordingly, a current which flows to the output unit 850 (i.e., the load) is transferred through a fifth current transfer path using an inductor.

As described above, in the eighth step-down converter 800-1 according to the exemplary embodiment, sections in which currents are supplied in parallel may be expanded to the first and third step-down operation modes $\Phi_1$ and $\Phi_2$, that is, two phases, unlike the second step-down converter 200-1 according to the exemplary embodiment A ninth step-down converter with a dual-path according to the exemplary embodiment will be described with reference to FIG. 38.

Figure 38:
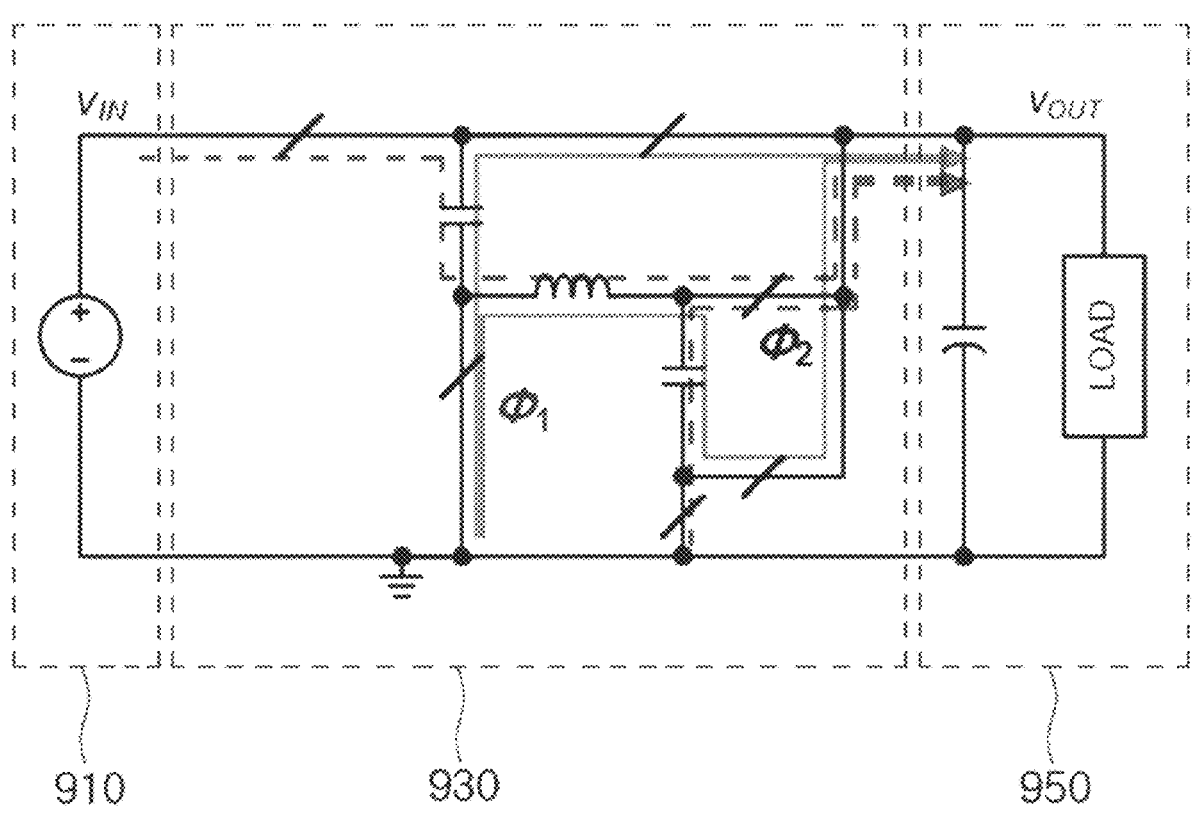
FIG. 38 is a circuit diagram illustrating a configuration of a ninth step-down converter with a dual-path according to the exemplary embodiment.

FIG. 38 is a circuit diagram illustrating a configuration of the ninth step-down converter with the dual-path according to the exemplary embodiment.

Since a ninth step-down converter 900-1 with a dual-path (hereinafter referred to as a "ninth step-down converter") according to the exemplary embodiment is substantially similar to the fourth step-down converter 400-1, differences therebetween will be described.

Referring to FIG. 38, the ninth step-down converter 900-1 according to the exemplary embodiment further includes three switches and one capacitor added to the fourth step-down converter 400-1.

Accordingly, in the ninth step-down converter 900-1 according to the exemplary embodiment, sections in which currents are supplied in parallel may be expanded to two phases unlike the fourth step-down converter 400-1 according to the exemplary embodiment.

More specifically, a conversion unit 930 may be driven in the order of a first step-down operation mode $\Phi_1$ and a second step-down operation mode $\Phi_2$. That is, the conversion unit 930 may periodically perform an operation that sequentially includes the first step-down operation mode $\Phi_1$ and the second step-down operation mode $\Phi_2$ and may step down and transfer power input from an input unit 910 to an output unit 950.

That is, as shown in FIG. 38, the conversion unit 930 may be driven in the first step-down operation mode $\Phi_1$. Accordingly, a current which flows to the output unit 950 (i.e., a load) is divided and transferred through a first current transfer path using a capacitor and a second current transfer path using at least one inductor and at least one capacitor.

After the conversion unit 930 is driven in the first step-down operation mode $\Phi_1$, the conversion unit 930 may be driven in the second step-down operation mode $\Phi_2$, as shown in FIG. 38. Accordingly, a current which flows to the output unit 950 (i.e., the load) is divided and transferred through a third current transfer path using a capacitor and an inductor and a fourth current transfer path using a capacitor.

As described above, in the ninth step-down converter 900-1 according to the exemplary embodiment, sections in which currents are supplied in parallel may be expanded to step-down operation modes $\Phi_1$ and $\Phi_2$, that is, two phases, unlike the fourth step-down converter 400-1.

A tenth step-down converter with a dual-path according to the exemplary embodiment will be described with reference to FIG. 39.

FIG. 39 is a circuit diagram illustrating a configuration of the tenth step-down converter with the dual-path according to the exemplary embodiment.

Since a tenth step-down converter 1000-1 with a dual-path (hereinafter referred to as a "tenth step-down converter") according to the exemplary embodiment is substantially similar to the fifth step-down converter 500-1, differences therebetween will be described.

Referring to FIG. 39, the tenth step-down converter 1000-1 according to the exemplary embodiment further includes three switches and one capacitor added to the fifth step-down converter 500-1.

Accordingly, in the tenth step-down converter 1000-1 according to the exemplary embodiment, sections in which currents are supplied in parallel may be expanded to two phases unlike the fifth step-down converter 500-1.

More specifically, a conversion unit 1030 may be driven in the order of a first step-down operation mode $\Phi_1$, a third step-down operation mode $\Phi_2$, and a second step-down operation mode $\Phi_3$. That is, the conversion unit 1030 may periodically perform an operation that sequentially includes the first step-down operation mode $\Phi_1$, the third step-down operation mode $\Phi_2$, and the second step-down operation mode $\Phi_3$ and may step down and transfer power input from an input unit 1010 to an output unit 1050.

That is, as shown in FIG. 39, the conversion unit 1030 may be driven in the first step-down operation mode $\Phi_1$. Accordingly, a current which flows to the output unit 1050 (i.e., a load) is divided and transferred through a first current transfer path using a capacitor and a second current transfer path using at least one inductor and at least one capacitor.

After the conversion unit 1030 is driven in the first step-down operation mode $\Phi_1$, the conversion unit 1030 may be driven in the third step-down operation mode $\Phi_2$, as shown in FIG. 39. Accordingly, a current which flows to the output unit 1050 (i.e., the load) is transferred through a third current transfer path using an inductor.

In addition, after the conversion unit 1030 is driven in the third step-down operation mode $\Phi_2$, the conversion unit 1030 may be driven in the second step-down operation mode $\Phi_3$, as shown in FIG. 39. Accordingly, a current which flows to the output unit 1050 (i.e., the load) is divided and transferred through a fourth current transfer path using a capacitor and an inductor and a fifth current transfer path using a capacitor.

As described above, in the tenth step-down converter 1000-1 according to the exemplary embodiment, sections in which currents are supplied in parallel may be expanded to the first and second step-down operation modes $\Phi_1$ and $\Phi_3$, that is, two phases, unlike the fifth step-down converter 500-1.

An eleventh step-down converter with a triple-path according to the exemplary embodiment will be described with reference to FIG. 40.

Figure 40:
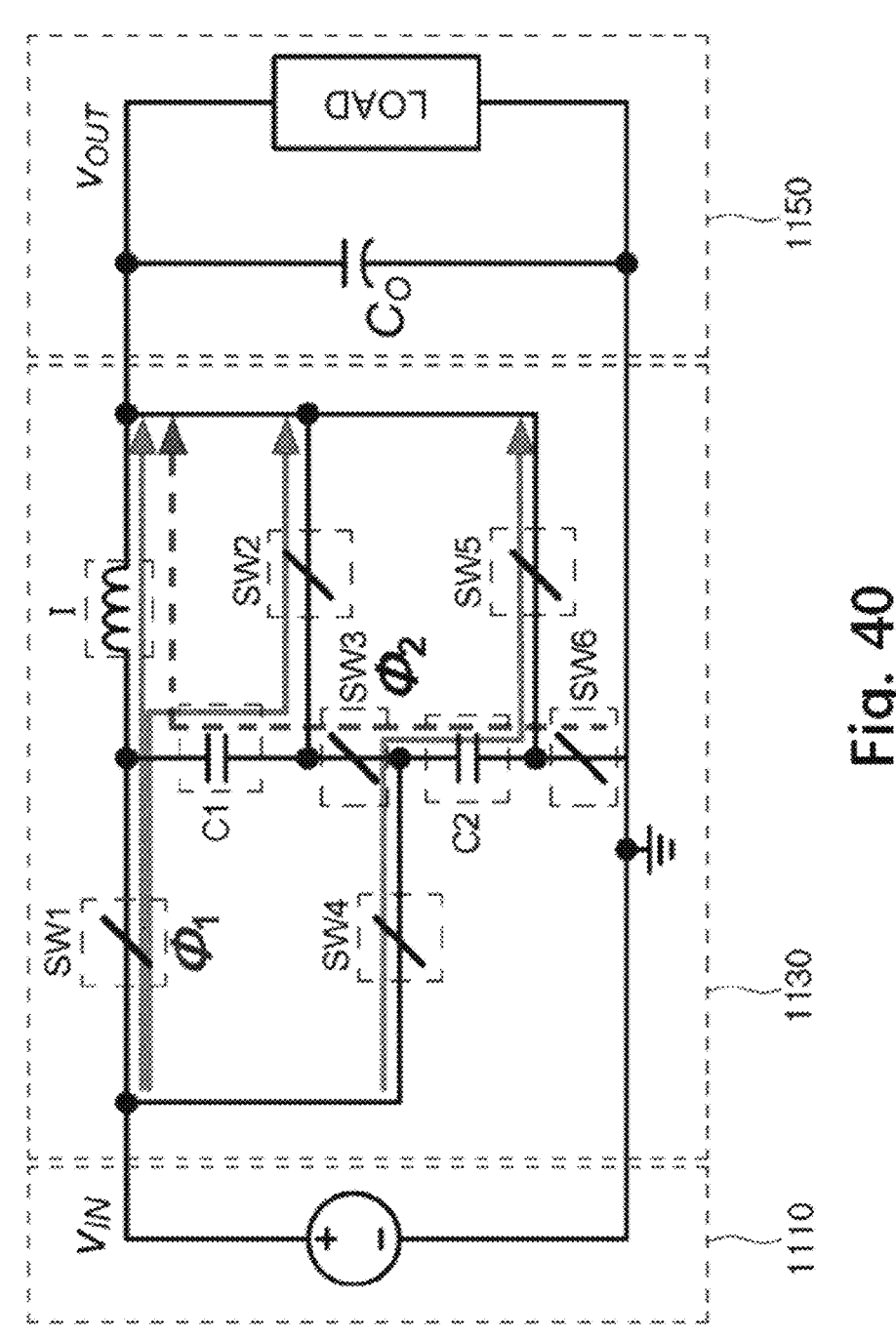
FIG. 40 is a circuit diagram illustrating a configuration of an eleventh step-down converter with a triple-path according to the exemplary embodiment.

FIG. 40 is a circuit diagram illustrating a configuration of the eleventh step-down converter with the triple-path according to the exemplary embodiment.

Referring to FIG. 40, an eleventh step-down converter 1100-1 with a triple-path (hereinafter, referred to as an "eleventh step-down converter") according to the exemplary embodiment is configured by expanding the first step-down converter 100-1 so as to have three current transfer paths. Here, a power conversion ratio ($V_{OUT}/V_{IN}$) of the eleventh step-down converter 1100-1 is in the range of 0.67 to 1.

That is, a conversion unit 1130 may include an inductor I, a first capacitor C1, a second capacitor C2, a first switch SW1, a second switch SW2, a third switch SW3, a fourth switch SW4, a fifth switch SW5, and a sixth switch SW6.

One end of the inductor I is connected to a node between the first switch SW1 and the first capacitor C1, and the other end thereof is connected to a node between an output unit 1150 and the second switch SW2.

One end of the first capacitor C1 is connected to a node between the first switch SW1 and the inductor I, and the other end thereof is connected to a node between the second switch SW2 and the third switch SW3.

One end of the second capacitor C2 is connected to a node between the third switch SW3 and the fourth switch SW4, and the other end thereof is connected to a node between the fifth switch SW5 and the sixth switch SW6.

One end of the first switch SW1 is connected to an input unit 1110, and the other end thereof is connected to a node between the inductor I and the first capacitor C1.

One end of the second switch SW2 is connected to a node between the first capacitor C1 and the third switch SW3, and the other end thereof is connected to a node between the inductor I and the output unit 1150.

One end of the third switch SW3 is connected to a node between the first capacitor C1 and the second switch SW2, and the other end thereof is connected to a node between the fourth switch SW4 and the second capacitor C2.

One end of the fourth switch SW4 is connected to a node between the input unit 1110 and the first switch SW1, and the other end thereof is connected to a node between the third switch SW3 and the second capacitor C2.

One end of the fifth switch SW5 is connected to a node between the second capacitor C2 and the sixth switch SW6, and the other end thereof is connected to a node between the inductor I and the second switch SW2.

One end of the sixth switch SW6 is connected to a node between the second capacitor C2 and the fifth switch SW5, and the other end thereof is connected to a node between the input unit 1110 and the output unit 1150.

More specifically, the conversion unit 1130 may be driven in the order of a first step-down operation mode $\Phi_1$ and a second step-down operation mode $\Phi_2$. That is, the conversion unit 1130 may periodically perform an operation that sequentially includes the first step-down operation mode $\Phi_1$ and the second step-down operation mode $\Phi_2$ and may step down and transfer power input from the input unit 1110 to the output unit 1150. In this case, a duty ratio indicating a driving time of the first step-down operation mode $\Phi_1$ may be determined based on an input voltage, an output voltage, and the like.

That is, as shown in FIG. 40, the conversion unit 1130 may be driven in the first step-down operation mode $\Phi_1$ in which the first switch SW1, the second switch SW2, the fourth switch SW4, and the fifth switch SW5 are turned on and the third switch SW3 and the sixth switch SW6 are turned off. Accordingly, a current which flows to the output unit 1150 (i.e., a load) is divided and transferred through a triple-path including a first current transfer path using the first switch SW1 and the inductor I, a second current transfer path using the first switch SW1, the first capacitor C1, and the second switch SW2, and a third current transfer path using the fourth switch SW4, the second capacitor C2, and the fifth switch SW5. Therefore, due to the additional two current transfer paths using the two capacitors C1 and C2, an RMS value of the current flowing in the inductor I is further reduced as compared with a dual path structure.

After the conversion unit 1130 is driven in the first step-down operation mode $\Phi_1$, the conversion unit 1130 may be driven in the second step-down operation mode $\Phi_2$ in which the third switch SW3 and the sixth switch SW6 are turned on and the first switch SW1, the second switch SW2, the fourth switch SW4, and the fifth switch SW5 are turned off, as shown in FIG. 40.

A twelfth step-down converter with a triple-path according to the exemplary embodiment will be described with reference to FIG. 41.

Figure 41:
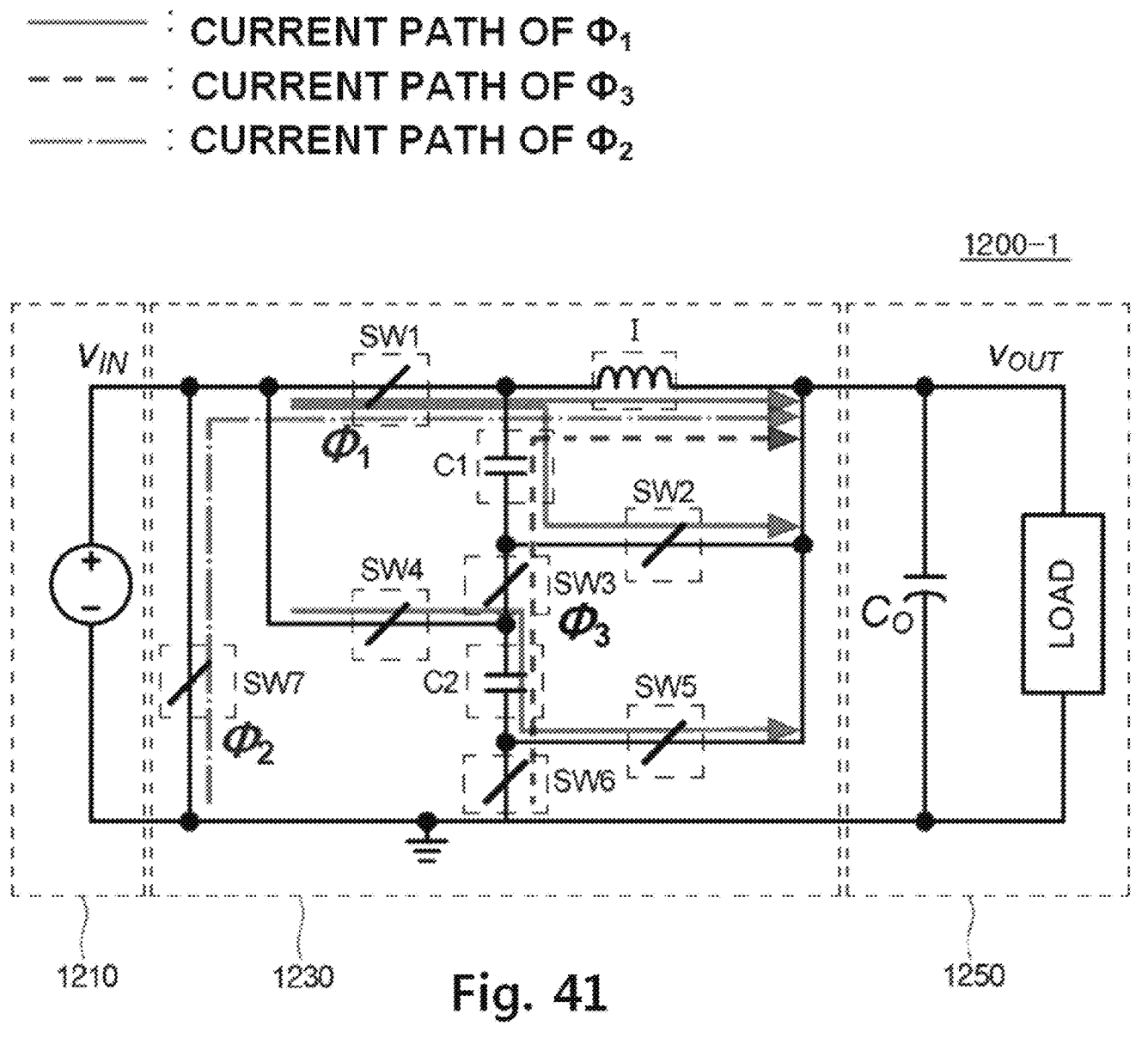

FIG. 41 is a circuit diagram illustrating a configuration of the twelfth step-down converter with the triple-path according to the exemplary embodiment.

Referring to FIG. 41, a twelfth step-down converter 1200-1 with a triple-path (hereinafter, referred to as a "twelfth step-down converter") according to the exemplary embodiment further includes a seventh switch SW7 added to the eleventh step-down converter 1100-1.

That is, a conversion unit 1230 includes an inductor I, a first capacitor C1, a second capacitor C2, a first switch SW1, a second switch SW2, a third switch SW3, a fourth switch SW4, a fifth switch SW5, a sixth switch SW6, and the seventh switch SW7.

One end of the seventh switch SW7 is connected to a node between an input unit 1210 and the first switch SW1, and the other end thereof is connected to a node between the input unit 1210 and the sixth switch SW6.

More specifically, a conversion unit 1230 may be driven in the order of a first step-down operation mode $\Phi_1$, a third step-down operation mode $\Phi_2$, and a second step-down operation mode $\Phi_3$. That is, the conversion unit 1230 may periodically perform an operation that sequentially includes the first step-down operation mode $\Phi_1$, the third step-down operation mode $\Phi_2$, and the second step-down operation mode $\Phi_3$ and may step down and transfer power input from the input unit 1210 to an output unit 1250.

That is, as shown in FIG. 41, the conversion unit 1230 may be driven in the first step-down operation mode $\Phi_1$ in which the first switch SW1, the second switch SW2, the fourth switch SW4, and the fifth switch SW5 are turned on and the third switch SW3, the sixth switch SW6, and the seventh SW7 are turned off. Accordingly, a current which flows to the output unit 1250 (i.e., a load) is divided and transferred through a first current transfer path using the first switch SW1 and the inductor I, a second current transfer path using the first switch SW1, the first capacitor C1, and the second switch SW2, and a third current transfer path using the fourth switch SW4, the second capacitor C2, and the fifth switch SW5. Therefore, due to the additional two current transfer paths using the two capacitors C1 and C2, an RMS value of the current flowing in the inductor I is further reduced as compared with a dual path structure.

After the conversion unit 1230 is driven in the first step-down operation mode $\Phi_1$, the conversion unit 1230 may be driven in the third step-down operation mode $\Phi_2$ in which the first switch SW1 and the seventh switch SW7 are turned on and the second switch SW2, the third switch SW3, the fourth switch SW4, the fifth switch SW5, and the sixth switch SW6 are turned off, as shown in FIG. 41.

In addition, after the conversion unit 1230 is driven in the third step-down operation mode $\Phi_2$, the conversion unit 1230 may be driven in the second step-down operation mode $\Phi_3$ in which the third switch SW3 and the sixth switch SW6 are turned on and the first switch SW1, the second switch SW2, the fourth switch SW4, the fifth switch SW5, and the seventh switch SW7 are turned off, as shown in FIG. 41.

As described above, unlike the eleventh step-down converter 1100-1 according to the exemplary embodiment, the twelfth step-down converter 1200-1 is driven in the third step-down operation mode by including the seventh switch SW7 and thus has a power conversion ratio ($V_{OUT}/V_{IN}$) ranging from 0 to 1, which is a range wider than that of the eleventh step-down converter 1100-1. Furthermore, in the twelfth step-down converter 1200-1, an RMS current flowing in the first switch SW1 may be further reduced as compared with the eleventh step-down converter 1100-1, and RMS currents flowing in two capacitors C1 and C2 may be further reduced by adjusting a duty ratio of the first step-down operation mode $\Phi_1$ and the second step-down operation mode $\Phi_3$.

A thirteenth step-down converter having a multi-path according to the exemplary embodiment will be described with reference to FIG. 42.

Figure 42:
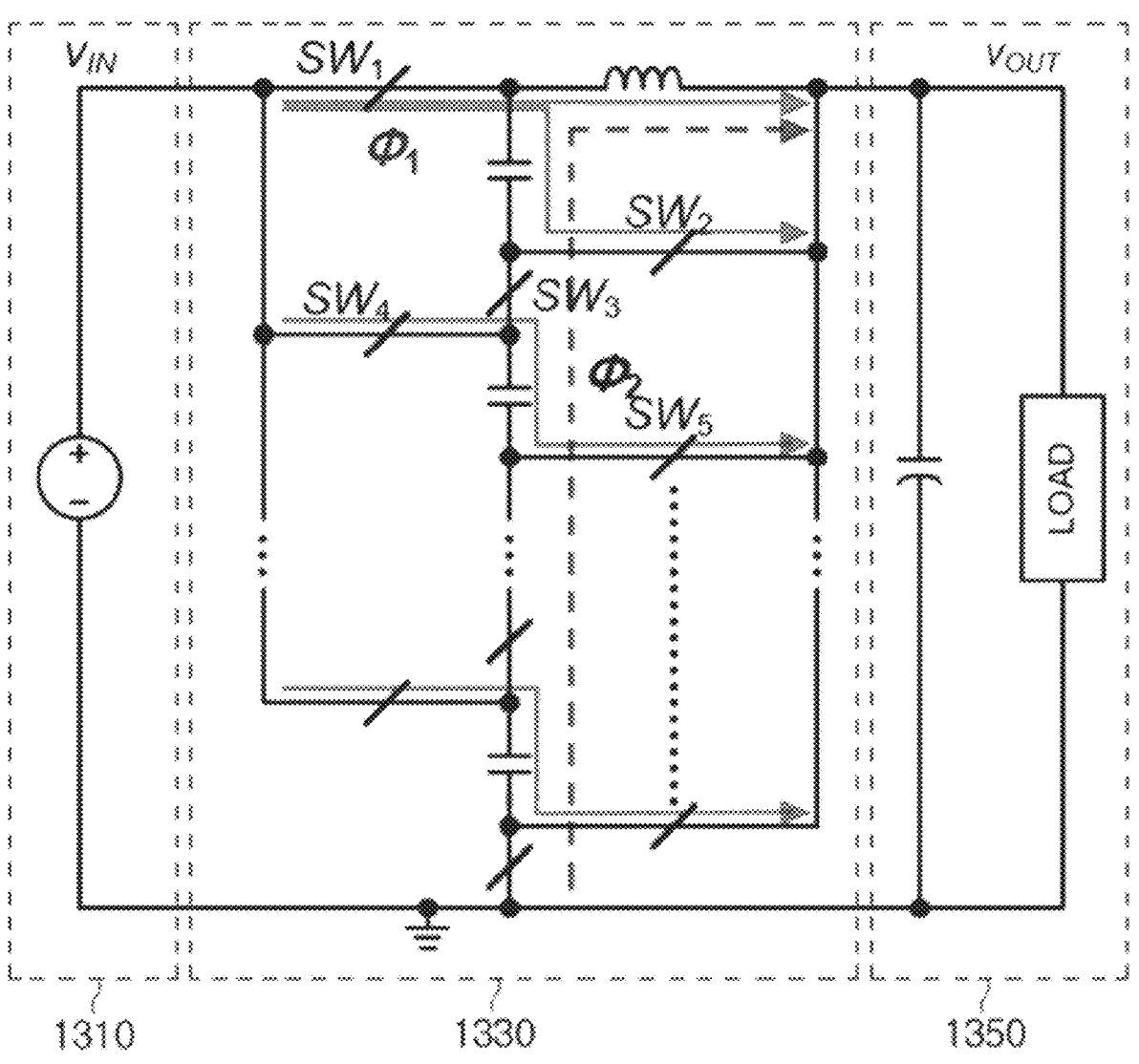
FIG. 42 is a circuit diagram illustrating a configuration of a thirteenth step-down converter with a multi-path according to the exemplary embodiment.

FIG. 42 is a circuit diagram illustrating a configuration of the thirteenth step-down multi-path converter according to the exemplary embodiment.

Referring to FIG. 42, a thirteenth step-down converter 1300-1 having a multi-path (hereinafter, referred to as a "thirteenth step-down converter") according to the exemplary embodiment is configured by expanding the first step-down converter 100-1 so as to have n current transfer paths. Here, a power conversion ratio ($V_{OUT}/V_{IN}$) of the thirteenth step-down converter 1300-1 is in the range of (n−1)/n to 1.

A conversion unit 1330 may include n−1 capacitors and a plurality of switches.

More specifically, the conversion unit 1330 may be driven in the order of a first step-down operation mode $\Phi_1$ and a second step-down operation mode $\Phi_2$. That is, the conversion unit 1330 may periodically perform an operation that sequentially includes the first step-down operation mode $\Phi_1$ and the second step-down operation mode $\Phi_2$ and may step down and transfer power input from an input unit 1310 to an output unit 1350.

That is, as shown in FIG. 42, the conversion unit 1330 may be driven in the first step-down operation mode $\Phi_1$. Accordingly, a current which flows to the output unit 1350 (i.e., a load) is divided and transferred through multiple paths including a current transfer path using an inductor and n−1 current transfer paths using capacitors. Therefore, due to the additional n−1 current transfer paths using n−1 capacitors, an RMS value of the current flowing in the inductor I is further reduced.

After the conversion unit 1330 is driven in the first step-down operation mode $\Phi_1$, as shown in FIG. 42, the conversion unit 1330 may be driven in the second step-down operation mode $\Phi_2$.

A fourteenth step-down converter with multiple paths according to the exemplar embodiment of the present invention will be described with reference to FIG. 43.

Figure 43:
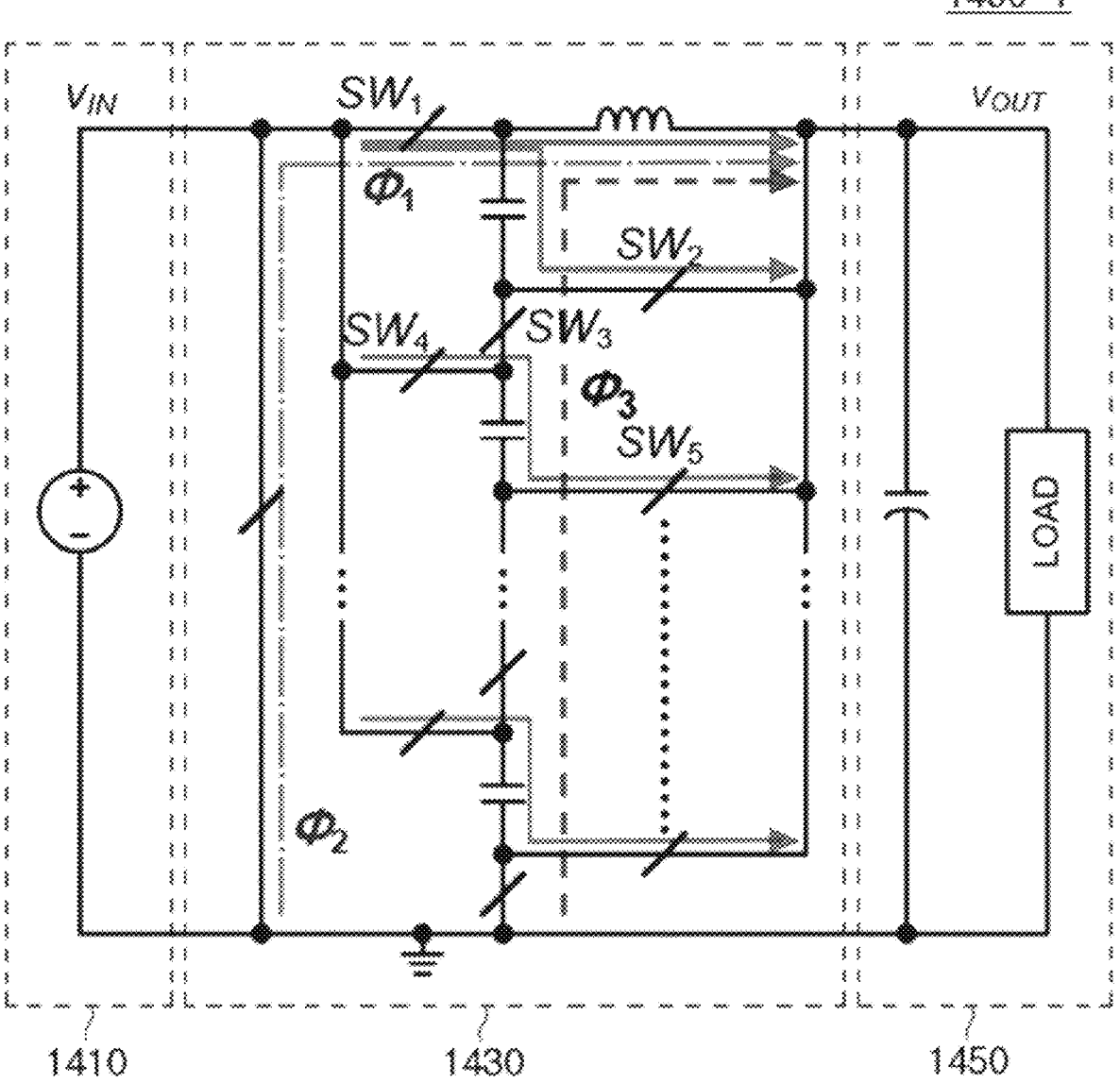
FIG. 43 is a circuit diagram illustrating a configuration of a fourteenth step-down converter with a multi-path according to the exemplary embodiment.

FIG. 43 is a circuit diagram illustrating a configuration of the fourteenth step-down multi-path converter according to the exemplary embodiment.

Referring to FIG. 43, a fourteenth step-down converter 1400-1 with multiple paths (hereinafter, referred to as a "fourteenth step-down converter") according to the exemplary embodiment further includes one switch added to the thirteenth step-down converter 1300-1.

More specifically, a conversion unit 1430 may be driven in the order of a first step-down operation mode $\Phi_1$, a third step-down operation mode $\Phi_2$, and a second step-down operation mode $\Phi_3$. That is, the conversion unit 1430 may periodically perform an operation that sequentially includes the first step-down operation mode $\Phi_1$, the third step-down operation mode $\Phi_2$, and the second step-down operation mode $\Phi_3$ and may step down and transfer power input from an input unit 1410 to an output unit 1450.

That is, as shown in FIG. 43, the conversion unit 1430 may be driven in the first step-down operation mode $\Phi_1$. Accordingly, a current which flows to the output unit 1450 (i.e., a load) is divided and transferred through multiple paths including a current transfer path using an inductor and n−1 current transfer paths using capacitors. Therefore, due to the additional n−1 current transfer paths using n−1 capacitors, an RMS value of the current flowing in the inductor I is further reduced.

After the conversion unit 1430 is driven in the first step-down operation mode $\Phi_1$, the conversion unit 1430 may be driven in the third step-down operation mode $\Phi_2$ as shown in FIG. 43.

In addition, after the conversion unit 1430 is driven in the third step-down operation mode $\Phi_2$, the conversion unit 1430 may be driven in the second step-down operation mode $\Phi_3$, as shown in FIG. 43, As described above, unlike the thirteenth step-down converter 1300-1, the fourteenth step-down converter 1400-1 is driven in the third step-down operation mode by including the additional switch. As such, the fourteenth step-down converter 1400-1 has a power conversion ratio ($V_{OUT}/V_{IN}$) ranging from 0 to 1, which is a range wider than that of the thirteenth step-down converter 1300-1. Furthermore, in the fourteenth step-down converter 1400-1, an RMS current flowing in a first switch SW1 may be further reduced as compared with the thirteenth step-down converter 1300-1, and RMS currents flowing in the n−1 capacitors may be further reduced by adjusting a duty ratio of the first step-down operation mode $\Phi_1$ and the second step-down operation mode $\Phi_3$.

Embodiment 2: Multi-Path Step-Up Converter

Hereinafter, a multi-path converter and a control method thereof according to the exemplary embodiments will be described in detail with reference to FIGS. 44 to 58.

The exemplary embodiments below relate to a multi-path converter which performs a function of a step-up converter configured to step up input power. That is, an output voltage $V_{OUT}$ is higher than an input voltage $V_{IN}$, and a current is divided and transferred to an output terminal through a plurality of current transfer paths (for example, two current transfer paths, three current transfer paths, or n current transfer paths) using at least one inductor and at least one capacitor.

First, a first step-up converter with a dual-path according to an exemplary embodiment will be described with reference to FIGS. 44 to 48.

Figure 44:
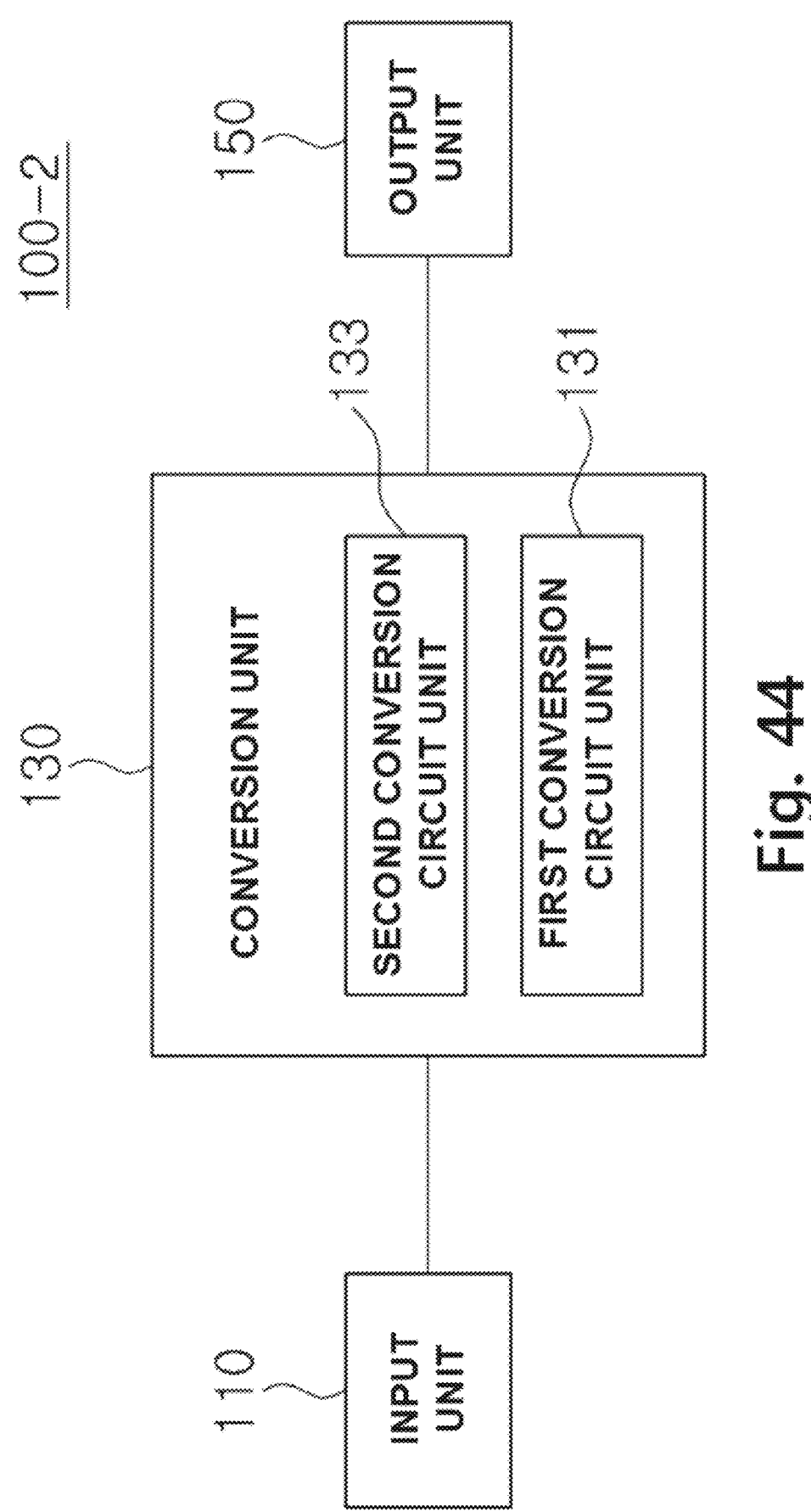
FIG. 44 is a block diagram illustrating a first step-up converter with a dual-path according to another exemplary embodiment.
Figure 45:
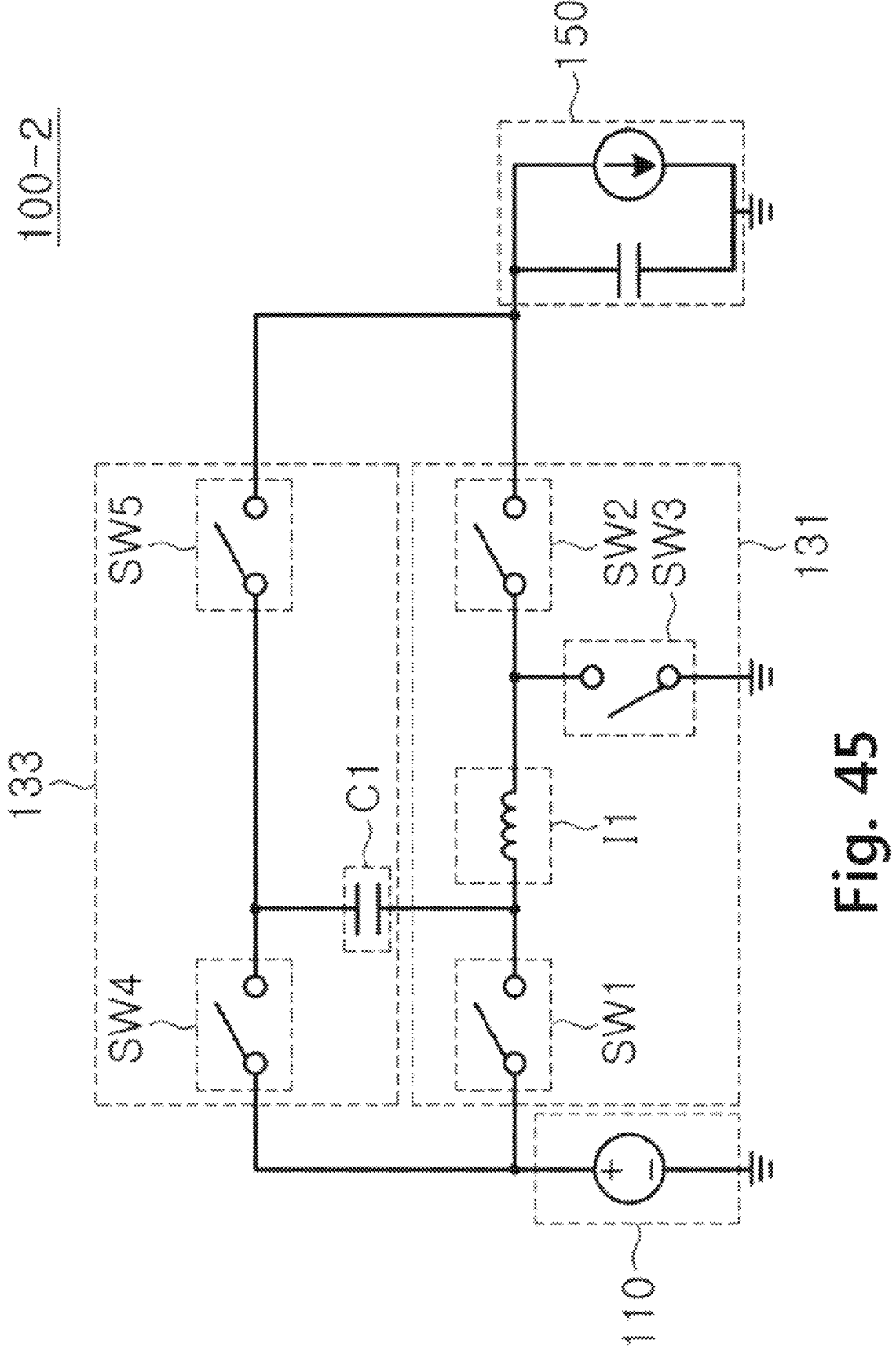
FIG. 45 is a circuit diagram illustrating a configuration of the first step-up converter shown in FIG. 44.
Figure 46A:
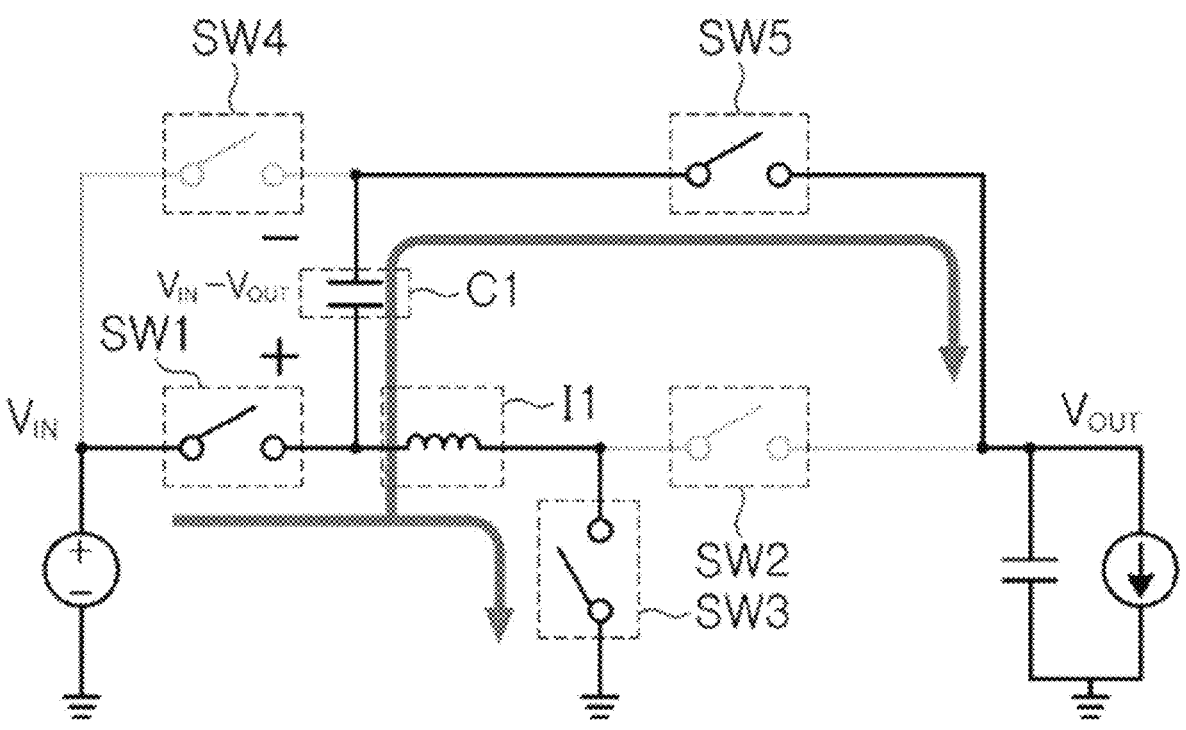
FIGS. 46A and 46B show diagrams for describing an example of a step-up operation mode of the first step-up converter with the dual-path according to another exemplary embodiment.
Figure 46B:
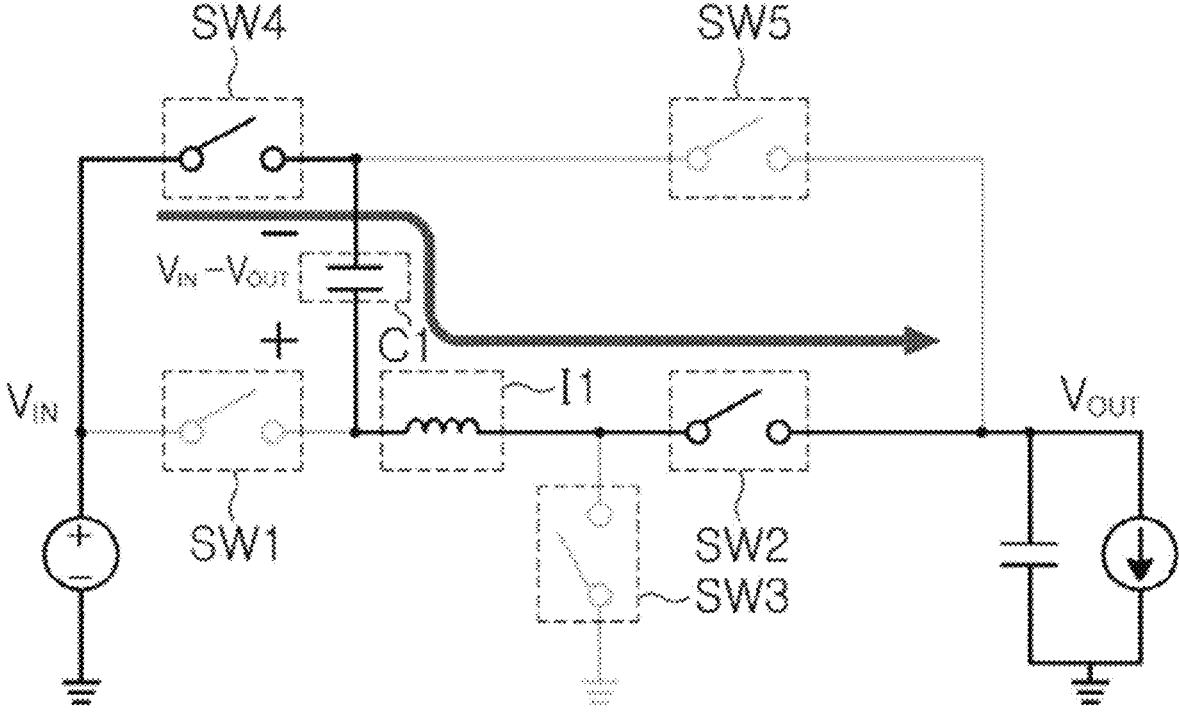
Figures 47A, 47B, 47C:
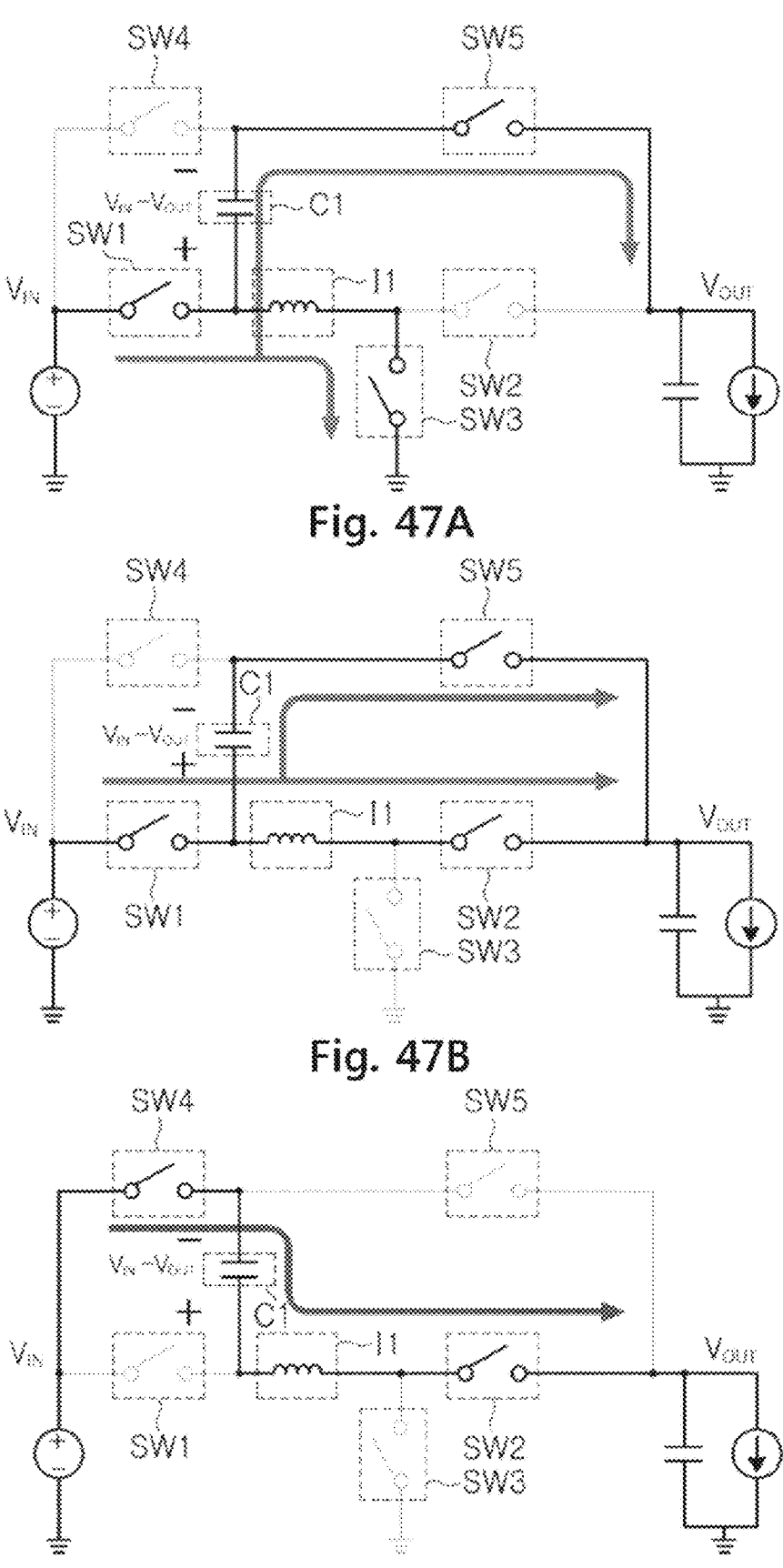
FIGS. 47A to 47C show diagrams for describing another example of a step-up operation mode of the first step-up converter with the dual-path according to another exemplary embodiment.
Figure 48A:
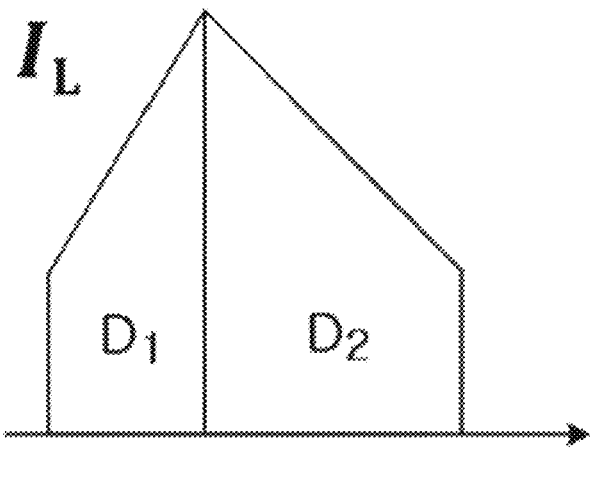
FIGS. 48A and 48B show diagrams for describing inductor current change due to step-up operation mode of first step-up converter having dual-path according to another exemplary embodiment.
Figure 48B:
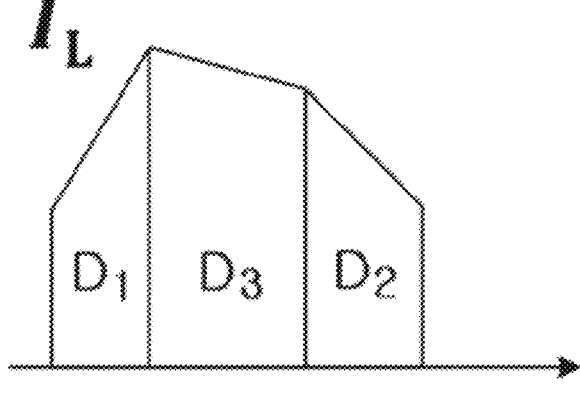

FIG. 44 is a block diagram illustrating the first step-up converter with a dual-path according to the exemplary embodiment. FIG. 45 is a circuit diagram illustrating a configuration of the first step-up converter shown in FIG. 44. FIGS. 46A and 46B show diagrams for describing an example of a step-up operation mode of the first step-up converter. FIGS. 47A to 47C show diagrams for describing another example of a step-up operation mode of the first step-up converter. FIGS. 48A and 48B illustrate inductor current change due to the step-up operation mode of the first step-up converter.

Referring to FIG. 44, a first step-up converter 100-2 with a dual-path (hereinafter, referred as a "first step-up converter) includes an input unit 110 to which power is input, a conversion unit 130 which steps up the input power, and an output unit 150 which receives and transfers the stepped-up power to an external device.

That is, the conversion unit 130 steps up the power input through the input unit 110 and transfers the stepped-up power to the output unit 150. The conversion unit 130 transfers a current to the output unit 150 even while the input power is being stepped-up.

To this end, the conversion unit 130 may include a first conversion circuit unit 131 and a second conversion circuit unit 133.

The first conversion circuit unit 131 steps up the power input through the input unit 110. The first conversion circuit unit 131 transfers the stepped-up power to the output unit 150.

Referring to FIG. 45, the first conversion circuit unit 131 may include an inductor I1, a first switch SW1, a second switch SW2, and a third switch SW3.

One end of the inductor I1 is connected to an input unit 110, and the other end thereof is connected to an output unit 150.

The first switch SW1 is disposed between the input unit 110 and the inductor I1. One end thereof is connected to the input unit 110, and the other end thereof is connected to the inductor I1.

The second switch SW2 is disposed between the inductor I1 and the output unit 150. One end thereof is connected to the inductor I1, and the other end thereof is connected to the output unit 150.

One end of the third switch SW3 is connected to a ground, and the other end thereof is connected to a node between the inductor I1 and the second switch SW2.

The second conversion circuit unit 133 transfers a current to the output unit 150 while the first conversion circuit unit 131 steps up power.

Referring to FIG. 45, the second conversion circuit unit 133 may include a fourth switch SW4, a capacitor C1, and a fifth switch SW5.

One end of the fourth switch SW4 is connected to the input unit 110, and the other end thereof is connected to the fifth switch SW5.

One end of the capacitor C1 is connected to a node between the fourth switch SW4 and the fifth switch SW5, and the other end thereof is connected to a node between the first switch SW1 and the inductor I1.

One end of the fifth switch SW5 is connected to the fourth switch SW4, and the other end thereof is connected to the output unit 150.

The above-described first step-up converter 100-2 exhibits characteristics of a step-up converter according to a duty ratio indicating a driving time of a first step-up operation mode. For example, when a duty ratio is "0," a conversion ratio is "1," and when the duty ratio is "1," the conversion ratio is infinite. Thus, the first step-up converter 100-2 has the characteristics of the step-up converter. A current, which flows when the capacitor C1 is connected parallel with the inductor I1, divides a current, which flows to the inductor I1, into two currents and reduces the current of the inductor I1 by half as compared with a conventional step-up converter. In addition, a conduction loss is increased in the form of a square of a current, so when the current is reduced by half, the conduction loss is reduced to ¼, thereby increasing efficiency.

In addition, in the first step-up converter 100-2, a switch may be designed as a low withstanding voltage element, thereby further reducing an overlap loss caused by a switching node.

More specifically, the conversion unit 130 may be driven in the order of a first step-up operation mode and a second step-up operation mode.

That is, as shown in FIG. 46A, the conversion unit 130 may be driven in the first step-up operation mode in which the first switch SW1, the third switch SW3, and the fifth switch SW5 are turned on and the second switch SW2 and the fourth switch SW4 are turned off. Accordingly, the conversion unit 130 may step up power input through the input unit 110 using the inductor I1 and may transfer a current to the output unit 150 while stepping up the power.

After the conversion unit 130 is driven in the first step-up operation mode, as shown in FIG. 46B, the conversion unit 130 may be driven in the second step-up operation mode in which the second switch SW2 and the fourth switch SW4 are turned on and the first switch SW1, the third switch SW3, and the fifth switch SW5 are turned off. The conversion unit 130 may transfer the stepped-up power to the output unit 150.

As described above, while the current of the inductor I1 is built-up in the first step-up operation mode, a current is transferred to an output terminal through a path including the capacitor C1. In the second step-up operation mode, the inductor I1 and capacitor C1 are connected in series to transfer a current to the output terminal. Accordingly, in the first step-up converter 100-2, since a current is transferred to the output terminal in all modes, the output current may be continuous. Accordingly, an RMS value of the current in the inductor may be further reduced as compared with a conventional step-up converter, and a ripple and switching noise of an output voltage may be greatly reduced.

On the other hand, when a duty ratio indicating a driving time of the first step-up operation mode is greater than a preset value (for example, "0.5" or the like), the conversion unit 130 may be driven in the order of the first step-up operation mode and the second step-up operation mode and may step up the power input through the input unit 110 to transfer the stepped-up power to the output unit 150. The conversion unit 130 may transfer a current to the output unit 150 even while the input power is stepped-up.

Meanwhile, when the duty ratio indicating the driving time of the first step-up operation mode is less than the preset value (for example, "0.5" or the like), the conversion unit 130 may be driven in the order of the first step-up operation mode, a third step-up operation mode, and the second step-up operation mode.

That is, as shown in FIG. 47A, the conversion unit 130 may be driven in the first step-up operation mode in which the first switch SW1, the third switch SW3, and the fifth switch SW5 are turned on and the second switch SW2 and the fourth switch SW4 are turned off.

After the conversion unit 130 is driven in the first step-up operation mode, the conversion unit 130 may be driven in the third step-up operation mode in which the first switch SW1, the second switch SW2, and the fifth switch SW5 are turned on and the third switch SW3 and the fourth switch SW4 are turned off, as shown in FIG. 47B.

After the conversion unit 130 is driven in the third step-up operation mode, the conversion unit 130 may be driven in the second step-up operation mode in which the second switch SW2 and the fourth switch SW4 are turned on and the first switch SW1, the third switch SW3, and the fifth switch SW5 are turned off, as shown in FIG. 47C.

Here, when the conversion unit 130 is driven in the order of the first step-up operation mode, the third step-up operation mode, and the second step-up operation mode, the conversion unit 130 may be driven in the second step-up operation mode for a preset time (for example, duty ratio of "0.5" or the like). For example, when a preset value used as a reference for a duty ratio comparison is "0.5" and a duty ratio is "0.3," the duty ratio is less than the preset value. Accordingly, the conversion unit 130 is driven in the order of the first step-up operation mode, the third step-up operation mode, and the second step-up operation mode. In this case, in order to maintain a driving time of the second step-up operation mode at "0.5" which is a preset time, the conversion unit 130 is driven in the first step-up operation mode for a time of "0.3," the third step-up operation mode for a time of "0.2," and the second step-up operation mode for a time of "0.5."

As described above, when the duty ratio indicating the driving time of the first step-up operation mode is less than the preset value (for example, "0.5" or the like), the conversion unit 130 may be driven in the third step-up operation mode between the first step-up operation mode and the second step-up operation mode, and thus, a time for supplying a current to the capacitor C1 may be extended. Accordingly, a negative effect on efficiency which is caused when a large amount of current is supplied within a short time may be prevented.

Accordingly, in the first step-up converter 100-2 according to another exemplary embodiment, since a current is transferred to the output terminal in all modes, a continuous output current may be exhibited. Accordingly, an RMS value of the current in the inductor may be further reduced as compared with the conventional step-up converter, and a ripple and switching noise of an output voltage may be greatly reduced.

In other words, when the duty ratio indicating the driving time of the first step-up operation mode is greater than the preset value (for example, "0.5" or the like), the conversion unit 130 may be driven in the order of a first step-up operation mode $D_1$ and a second step-up operation mode $D_2$, as shown in FIG. 48A.

When the duty ratio indicating the driving time of the first step-up operation mode is less than the preset value (for example, "0.5" or the like), the conversion unit 130 may be driven in the order of the first step-up operation mode $D_1$, a third step-up operation mode $D_3$, and the second step-up operation mode $D_2$, as shown in FIG. 48B.

Performance of the first step-up converter according to an exemplary embodiment will be described with reference to FIGS. 49 to 52.

Figure 49:
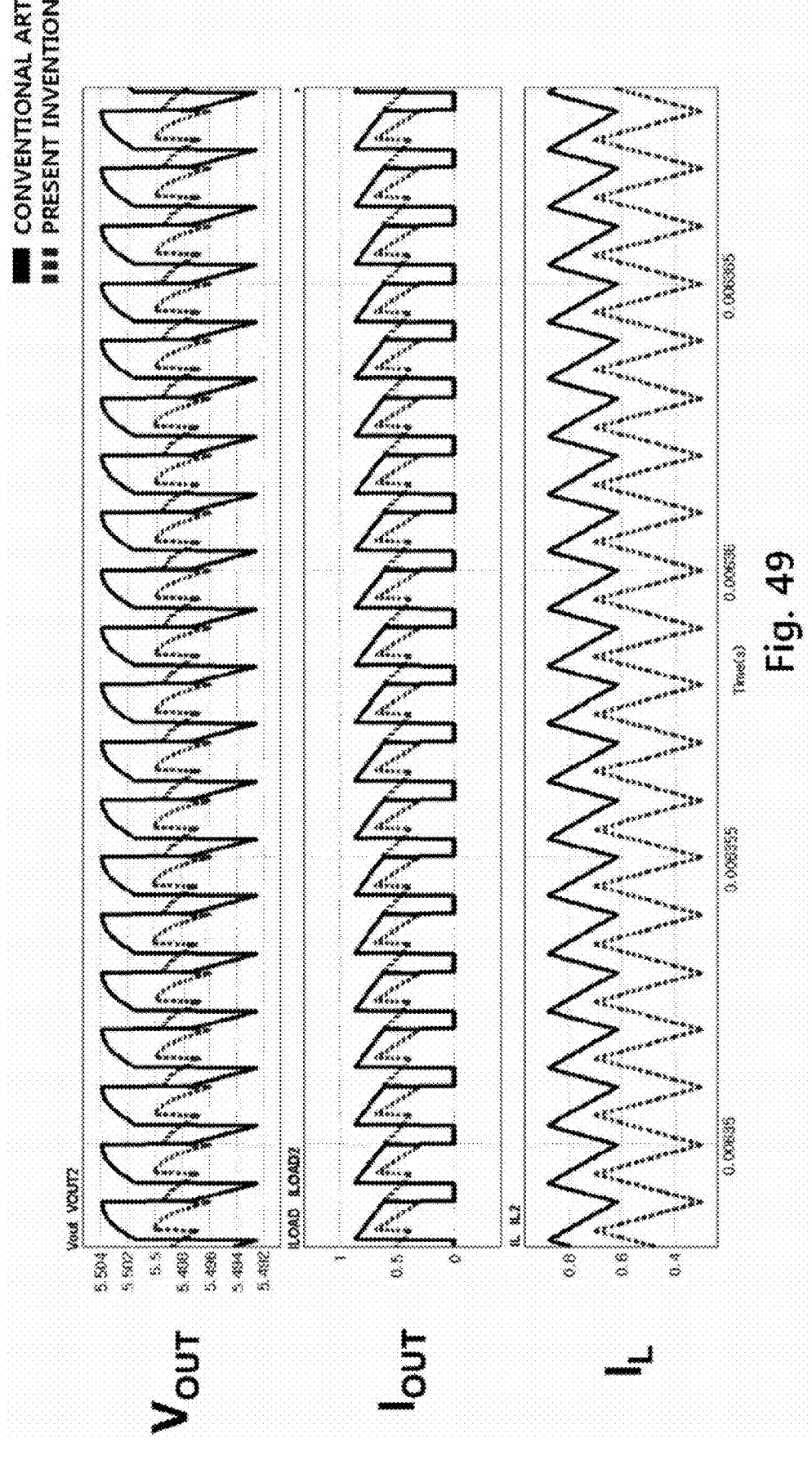
FIG. 49 shows graphs each obtained by testing the first step-up converter according to another exemplary embodiment in an environment with a duty ratio of 0.5.
Figure 50:
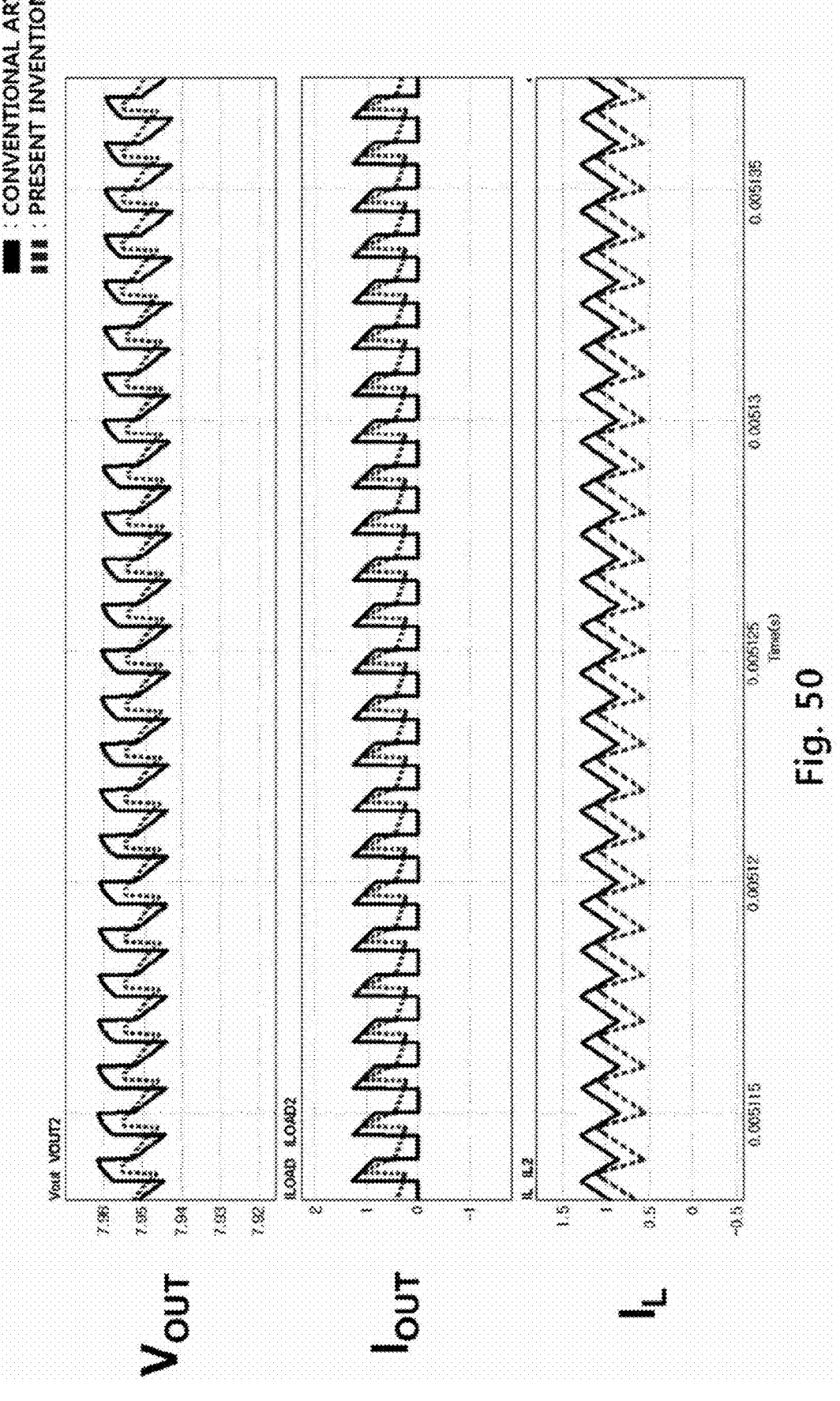
FIG. 50 shows graphs each obtained by testing the first step-up converter according to another exemplary embodiment in an environment with a duty ratio of 0.7.
Figure 51:
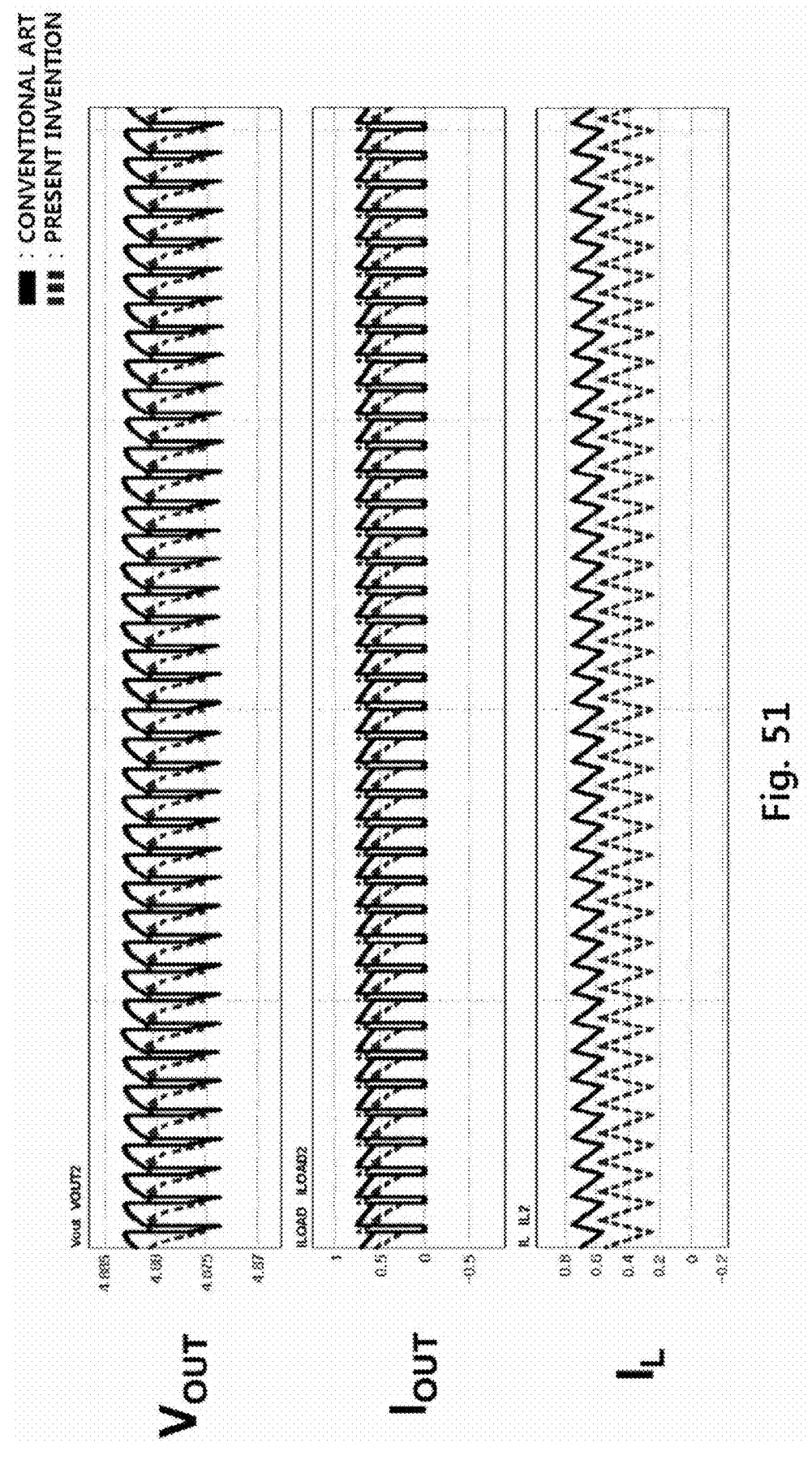
FIG. 51 shows graphs each obtained by testing the first step-up converter according to another exemplary embodiment in an environment with a duty ratio of 0.4.
Figure 52:
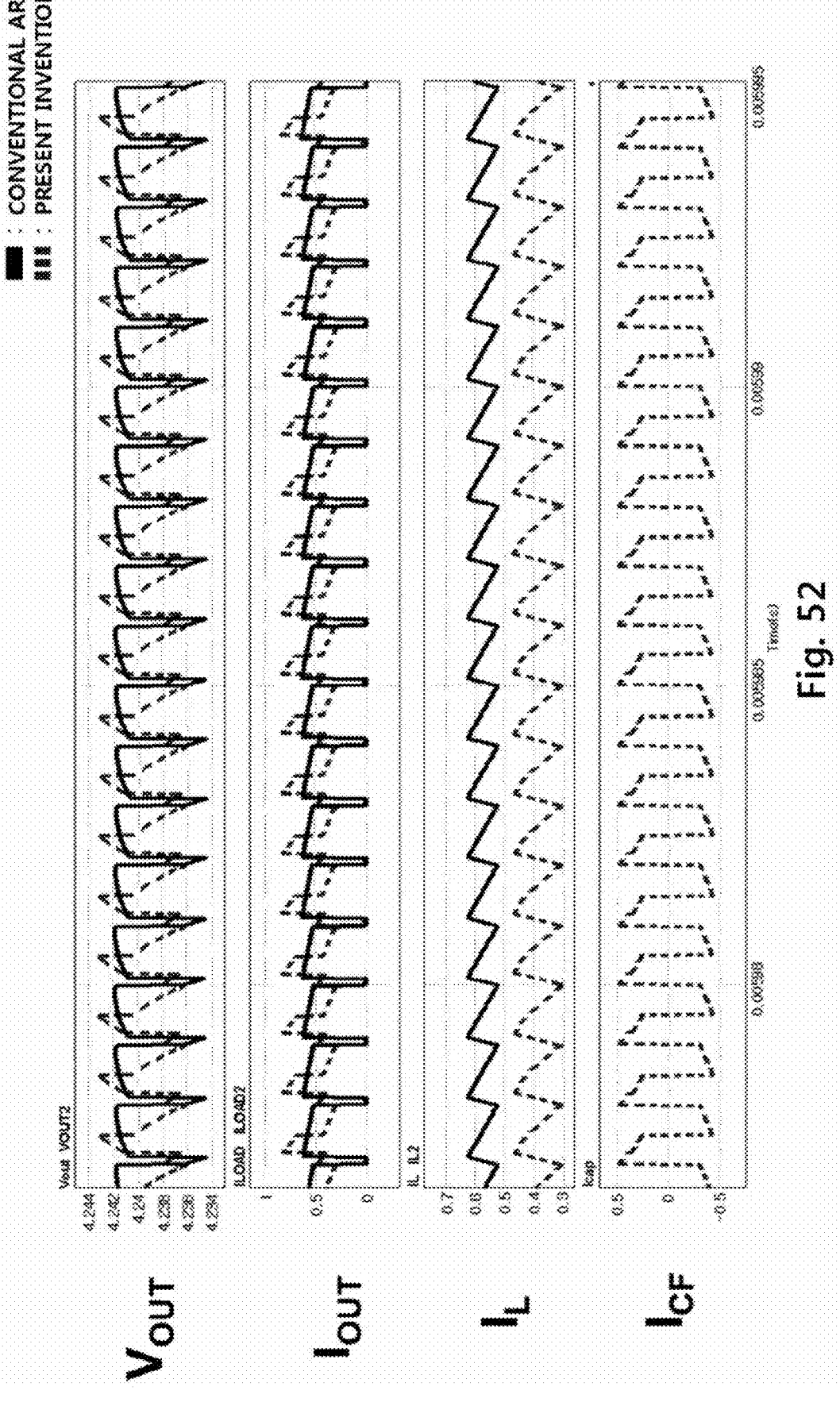
FIG. 52 shows graphs each obtained by testing the first step-up converter according to another exemplary embodiment in an environment with a duty ratio of 0.2.

FIG. 49 shows graphs each obtained by testing the first step-up converter according to the exemplary embodiment in an environment with a duty ratio of 0.5. FIG. 50 shows graphs each obtained by testing the first step-up converter according to the exemplary embodiment in an environment with a duty ratio of 0.7. FIG. 51 shows graphs each obtained by testing the first step-up converter according to the exemplary embodiment in an environment with a duty ratio of 0.4. FIG. 52 shows graphs each obtained by testing the first step-up converter according to the exemplary embodiment in an environment with a duty ratio of 0.2.

Referring to FIG. 49, it can be confirmed that an average of the current in the inductor of the first step-up converter 100-2 according to the exemplary embodiment is reduced by about half of that of the conventional step-up converter. Unlike the conventional step-up converter in which a current flowing to an output terminal had discontinuity, in the first step-up converter 100-2 according to the exemplary embodiment, it may be confirmed that a current (IOUT) flowing to an output terminal does not drop to zero and has continuity. As a result, a ripple of an output voltage is considerably reduced as compared with the conventional step-up converter. Therefore, performance of a load connected to the output terminal of the first step-up converter 100-2, that is, performance of a block using a high voltage formed by the first step-up converter 100-2, may be prevented from decreasing.

Referring to FIGS. 50 to 52, it can be confirmed that the first step-up converter 100-2 according to the exemplary embodiment shows better performance than the conventional converter.

A control method of the first step-up converter with the dual-path according to the exemplary embodiment will be described with reference to FIGS. 53 and 54.

Figure 53:
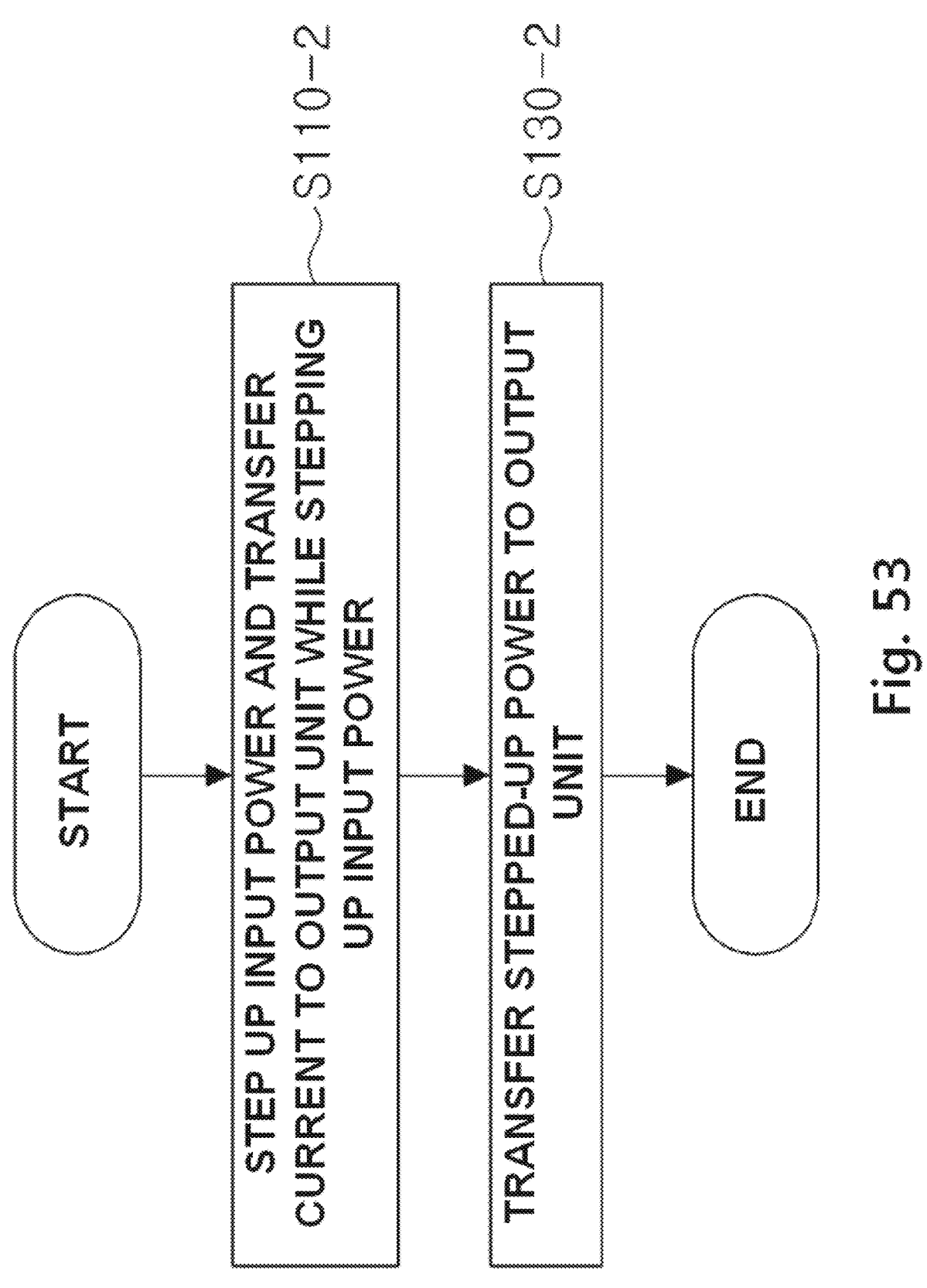
FIG. 53 is a flowchart illustrating a control method of the first step-up converter with the dual-path according to another exemplary embodiment.

FIG. 53 is a flowchart illustrating the control method of the first step-up converter with the dual-path according to the exemplary embodiment.

Referring to FIG. 53, the first step-up converter 100-2 steps up input power and transfers a current to the output unit while stepping up the input power (S110-2). That is, the first step-up converter 100-2 may be driven in a first step-up operation mode in which the first switch SW1, the third switch SW3, and the fifth switch SW5 are turned on and the second switch SW2 and the fourth switch SW4 are turned off.

Then, the first step-up converter 100-2 transfers the stepped-up power to the output unit (S130-2). That is, after the first step-up converter 100-2 is driven in the first step-up operation mode, the first step-up converter 100-2 may be driven in a second step-up operation mode in which the second switch SW2 and the fourth switch SW4 are turned on and the first switch SW1, the third switch SW3, and the fifth switch SW5 are turned off.

Figure 54:
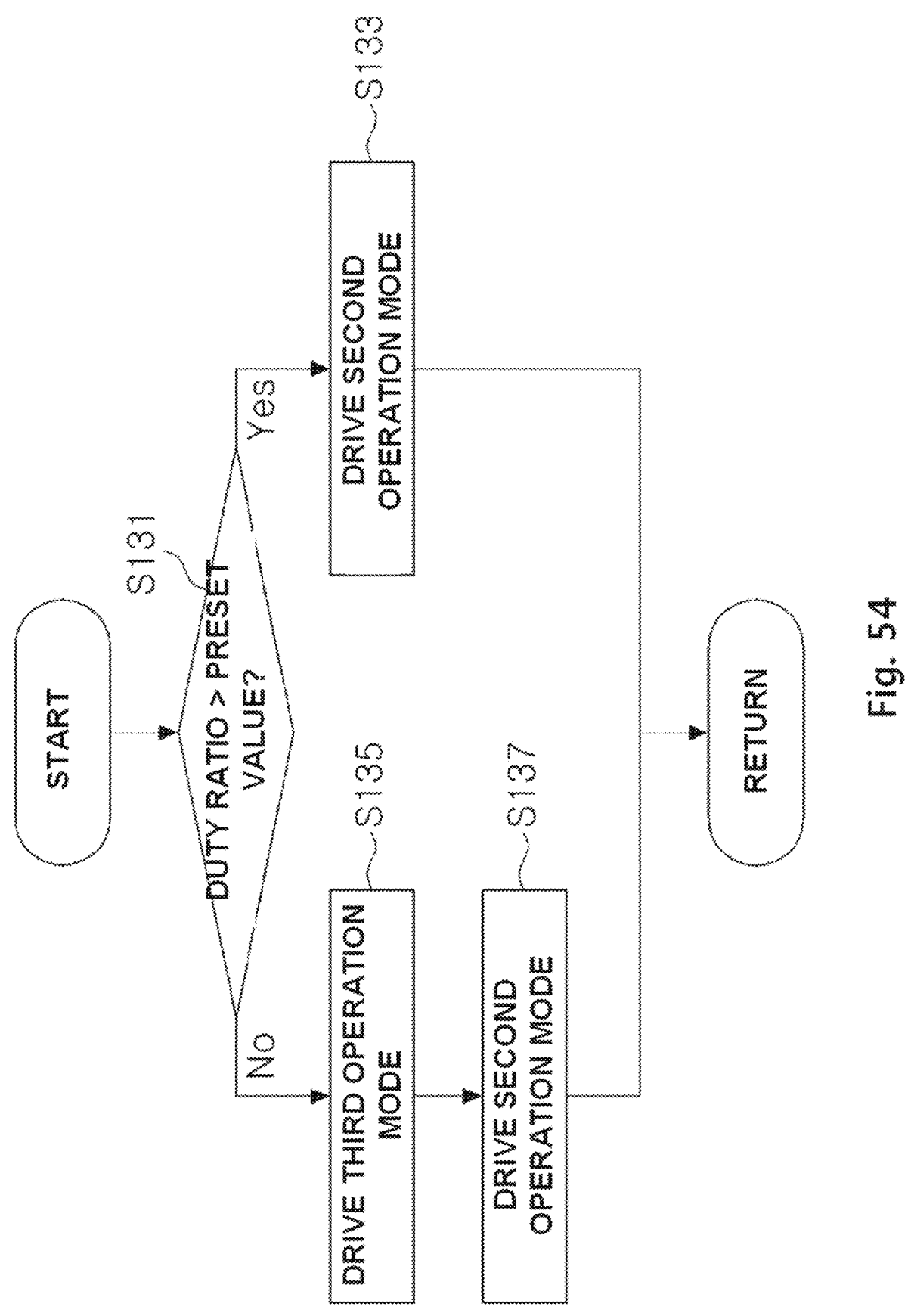
FIG. 54 is a flowchart illustrating a stepped-up power transferring operation shown in FIG. 53 in more detail.

FIG. 54 is a flowchart illustrating a stepped-up power transferring operation shown in FIG. 53 in more detail.

Referring to FIG. 54, when a duty ratio is greater than a preset value (Yes in operation S131), the first step-up converter 100-2 may be driven in the second step-up operation mode (S133). That is, when a duty ratio indicating a driving time of the first step-up operation mode is greater than the preset value (for example, "0.5" or the like), the first step-up converter 100-2 may be driven in the second step-up operation mode.

Meanwhile, when the duty ratio is less than the preset value (No in operation S131), the first step-up converter 100-2 may be driven in a third step-up operation mode (S135). That is, when the duty ratio indicating a driving time of the first step-up operation mode is less than the preset value (for example, duty ratio of "0.5" or the like), the first step-up converter 100-2 may be driven in the third step-up operation mode in which the first switch SW1, the second switch SW2, and the fifth switch SW5 are turned on and the third switch SW3 and the fourth switch SW4 are turned off.

Next, the first step-up converter 100-2 may be driven in the second step-up operation mode (S137). In this case, the first step-up converter 100-2 may be driven in the second step-up operation mode for a preset time (for example, duty ratio of "0.5" or the like).

A second step-up converter with dual paths according to an embodiment will be described with reference to FIGS. 55 and 56.

Figure 55:
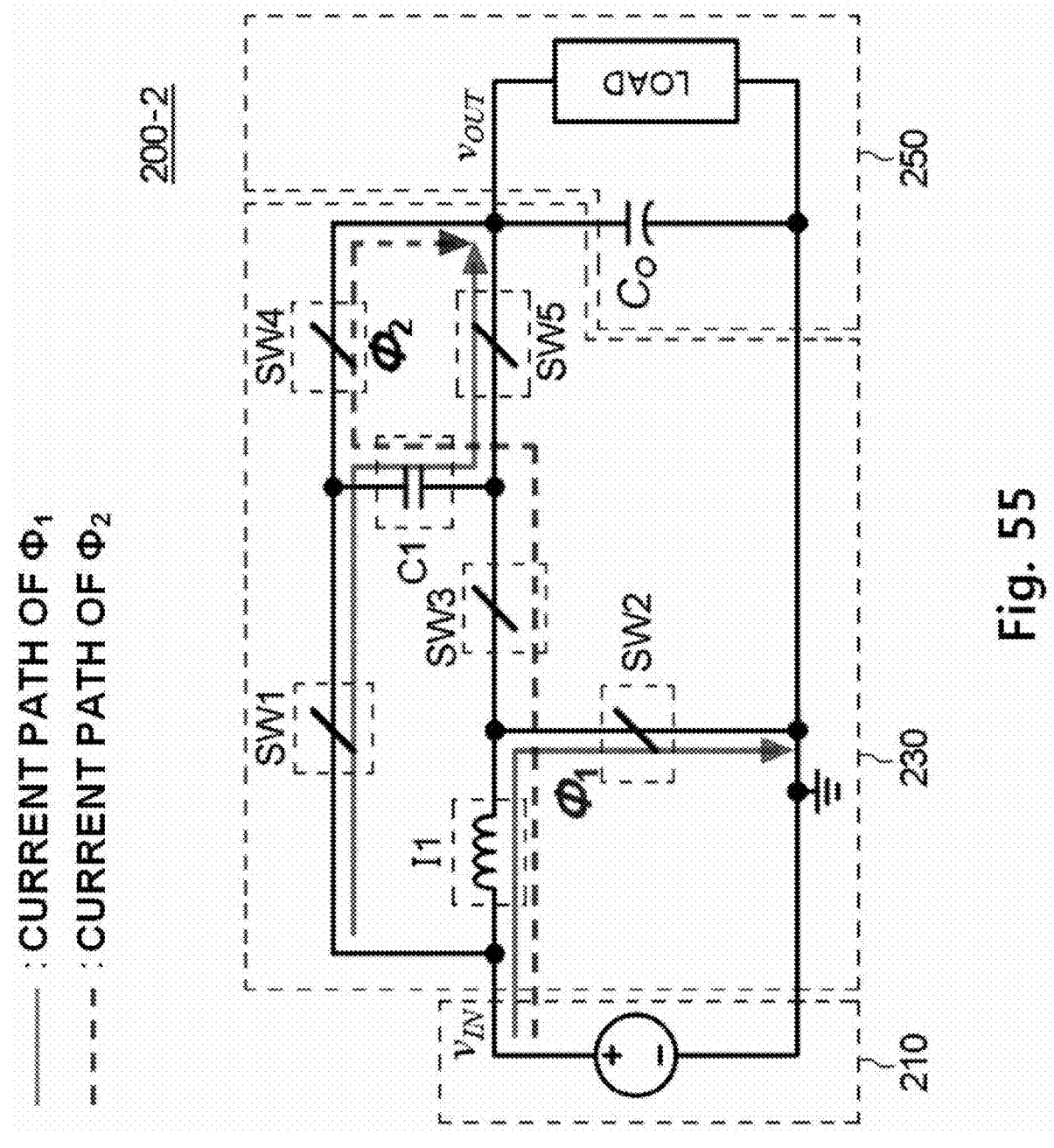
FIG. 55 is a diagram illustrating an example of a configuration and a step-up operation mode of a second step-up converter with the dual-path according to another exemplary embodiment.
Figure 56:
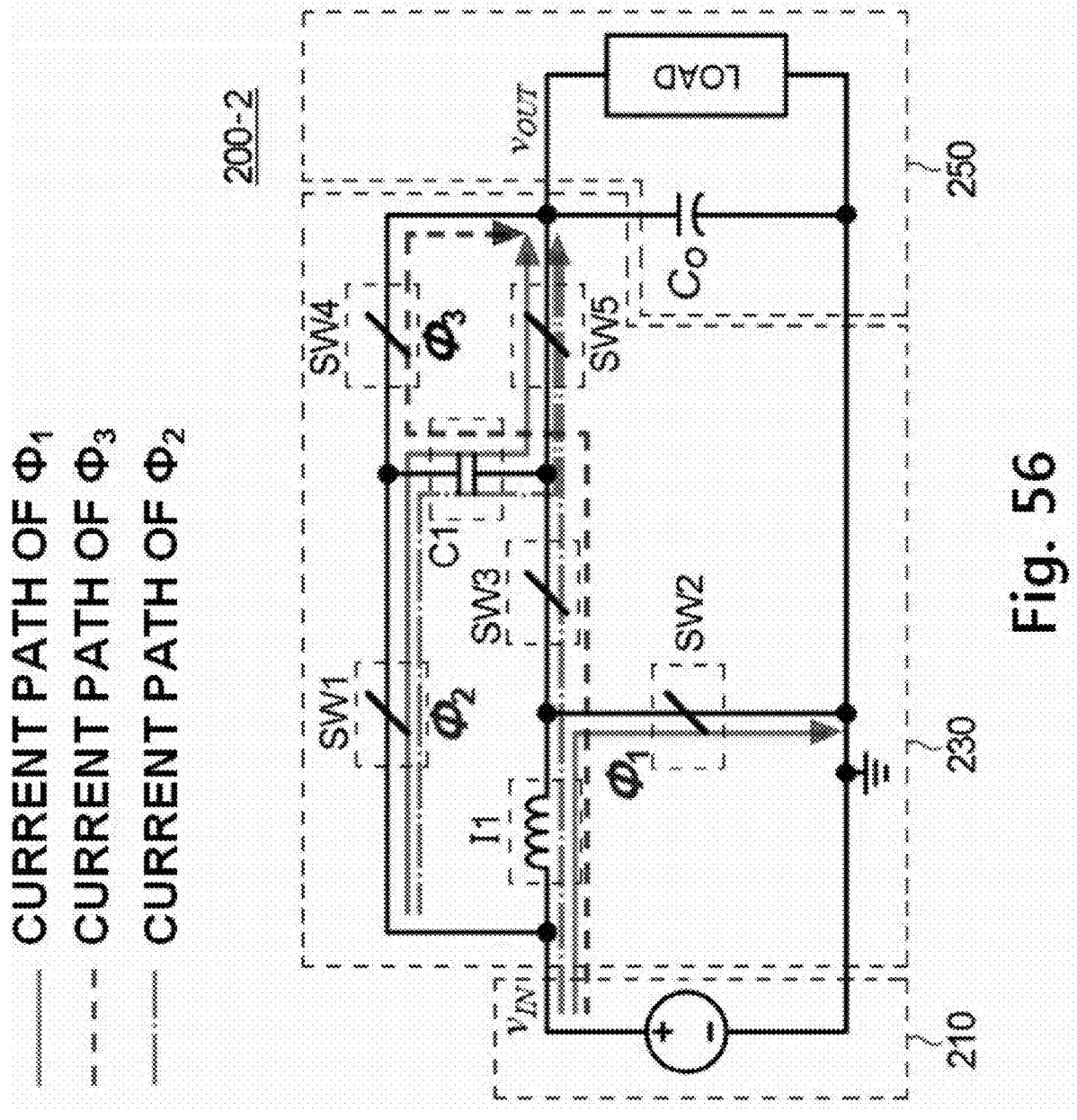
FIG. 56 is a diagram illustrating another example of a step-up operation mode of the second step-up converter shown in FIG. 55.

FIG. 55 is a diagram illustrating an example of a configuration and a step-up operation mode of the second step-up converter with the dual-path according to the exemplary embodiment, and FIG. 56 is a diagram illustrating another example of a step-up operation mode of the second step-up converter shown in FIG. 55.

Since a second step-up converter 200-2 with a dual-path (hereinafter referred to as a "second step-up converter") according to the exemplary embodiment is substantially similar to the first step-up converter 100-2, differences therebetween will be described.

Referring to FIGS. 55 and 56, the second step-up converter 200-2 according to the exemplary embodiment is configured by changing positions of some elements of the first step-up converter 100-2.

That is, a conversion unit 230 may include an inductor I1, a capacitor C1, a first switch SW1, a second switch SW2, a third switch SW3, a fourth switch SW4, and a fifth switch SW5.

One end of the inductor I1 is connected to an input unit 210, and the other end thereof is connected to a node between the second switch SW2 and the third switch SW3.

One end of the capacitor C1 is connected to a node between the first switch SW1 and the fourth switch SW4, and the other end thereof is connected to a node between the third switch SW3 and the fifth switch SW5.

One end of the first switch SW1 is connected to a node between the input unit 210 and the inductor I1 and the other end thereof is connected to a node between the fourth switch SW4 and the capacitor C1.

One end of the second switch SW2 is connected to a node between the inductor I1 and the third switch SW3, and the other end thereof is connected to a node between the input unit 210 and an output unit 250.

One end of the third switch SW3 is connected to a node between the inductor I1 and the second switch SW2, and the other end thereof is connected to a node between the capacitor C1 and the fifth switch SW5.

One end of the fourth switch SW4 is connected to a node between the first switch SW1 and the capacitor C1, and the other end thereof is connected to a node between the output unit 250 and the fifth switch SW5.

One end of the fifth switch SW5 is connected to a node between the capacitor C1 and the third switch SW3, and the other end thereof is connected to the output unit 250.

The conversion unit 230 may be driven in the order of a first step-up operation mode $\Phi_1$ and a second step-up operation mode $\Phi_2$.

That is, as shown in FIG. 55, the conversion unit 230 may be operated in the first step-up operation mode $\Phi_1$ in which the first switch SW1, the second switch SW2, and the fifth switch SW5 are turned on and the third switch SW3 and the fourth switch SW4 are turned off. Accordingly, the conversion unit 230 may step up power input through the input unit 210 using the inductor I1 and may transfer a current to the output unit 250 while stepping up the power.

After the conversion unit 230 is driven in the first step-up operation mode $\Phi_1$, the conversion unit 230 may be driven in the second step-up operation mode $\Phi_2$ in which the third switch SW3 and the fourth switch SW4 are turned on and the first switch SW1, the second switch SW2, and the fifth switch SW5 are turned off, as shown in FIG. 55. Therefore, the conversion unit 230 may transfer the stepped-up power to the output unit 250.

As described above, while the current of the inductor I1 is built-up in the first step-up operation mode $\Phi_1$, a current is transferred to an output terminal through a path including the capacitor C1. In the second step-up operation mode $\Phi_2$, a current is transferred to the output terminal through the inductor I1 and capacitor C1 connected in series. Accordingly, in the second step-up converter 200-2 according to the exemplary embodiment, a current is transferred to the output terminal in all modes, so a continuous output current is exhibited.

On the other hand, the conversion unit 230 may be driven in the order of a first step-up operation mode $\Phi_1$, a third step-up operation mode $\Phi_2$, and a second step-up operation mode $\Phi_3$.

That is, as shown in FIG. 56, the conversion unit 230 may be operated in the first step-up operation mode $\Phi_1$ in which the first switch SW1, the second switch SW2, and the fifth switch SW5 are turned on and turning the third switch SW3 and the fourth switch SW4 are turned off. Accordingly, the conversion unit 230 may step up power input through the input unit 210 using the inductor I1 and may transfer a current to the output unit 250 while stepping up the power.

After the conversion unit 230 is driven in the first step-up operation mode $\Phi_1$, the conversion unit 230 may be driven in the third step-up operation mode $\Phi_2$ in which the first switch SW1, the third switch SW3, and the fifth switch SW5 are turned on and the second switch SW2 and the fourth switch SW4 are turned off, as shown in FIG. 56.

After the conversion unit 230 is driven in the third step-up operation mode $\Phi_2$, the conversion unit 230 may be driven in the second step-up operation mode $\Phi_3$ in which the third switch SW3 and the fourth switch SW4 are turned on and the first switch SW1, the second switch SW2, and the fifth switch SW5 are turned off as shown in FIG. 56. Therefore, the conversion unit 230 may transfer the stepped-up power to the output unit 250.

As described above, the conversion unit 230 may be driven in the third step-up operation mode $\Phi_2$ between the first step-up operation mode $\Phi_1$ and the second step-up operation mode $\Phi_3$, and thus, a time for supplying a current to the capacitor C1 may be extended. Accordingly, an adverse effect on efficiency which is caused when a large amount of current is supplied within a short time may be prevented.

Accordingly, in the second step-up converter 200-2 according to the exemplary embodiment, a current is transferred to the output terminal in all modes. As a result, a output current may be continuous. Accordingly, an RMS value of the current in the inductor may be further reduced as compared with the conventional step-up converter, and a ripple and switching noise of an output voltage may be greatly reduced.

A third step-up converter with a multi-path according to the exemplary embodiment will be described with reference to FIG. 57.

Figure 57:
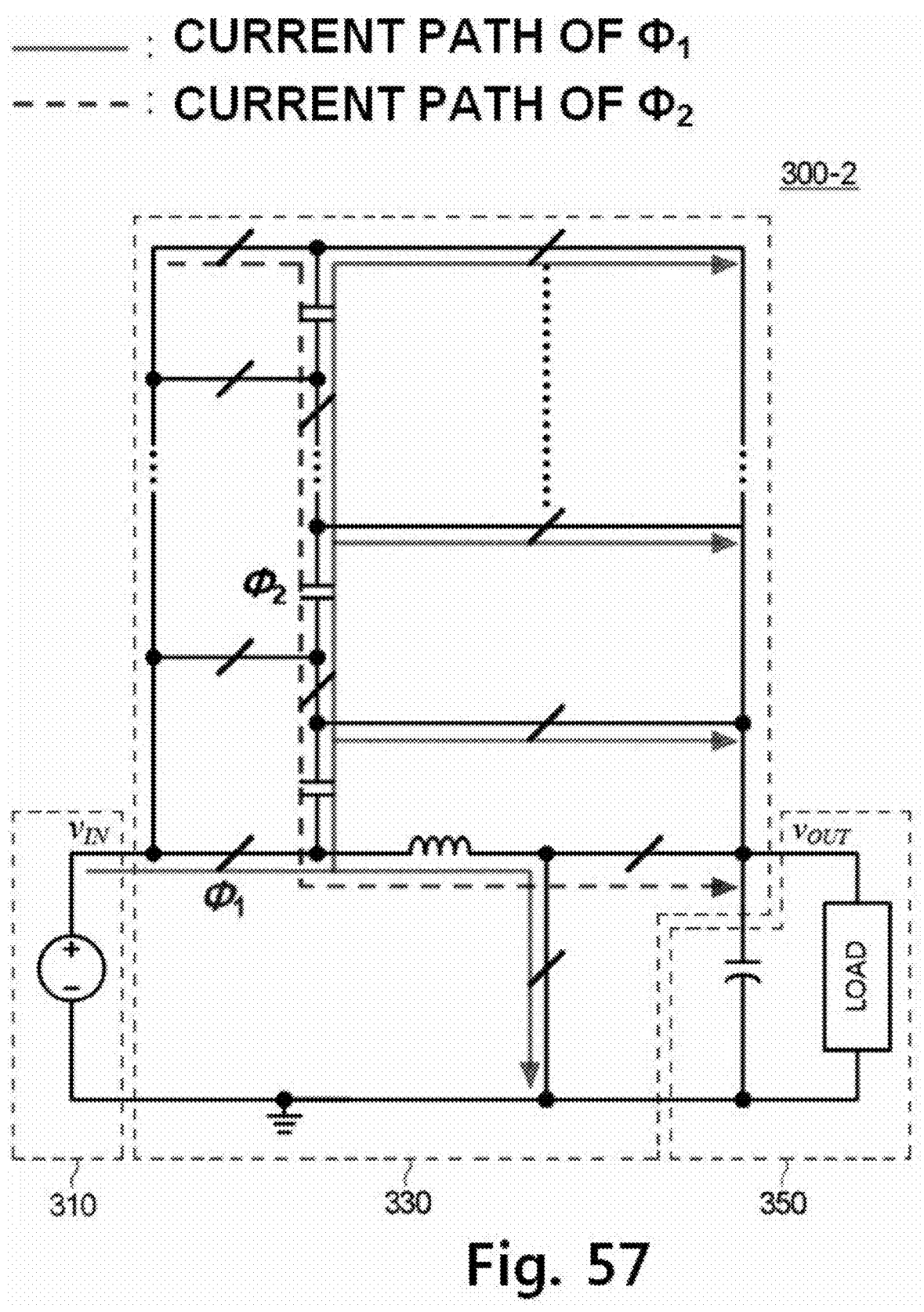
FIG. 57 is a circuit diagram illustrating a configuration of a third step-up converter with a multi-path according to another exemplary embodiment.

FIG. 57 is a circuit diagram illustrating a configuration of the third step-up multi-path converter according to the exemplary embodiment.

Referring to FIG. 57, a third step-up converter 300-2 with multiple paths (hereinafter, referred to as a "third step-up converter") according to an embodiment is configured by expanding the second step-up converter 200-1 so as to have n current transfer paths.

More specifically, a conversion unit 330 may be driven in the order of a first step-up operation mode $\Phi_1$ and a second step-up operation mode $\Phi_2$.

That is, as shown in FIG. 57, the conversion unit 330 may be driven in the first step-up operation mode $\Phi_1$. Accordingly, the conversion unit 330 may step up power input through an input unit 310 using an inductor I1 and may transfer a current to an output unit 350 through n current transfer paths using n capacitors while stepping up the power.

After the conversion unit 330 is driven in the first step-up operation mode $\Phi_1$, the conversion unit 330 may be driven in the second step-up operation mode $\Phi_2$, as shown in FIG. 57. Therefore, the conversion unit 330 may transfer the stepped-up power to the output unit 350.

A fourth step-up converter with a multi-path according to an exemplary embodiment will be described with reference to FIG. 58.

Figure 58:
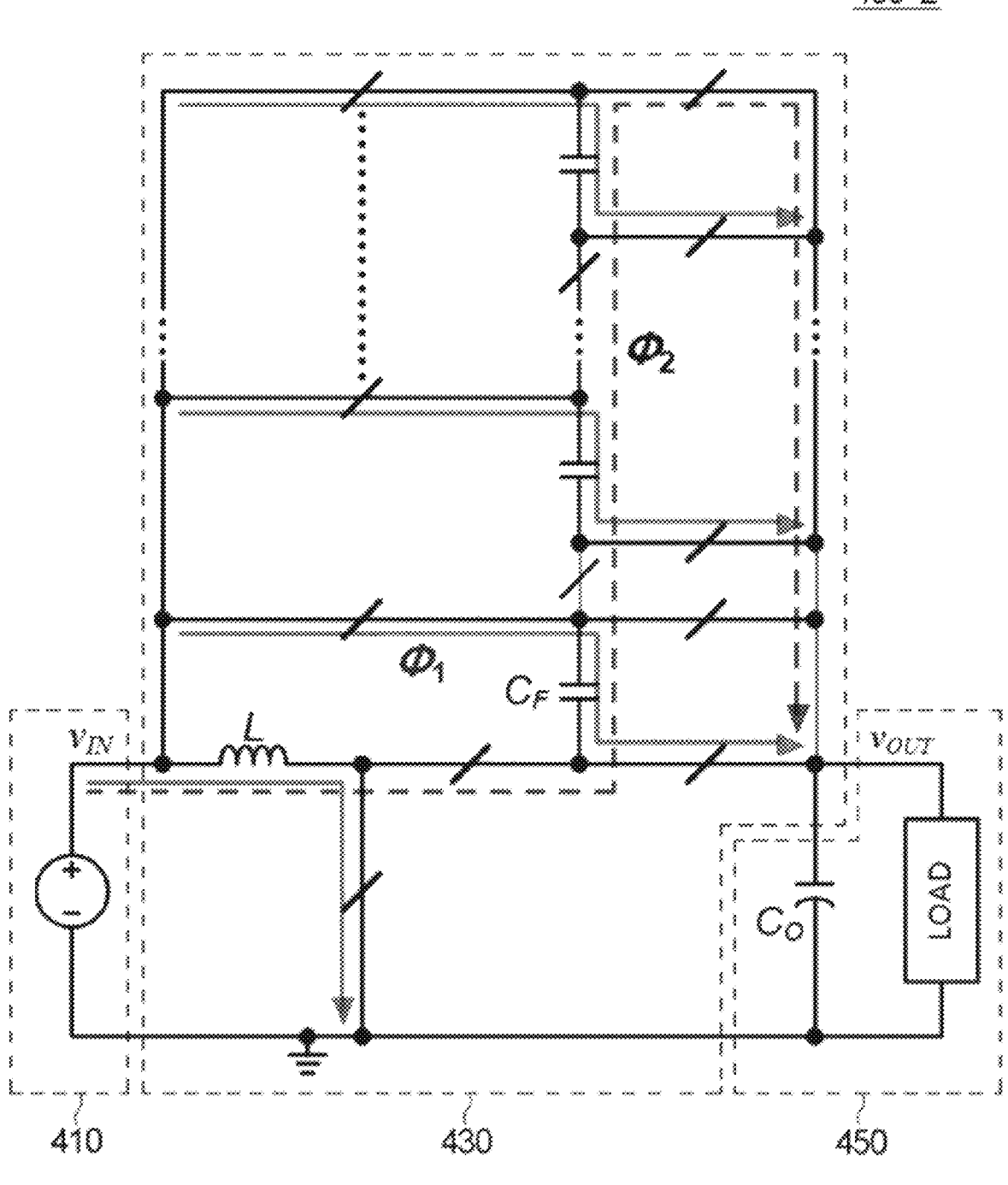
FIG. 58 is a circuit diagram illustrating a configuration of a fourth step-up converter with a multi-path according to another exemplary embodiment.

FIG. 58 is a circuit diagram illustrating a configuration of the fourth step-up multi-path converter according to the exemplary embodiment.

Referring to FIG. 58, a fourth step-up converter 400-2 with multiple paths (hereinafter, referred to as a "fourth step-up converter") according to the embodiment is configured by expanding the first step-up converter 100-1 to have n current transfer paths.

More specifically, a conversion unit 430 may be driven in the order of a first step-up operation mode $\Phi_1$ and a second step-up operation mode $\Phi_2$.

That is, as shown in FIG. 58, the conversion unit 430 may be driven in the first step-up operation mode $\Phi_1$. Accordingly, the conversion unit 430 may step up power input through an input unit 410 using an inductor I1 and may transfer a current to an output unit 450 through n current transfer paths using n capacitors while stepping up the power After the conversion unit 430 is driven in the first step-up operation mode $\Phi_1$, the conversion unit 430 may be driven in the second step-up operation mode $\Phi_2$, as shown in FIG. 58. Therefore, the conversion unit 430 may transfer the stepped-up power to the output unit 450.

Figures 59A, 59B:
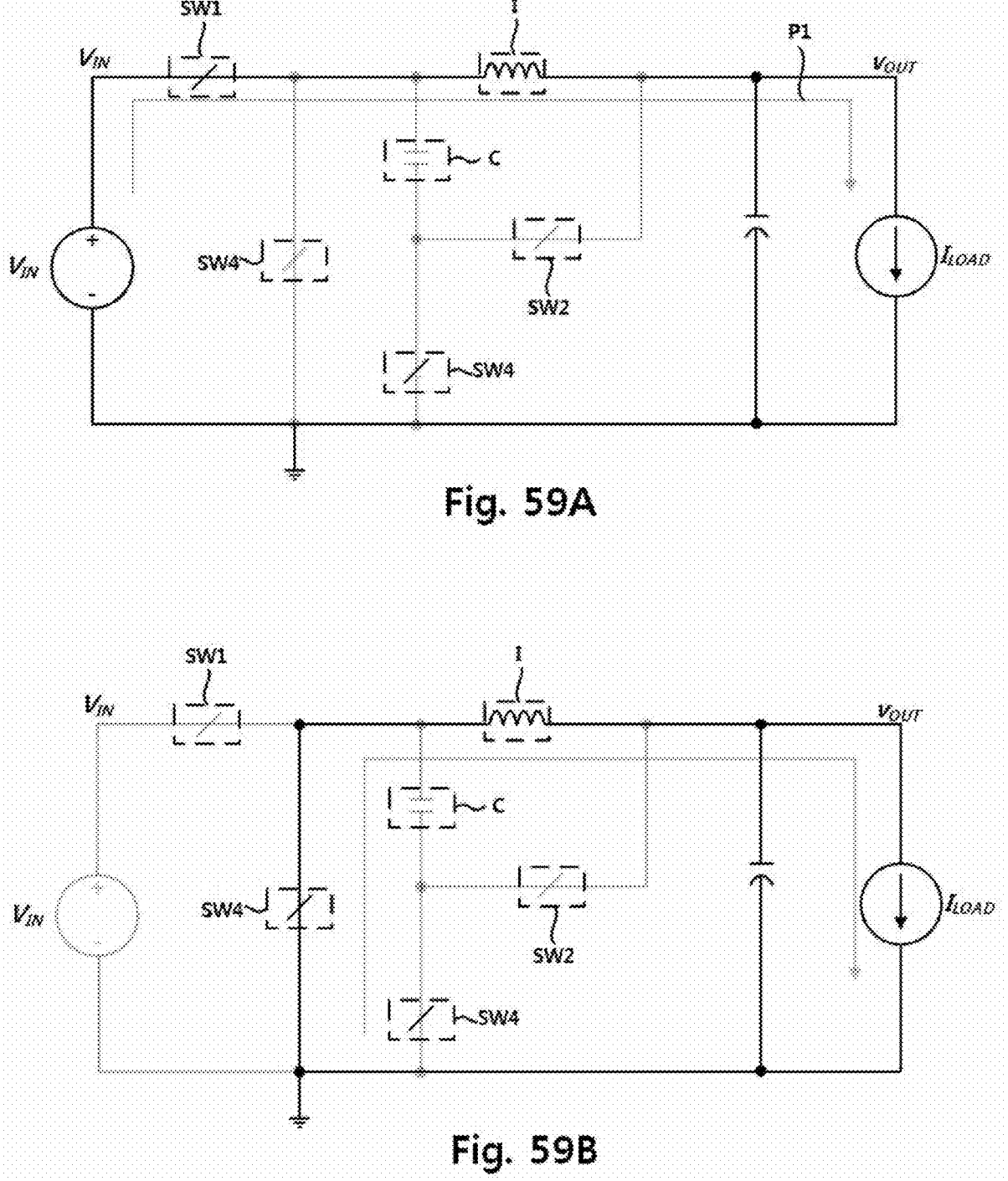
FIGS. 59A and 59B show diagrams for describing an example in which the second step-down converter shown in FIG. 21 is operated in a single-path manner.

FIGS. 59A and 59B show diagrams for describing an example in which the second step-down converter shown in FIG. 21 is operated in a single-path manner. Referring to FIGS. 21 and 59, when the second step-down converter is operated in the single-path manner, the conversion unit 230 may be driven in the order of the fourth step-down operation mode and the fifth step-down operation mode. That is, the conversion unit 230 may periodically perform an operation that sequentially includes the fourth step-down operation mode and the fifth step-down operation mode and may step down power input from the input unit 210 and transfer the stepped-down power to the output unit 250.

That is, as shown in FIG. 59A, the conversion unit 230 may be driven in the fourth-down operation mode in which a first switch SW1 is turned on and second to fourth switches SW2 to SW4 are turned off. Accordingly, a current flowing to the output unit 250 is transferred through a first current transfer path P1 using an inductor I. That is, when the conversion unit 230 is driven in the fourth step-down operation mode, the current is transferred to the output unit 250 through a single current transfer path.

After the conversion unit 230 is driven in the fourth-down operation mode, the conversion unit 230 may be driven in the fifth step-down operation mode in which the fourth switch SW4 is turned on and the first to third switches SW1 to SW3 are turned off, as shown in FIG. 59B.

As described above, when the conversion unit 230 is operated in the single-path manner, the current is transferred to the output unit 250 through the single current transfer path P1 in the same manner as in a conventional step-down converter. In the following description, for convenience of description, a manner in which a current is transferred to an output unit through a plurality of parallel current transfer paths that are the same as in the manner shown in FIGS. 22A to 22C will be referred to as a multi-path manner.

FIG. 60 is a graph showing efficiencies when the second step-down converter shown in FIG. 21 is operated in the multi-path manner (see FIGS. 22A to 22C) and the single-path manner (see FIGS. 59A and 59B). Referring to FIG. 60, the efficiency of the multi-path manner (e.g., dual-path step-down converter (DPNC)) is generally higher than the efficiency of the single-path manner (e.g., conventional buck converter topology (CBT)). However, when a current $I_{LOAD}$ in a load is low (for example, 0.2 A), the efficiency of the single-path manner is higher than the efficiency of the multi-path manner. Therefore, when the current $I_{LOAD}$ in the load is high, the second step-down converter may be operated in the multi-path manner, and when the current $I_{LOAD}$ in the load is low, the second step-down converter may be operated in the single-path manner. In this way, it is possible to increase the overall efficiency of the second step-down converter.

Figure 61:
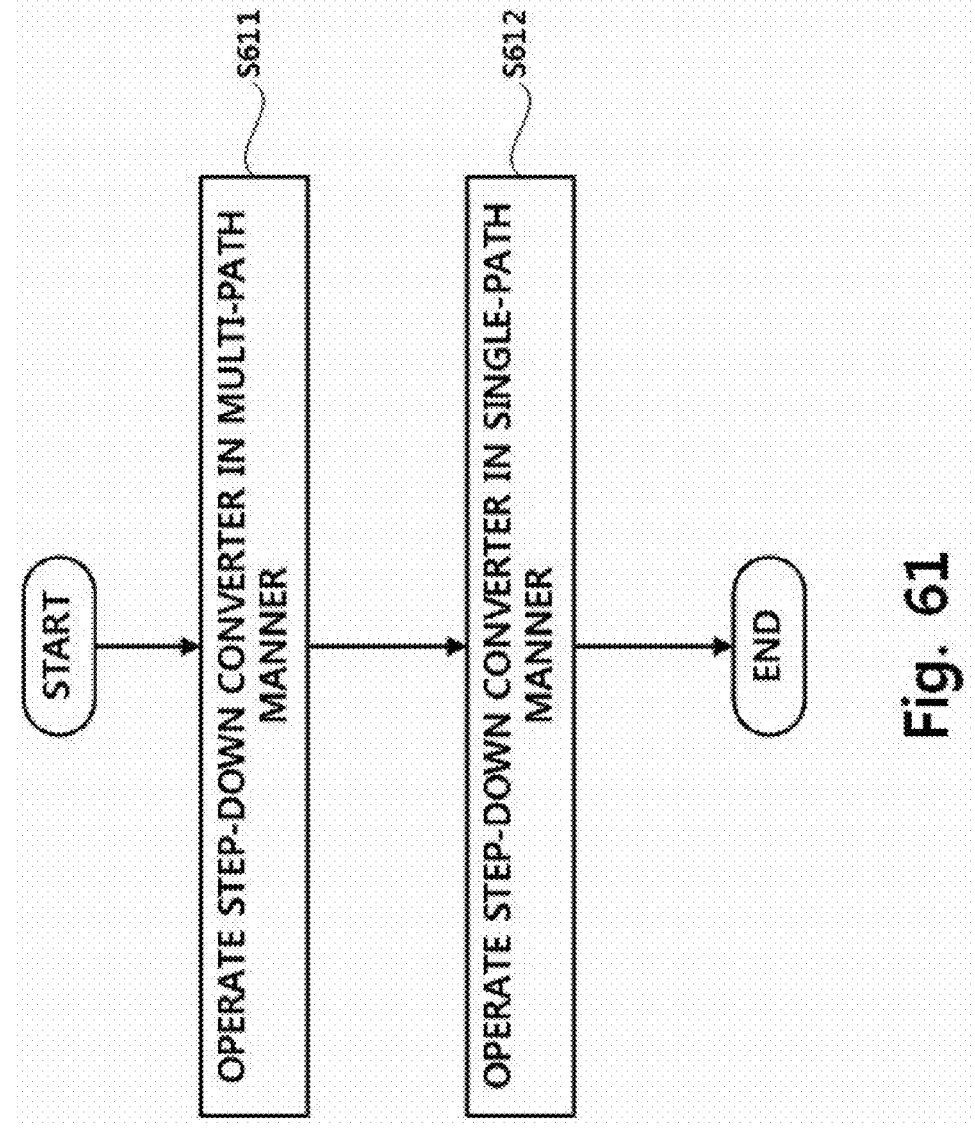
FIG. 61 is a flowchart for describing a step-down converting method according to a first exemplary embodiment.

FIG. 61 is a flowchart for describing a step-down converting method according to the first exemplary embodiment. Referring to FIG. 61, the step-down converting method includes operating a step-down converter including a power source, an inductor, a capacitor, and a load in a multi-path manner (S611) and operating the step-down converter in a single-path manner (S612). Operation S611 of the operating in the multi-path manner is illustrated in the drawing as being performed prior to operation S612 of the operating in the single-path manner, but operation S611 of the operating in the multi-path manner may be performed after operation S612 of the operating in the single-path manner. In addition, after operation S611 of the operating in the multi-path manner and operation S612 of the operating in the single-path manner are performed, operation S611 of the operating in the multi-path manner and operation S612 of the operating in the single-path manner may be repeated once or more.

Hereinafter, the step-down converting method shown in FIG. 61 will be described with reference to the second step-down converter shown in FIG. 21. Operation S611 of the operating in the multi-path manner may be performed in order of, for example, the first step-down operation mode (see FIG. 22A), the third step-down operation mode (see FIG. 22B), and the second step-down operation mode (see FIG. 22C). In addition, operation S611 of the operating in the multi-path manner may include, for example, the first step-down operation mode (see FIG. 22A) and the second step-down operation mode (see FIG. 22C). Operation S612 of the operating in the single-path manner may be performed in order of, for example, the fourth step-down operation mode (see FIG. 59A) and the fifth step-down operation mode (see FIG. 59B).

A current $I_{LOAD}$ flowing in a load in operation S611 of the operating in the multi-path manner may be higher than the current $I_{LOAD}$ flowing in the load in operation S612 of the operating in the single-path manner. For example, when the current $I_{LOAD}$ in the load is more than a certain value, operation S611 of the operating in the multi-path manner may be performed, and when the current $I_{LOAD}$ in the load is less than a certain value, operation S612 of the operating in the single-path manner may be performed. When the current $I_{LOAD}$ is equal to the certain value, any one of operation S612 of the operating in the single-path manner and operation S611 of the operating in the multi-path manner may be performed. The certain value may be, for example, a value of the current $I_{LOAD}$ in the load at an intersection point between the efficiency of the multi-path manner (DPNC) and the efficiency of the single-path manner (CBT) of FIG. 60 or may be a certain value of a current which is adjacent to the intersection point. For example, when the current $I_{LOAD}$ in the load is changed from less than a first certain value to more than the first certain value, operation S611 of the operating in the multi-path manner may be performed, and when the current $I_{LOAD}$ in the load is changed from more than a second certain value to less than the second certain value, operation S612 of the operating in the single-path manner may be performed. In this case, the first certain value may be greater than the second certain value. As described above, hysteresis may be provided to prevent frequent switching between operation S611 of the operating in the multi-path manner and operation S612 of the operating in the single-path manner.

In general, a current $I_{LOAD}$ flowing in a load is related with an operation mode of an electronic system (not shown, for example, a portable electronic device such as a smartphone or a laptop computer, or a stationary electronic device such as a personal computer or a display) including a step-down converter. Accordingly, one of operation S611 of the operating in the multi-path manner and operation S612 of the operating in the single-path manner may be performed according to the operation mode of the electronic system. For example, when the electronic system is in a normal operation mode or a maximum performance mode, the current $I_{LOAD}$ flowing in the load has a high value. When the electronic system is in a power saving mode or an idle mode, the current $I_{LOAD}$ flowing in the load has a low value. Therefore, when the electronic system is in the normal operation mode or the maximum performance mode, operation S611 of the operating in the multi-path manner may be performed. When the electronic system is in the power saving mode or the idle mode, operation S612 of the operating in the single-path manner may be performed. In other words, operation S611 of the operating in the multi-path manner may be performed when the electronic system is operated in the normal operation mode or the maximum performance mode. On the other hand, operation S612 of the operating in the single-path manner may be performed when the electronic system is operated in the power saving mode or the idle mode.

In addition, the current $I_{LOAD}$ flowing in the load is related with an execution function (e.g., audio output, video output, cellular communication, Wi-Fi communication, etc.) of the electronic system. Accordingly, one of operation S611 of the operating in the multi-path manner and operation S612 of the operating in the single-path manner may be performed according to the execution function of the electronic system. For example, when the electronic system performs the video output function, the current $I_{LOAD}$ flowing in the load may have a high value. When the electronic system performs the audio output function, the current $I_{LOAD}$ flowing in the load may have a low value. Accordingly, when the electronic system performs the video output function, operation S611 of the operating in the multi-path manner may be performed. When the electronic system performs the audio output function, operation S612 of the operating in the single-path manner may be performed. In other words, the electronic system performs the video output function in operation S611 of the operating in the multi-path manner. The electronic system performs the audio output function in operation S612 of the operating in the single-path manner. For another example, when the electronic system performs video output function, audio output function and the like, operation S611 of the operating in the multi-path manner may be performed. When the electronic system does not perform such functions, operation S612 of the operating in the single-path manner may be performed. For the same reason as described above, one of operation S611 of the operating in the multi-path manner and operation S612 of the operating in the single-path manner may be performed according to a combination of the execution functions of the electronic system.

While the step-down converting method of FIG. 61 has been described with reference to the second step-down converter shown in FIG. 21, the step-down converting method may be applicable to step-down converters with a plurality of various transfer paths. For example, the step-down converting method of the third step-down converter (see FIG. 26) may also include operating the third step-down converter in the multi-path manner (S611) and operating the third step-down converter in the single-path manner (S612). Operation S611 of the operating in the multi-path manner may be performed in the order of the first step-down operation mode (see FIG. 27A) and the second step-down operation mode (see FIG. 27B). Operation S612 of the operating in the single-path manner may be performed in the order of the fourth step-down operation mode (in which the first switch SW1 is turned on and the second to sixth switches SW2 to SW6 are turned off in the third step-down converter of FIG. 26) and the fifth step-down operation mode (in which the fourth to sixth switches SW4 to SW6 are turned on and the first to third switches SW1 to SW3 are turned off in the third step-down converter of FIG. 26).

For example, the step-down converting method of the fifth step-down converter (see FIG. 31) may also including operating the fifth step-down converter in the multi-path manner (S611) and operating the fifth step-down converter in the single-path manner (S612). Operation S611 of the operating in the multi-path manner may be performed in the order of the first step-down operation mode (see FIG. 32A), the third step-down operation mode (see FIG. 32B), and the second step-down operation mode (see FIG. 32C). Operation S612 of the operating in the single-path manner may include the fourth step-down operation mode (in which the fourth switch SW4 is turned on and the first to third switches SW1 to SW3 are turned off in the fifth step-down converter of FIG. 31) and the fifth step-down operation mode (in which the third switch SW3 is turned on and the first, second, and fourth switches SW1, SW2, and SW4 are turned off in the fifth step-down converter of FIG. 31).

For example, the step-down converting method of the sixth step-down converter (see FIG. 33) may also include operating the sixth step-down converter in the multi-path manner (S611) and operating the sixth step-down converter in the single-path manner (S612). Operation S611 of the operating in the multi-path manner may be performed in the order of the first step-down operation mode (see FIG. 35A), the third step-down operation mode (see FIG. 35B), and the second step-down operation mode (see FIG. 35C). Alternatively, operation S611 of the operating in the multi-path manner may be performed in the order of the first step-down operation mode (see FIG. 35A), and the second step-down operation mode (see FIG. 35C). Also, operation S611 of the operating in the multi-path manner may be performed in the order of the first step-down operation mode (see FIG. 34A), and the third step-down operation mode (see FIG. 34B). Operation S612 of the operating in the single-path manner may include the fourth step-down operation mode (in which the first and fifth switches SW1 and SW5 are turned on and the second to fourth switches SW2 to SW4 are turned off in the sixth step-down converter of FIG. 33) and the fifth step-down operation mode (in which the fourth and fifth switches SW4 and SW5 are turned on and the first to third switches SW1 to SW3 are turned off in the sixth step-down converter of FIG. 33).

By referencing the above-described contents, those skilled in the art may understand that other step-down converters shown in the drawings may also be operated in the single path manner, and thus detailed descriptions thereof will be omitted for convenience of description. In addition, in the case of the exemplary embodiment (see FIG. 10) including the conventional converter module 10 and the conversion unit 130 with a plurality of parallel current transfer paths, operation S611 of the operating in the multi-path manner may be performed using the conversion unit 130 with the plurality of parallel current transfer paths, and operation S612 of the operating in the single-path manner may be performed using the conventional converter module 10.

Figure 62:
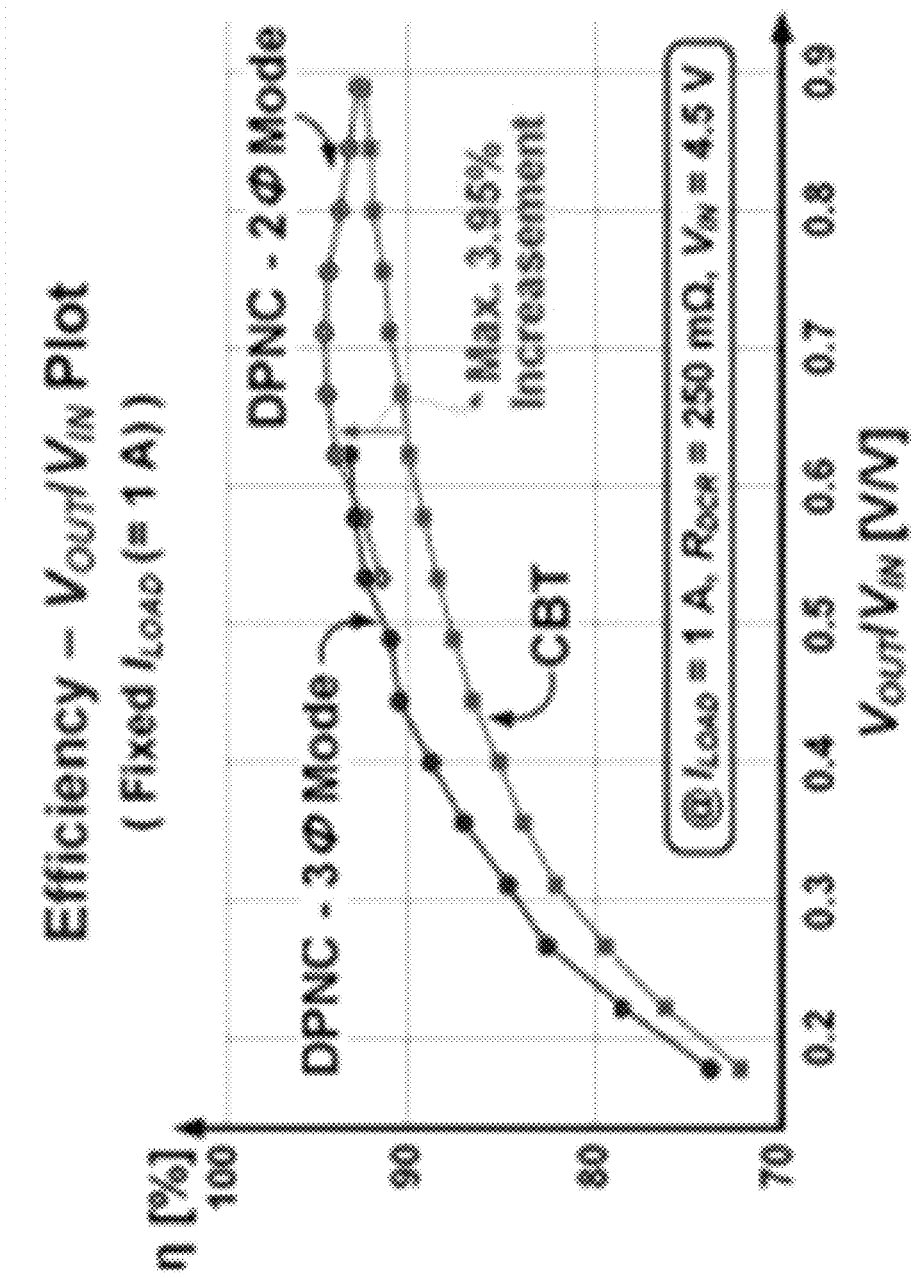
FIG. 62 is a graph showing a comparison between efficiencies when the second step-down converter shown in FIG. 21 is operated in a two-phase manner and a three-phase manner.

FIG. 62 is a graph showing efficiencies when the second step-down converter shown in FIG. 21 is operated in a two-phase manner and a three-phase manner. Here, the second step-down converter being operated in the two-phase manner means that the second step-down converter periodically performs an operation that sequentially includes the first step-down operation mode (see FIG. 22A) and the second step-down operation mode (see FIG. 22C). In addition, the second step-down converter being operated in the three-phase manner means that the second step-down converter periodically performs an operation that sequentially includes the first step-down operation mode (see FIG. 22A), the third step-down operation mode (see FIG. 22B), and the second step-down operation mode (see FIG. 22C). Referring to FIG. 62, when a ratio ($V_{OUT}/V_{IN}$) of an output voltage to an input voltage is high, the efficiency of the two-phase manner (DPNC-2ΦMode) is higher than the efficiency of the three-phase manner (DPNC-3Φ Mode). In addition, when the ratio ($V_{OUT}/V_{IN}$) of the output voltage to the input voltage is low, the efficiency of the three-phase manner (DPNC-3Φ Mode) is higher than the efficiency of the two-phase manner (DPNC-2ΦMode). Therefore, when the ratio ($V_{OUT}/V_{IN}$) of the input voltage to the output voltage is high, the second step-down converter may be operated in the two-phase manner, and when the ratio ($V_{OUT}/V_{IN}$) of the input voltage to the output voltage is low, the second step-down converter may be operated in the three-phase manner. In this way, it is possible to increase the overall efficiency of the second step-down converter.

Figure 63:
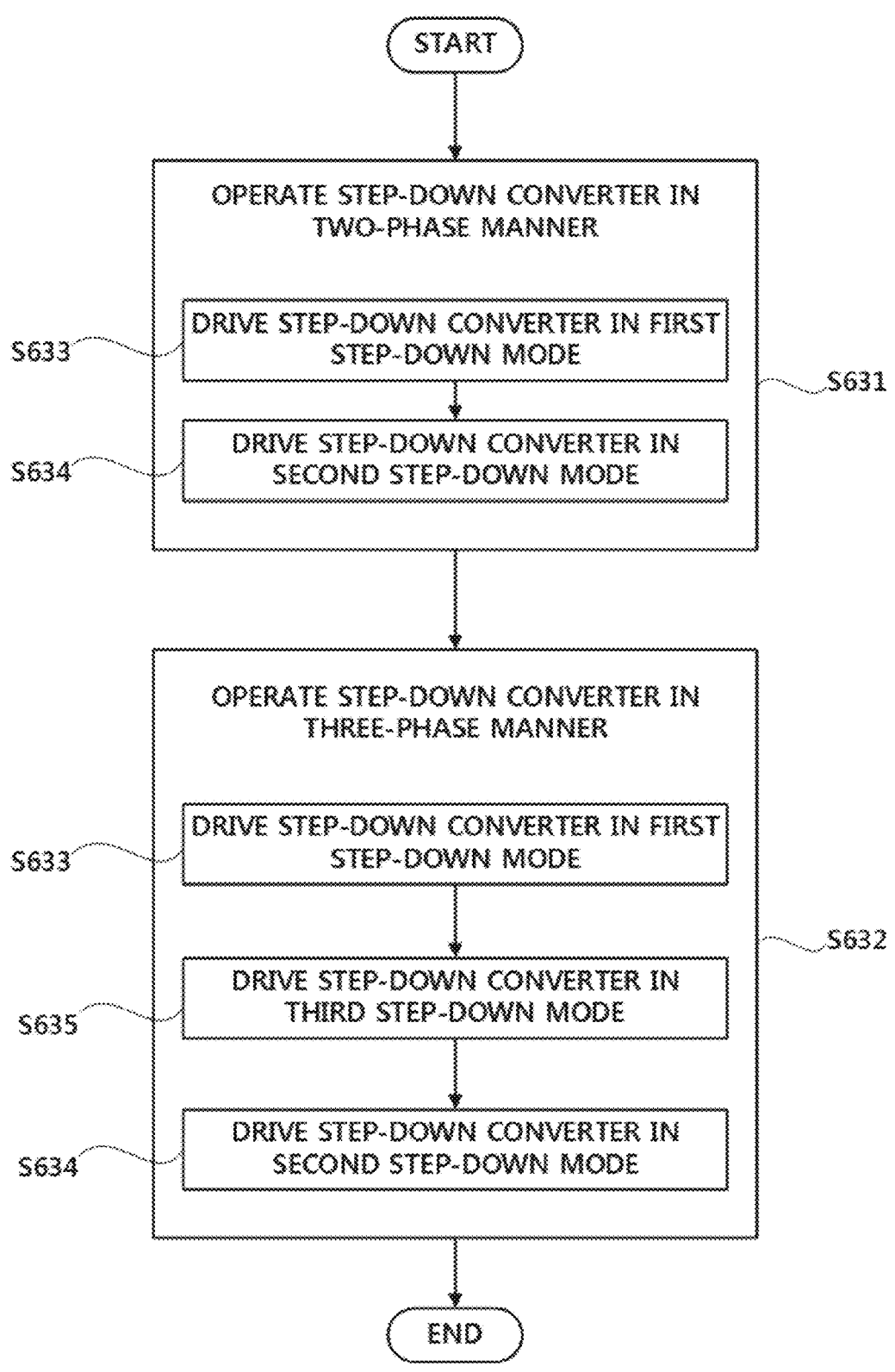
FIG. 63 is a flowchart for describing a step-down converting method according to a second exemplary embodiment.

FIG. 63 is a flowchart for describing a step-down converting method according to a second exemplary embodiment. Referring to FIG. 63, the step-down converting method includes operating a step-down converter including a power source, an inductor, a capacitor, and a load in a two-phase manner (S631) and operating the step-down converter in a three-phase manner (S632). FIG. 63 shows that operation S631 of the operating in the two-phase manner is performed prior to operation S632 of the operating in the three-phase manner, but operation S631 of the operating in the two-phase manner may be performed after operation S632 of the operating in the three-phase manner. In addition, after operation S631 of the operating in the two-phase manner and operation S632 of the operating in the three-phase manner are performed, operation S631 of the operating in the two-phase manner and operation S632 of the operating in the three-phase manner may be repeated once or more. Operation S631 of the operating in the two-phase manner may include driving the step-down converter in a first step-down operation mode (S633) and driving the step-down converter in a second step-down operation mode (S634). In addition, operation S632 of the operating in the three-phase manner may include driving the step-down converter in the first step-down operation mode (S633), driving the step-down converter in a third step-down operation mode (S635), and driving the step-down converter in the second step-down operation mode (S634).

Hereinafter, the step-down converting method shown in FIG. 63 will be described with reference to the second step-down converter shown in FIG. 21. Operation S631 of the operating in the two-phase manner may include driving the step-down converter in the first step-down operation mode (see FIG. 22A) (S633) and driving the step-down converter in the second step-down operation mode (see FIG. 22C) (S634). In addition, operation S632 of the operating in the three-phase manner may include driving the step-down converter in the first step-down operation mode (see FIG. 22A) (S633), driving the step-down converter in the third step-down operation mode (see FIG. 22B) (S635), and driving the step-down converter in the second step-down operation mode (see FIG. 22C) (S634).

A ratio ($V_{OUT}/V_{IN}$) of an output voltage to an input voltage in operation S631 of the operating in the two-phase manner may be higher than a ratio ($V_{OUT}/V_{IN}$) of an output voltage to an input voltage in operation S632 of the operating in the three-phase manner. For example, when the ratio ($V_{OUT}/V_{IN}$) of the output voltage to the input voltage is more than a certain value, operation S631 of the operating in the two-phase manner may be performed. When the ratio ($V_{OUT}/V_{IN}$) of the output voltage to the input voltage is less than a certain value, operation S632 of the operating in the three-phase manner may be performed. The certain value may be, for example, a value of the ratio ($V_{OUT}/V_{IN}$) of the output voltage to the input voltage at an intersection point between the efficiency of the two-phase manner (DPNC-2Φ Mode) and the efficiency of the three-phase manner (DPNC-3Φ Mode) of FIG. 62 or may be a certain value adjacent to the value of the intersection. For example, when the ratio ($V_{OUT}/V_{IN}$) of the output voltage to the input voltage is changed from less than a first certain value to more than the first certain value, operation S631 of the operating in the two-phase manner may be performed. When the ratio ($V_{OUT}/V_{IN}$) of the output voltage to the input voltage is changed from more than a second certain value to less than the second certain value, operation S632 of the operating in the three-phase manner may be performed. In this case, the first certain value may be smaller than the second certain value. As described above, hysteresis may be provided to prevent frequent switching between operation S631 of the operating in the two-phase manner and operation S632 of the operating in the three-phase manner.

In many cases, since the input voltage $V_{IN}$ has a fixed value, the ratio ($V_{OUT}/V_{IN}$) of the output voltage to the input voltage is proportional to the output voltage $V_{OUT}$. Therefore, the description in relation to the ratio ($V_{OUT}/V_{IN}$) of the output voltage to the input voltage may also be applied to the output voltage $V_{OUT}$. For example, the output voltage $V_{OUT}$ in operation S631 of the operating in the two-phase manner may be higher than the output voltage $V_{OUT}$ in operation S632 of the operating in the three-phase manner. In other words, one of operation S631 of the operating in the two-phase manner and operation S632 of the operating in the three-phase manner may be selected and performed according to the output voltage $V_{OUT}$ of the step-down converter. For example, one of operation S631 of the operating in the two-phase manner and operation S632 of the operating in the three-phase manner may be selected and performed according to a value of the output voltage $V_{OUT}$ of the step-down converter set by a processor (not shown) which controls the step-down converter. For example, when the output voltage $V_{OUT}$ is more than a certain value, operation S631 of the operating in the two-phase manner may be performed. When the output voltage $V_{OUT}$ is less than a certain value, operation S632 of the operating in the three-phase manner may be performed. In addition, when an electronic system (not shown) including a step-down converter is in a normal operation mode or a maximum performance mode, a high output voltage $V_{OUT}$ may be required, and when the electronic system (not shown) is in a power saving mode or an idle mode, a low output voltage $V_{OUT}$ may be required. Accordingly, when the electronic system is in the normal operation mode or the maximum performance mode, operation S631 of the operating in the two-phase manner may be performed, and when the electronic system is in the power saving mode or the idle mode, operation S632 of the operating in the three-phase manner may be performed. In other words, operation S631 of the operating in the two-phase manner may be performed when the electronic system is operated in the normal operation mode or the maximum performance mode, and operation S632 of the operating in the three-phase manner may be performed when the electronic system is operated in the power saving mode or the idle mode. In addition, a required output voltage $V_{OUT}$ may be determined according to execution functions or a combination of the execution functions of the electronic system, and thus, any one of operation S631 of the operating in the two-phase manner and operation S632 of the operating in the three-phase manner may be performed according to the execution functions or the combination of the execution functions of the electronic system.

While the step-down converting method of FIG. 63 has been described with reference to the second step-down converter shown in FIG. 21, the step-down converting method may be applicable to step-down converters with a plurality of various transfer paths. For example, the step-down converting method of the fifth step-down converter (see FIG. 31) may be performed by operating the fifth step-down converter in the two-phase manner (S631) and then operating the fifth step-down converter in the three-phase manner (S632). Operation S631 of the operating in the two-phase manner may be performed in the order of driving the fifth step-down converter in the first step-down operation mode (see FIG. 32A) (S633) and driving the fifth step-down converter in the second step-down operation mode (see FIG. 32C) (S634). In addition, operation S632 of the operating in the three-phase manner may be performed in order of driving the fifth step-down converter in the first step-down operation mode (see FIG. 32A) (S633), driving the fifth step-down converter in the third step-down operation mode (see FIG. 32B) (S635), and driving the step-down converter in the second step-down operation mode (see FIG. 32C) (S634).

For example, the step-down converting method of the sixth step-down converter (see FIG. 33) may be performed in order of operating the sixth step-down converter in the two-phase manner (S631) and operating the sixth step-down converter in the three-phase manner (S632). Operation S631 of the operating in the two-phase manner may be performed in order of driving the sixth step-down converter in the first step-down operation mode (see FIG. 35A) (S633) and driving the sixth step-down converter in the second step-down operation mode (see FIG. 35C) (S634). Alternatively, operation S631 of the operating in the two-phase manner may be performed in order of driving the sixth step-down converter in the first step-down operation mode (see FIG. 35A) (S633) and driving the sixth step-down converter in the third step-down operation mode (see FIG. 35B) (S635). In addition, operation S632 of the operating in the three-phase manner may be performed in order of driving the sixth step-down converter in the first step-down operation mode (see FIG. 35A) (S633), driving the sixth step-down converter in the third step-down operation mode (see FIG. 35B) (S635), and driving the step-down converter in the second step-down operation mode (see FIG. 35C) (S634).

By referencing the above-described contents, those skilled in the art may understand that other step-down converters shown in the drawings may also be operated in the two-phase manner and the three-phase manner, and thus detailed descriptions thereof will be omitted for convenience of description.

Operation S631 of operating the step-down converter in the two-phase manner and operation S632 of operating the step-down converter in the three-phase manner may be included in operation S611 of operating the step-down converter in the multi-path manner shown in FIG. 61. That is, operation S611 of the operating in the multi-path manner may include operation S631 of operating the step-down converter in the two-phase manner and operation S632 of operating the step-down converter in the three-phase manner. In addition, operation S611 of the operating in the multi-path manner may include operation S631 of operating the step-down converter in the two-phase manner or operation S632 of operating the step-down converter in the three-phase manner. Furthermore, operation S611 of the operating in the multi-path manner may include a plurality of operations S631 of operating the step-down converter in the two-phase manner and a plurality of operations S632 of operating the step-down converter in the three-phase manner.

The exemplary embodiments described above include circuits for a DC-DC converter, but the present invention is not limited thereto and may be equally applied to an AC-AC converter, a DC-AC converter, and an AC-DC converter according to exemplary embodiments.

The inventive concept is not limited to the above-described exemplary embodiments. Those skilled in the art may variously modify the exemplary embodiments without departing from the gist of the invention claimed by the appended claims and the modifications are within the scope of the claims.

The invention claimed is:

1. A step-down converting method comprising:
controlling a step-down converter including an inductor and a capacitor such that the step-down converter operates in a three-phase manner, and
wherein the three-phase manner includes:
a first step-down operation mode in which a current is supplied in a first path from a power source to a load through the inductor and the capacitor, the capacitor being connected to the inductor in series;

a third step-down operation mode in which a current is supplied from the inductor to the load; and
a second step-down operation mode in which a current is supplied in a second path from the inductor to the load without flowing through the capacitor, and a current is supplied in a third path from the capacitor to the load without flowing through the inductor.

2. The step-down converting method of claim 1, wherein, in the three-phase manner, the first, third and second step-down operation modes are repeated in a sequence of the first, third and second step-down operation modes.

3. The step-down converting method of claim 1, wherein, in the operating of the step-down converter in the second step-down operation mode, at least one of the inductor or the capacitor is not connected to the power source.

4. The step-down converting method of claim 1, wherein, in the operating of the step-down converter in the second step-down operation mode, the second path and the third path are formed at a same time.

5. The step-down converting method of claim 1, the method further comprising:
controlling the step-down converter such that the step-down converter operates in a two-phase manner, and
wherein the two-phase manner includes:
the first step-down operation mode; and
the second step-down operation mode.

6. The step-down converting method of claim 5, wherein a ratio of an output voltage to an input voltage in the two-phase manner is higher than the ratio in the three-phase manner.

7. The step-down converting method of claim 5, wherein one of the three-phase manner and the two-phase manner is selected according to an operation mode of an electronic system including the step-down converter, and the step-down converter is operated according to the selected manner.

8. The step-down converting method of claim 7, wherein, when the operation mode is a normal operation mode or a maximum performance mode, the two-phase manner is selected, and
when the operation mode is a power saving mode or an idle mode, the three-phase manner is selected.

9. The step-down converting method of claim 5, wherein one of the three-phase manner and the two-phase manner is selected according to at least one function executed by an electronic system including the step-down converter, and the step-down converter is operated according to the selected manner.

10. A step-down converter comprising:
an inductor;
a capacitor; and
a plurality of switches configured to control the step-down converter to repeatedly switch between a first, a third and a second step-down operation modes,
wherein, in the operating of the step-down converter in the first step-down operation mode, a current is supplied in a first path from a power source to a load through the inductor and the capacitor, the capacitor being connected to the inductor in series,
wherein, in the operating of the step-down converter in the third step-down operation mode, a current is supplied from the inductor to the load, and
wherein, in the operating of the step-down converter in the second step-down operation mode, a current is supplied in a second path from the inductor to the load without flowing through the capacitor, and a current is supplied in a third path from the capacitor to the load without flowing through the inductor.

11. The step-down converter of claim 10, wherein the first, third and second step-down operation modes are repeated in a sequence of the first, third and second step-down operation modes.

12. The step-down converter of claim 10, wherein, in the operating of the step-down converter in the second step-down operation mode, at least one of the inductor or the capacitor is not connected to the power source.

13. The step-down converter of claim 10, wherein, in the operating of the step-down converter in the second step-down operation mode, the second path and the third path are formed at a same time.

14. 1, A step-down converting method comprising:
controlling a step-down converter including an inductor and a capacitor such that the step-down converter operates in a three-phase manner, and
wherein the three-phase manner includes:
a first step-down operation mode in which a current is supplied in a first path from a power source to a load through the inductor without flowing through the capacitor, and a current is supplied in a second path from the power source to the load through the capacitor without flowing through the inductor; and
a third step-down operation mode in which a current is supplied from the inductor to the load; and
a second step-down operation mode in which a current is supplied in a third path from the inductor and the capacitor to the load, the capacitor being connected to the inductor in series.

15. The step-down converting method of claim 14, wherein, in the three-phase manner, the first, third and second step-down operation modes are repeated in a sequence of the first, third and second step-down operation modes.

16. The step-down converting method of claim 14, wherein, in the operating of the step-down converter in the second step-down operation mode, both the inductor and the capacitor are not connected to the power source.

17. The step-down converting method of claim 14, wherein, in the operating of the step-down converter in the first step-down operation mode, the first path and the second path are formed at a same time.

18. The step-down converting method of claim 14, the method further comprising:
controlling the step-down converter such that the step-down converter operates in a two-phase manner, and
wherein the two-phase manner includes:
the first step-down operation mode; and
the second step-down operation mode.

19. The step-down converting method of claim 18, wherein a ratio of an output voltage to an input voltage in the two-phase manner is higher than the ratio in the three-phase manner.

20. The step-down converting method of claim 18, wherein one of the three-phase manner and the two-phase manner is selected according to an operation mode of an electronic system including the step-down converter, and the step-down converter is operated according to the selected manner.

21. The step-down converting method of claim 20, wherein, when the operation mode is a normal operation mode or a maximum performance mode, the two-phase manner is selected, and
when the operation mode is a power saving mode or an idle mode, the three-phase manner is selected.

22. The step-down converting method of claim 18, wherein one of the three-phase manner and the two-phase manner is selected according to at least one function executed by an electronic system including the step-down converter, and the step-down converter is operated according to the selected manner.

23. A step-down converter comprising:
an inductor;
a capacitor; and
a plurality of switches configured to control the step-down converter to repeatedly switch between a first, a third and a second step-down operation modes,
wherein, in the operating of the step-down converter in the first step-down operation mode, a current is supplied in a first path from a power source to a load through the inductor without flowing through the capacitor, and a current is supplied in a second path from the power source to the load through the capacitor without flowing through the inductor,
wherein, in the operating of the step-down converter in the third step-down operation mode, a current is supplied from the inductor to the load, and
wherein, in the operating of the step-down converter in the second step-down operation mode, a current is supplied in a third path from the inductor and the capacitor to the load, the capacitor being connected to the inductor in series.

24. The step-down converter of claim 23, wherein the first, third and second step-down operation modes are repeated in a sequence of the first, third and second step-down operation modes.

25. The step-down converter of claim 23, wherein, in the operating of the step-down converter in the second step-down operation mode, both the inductor and the capacitor are not connected to the power source.

26. The step-down converter of claim 23, wherein, in the operating of the step-down converter in the first step-down operation mode, the first path and the second path are formed at a same time.

* * * * *